(12) United States Patent
Yamamoto et al.

(10) Patent No.: US 7,010,541 B2
(45) Date of Patent: Mar. 7, 2006

(54) MAN-HOUR MANAGEMENT SYSTEM

(75) Inventors: Kunio Yamamoto, Mie-ken (JP); Tokiyuki Ichikawa, Mie-ken (JP); Toyozo Morinaka, Mie-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 214 days.

(21) Appl. No.: 09/842,472

(22) Filed: Apr. 26, 2001

(65) Prior Publication Data
US 2001/0051891 A1 Dec. 13, 2001

(51) Int. Cl.
*G06F 17/30* (2006.01)
(52) U.S. Cl. .................. 707/102; 707/10; 707/103 R
(58) Field of Classification Search .................. 707/3, 707/202, 204, 103 R, 103 X, 10, 102, 101; 705/9
See application file for complete search history.

(56) References Cited

U.S. PATENT DOCUMENTS

| | | | | |
|---|---|---|---|---|
| 5,237,508 A | * | 8/1993 | Furukawa et al. | 700/100 |
| 5,396,432 A | * | 3/1995 | Saka et al. | 700/111 |
| 5,423,457 A | * | 6/1995 | Nicholas et al. | 222/62 |
| 5,890,131 A | * | 3/1999 | Ebert et al. | 705/7 |
| 5,907,829 A | * | 5/1999 | Kida | 705/9 |
| 6,243,110 B1 | * | 6/2001 | Takahashi et al. | 347/5 |
| 6,550,053 B1 | * | 4/2003 | Muckley | 717/100 |
| 6,850,939 B1 | * | 2/2005 | Bostleman et al. | 707/9 |
| 2002/0162209 A1 | * | 11/2002 | Hosono et al. | 29/430 |

FOREIGN PATENT DOCUMENTS

| | | |
|---|---|---|
| GB | 1 477 671 | 6/1977 |
| JP | 4-60833 | 2/1992 |
| JP | 7-191730 | 7/1995 |

OTHER PUBLICATIONS

Wohlin. c. Meeting the challenge of Large-scale software development in an educational environment, Software Engineering Education & Training, Apr. 13-16, 1997, p. x+219.*
Fermin et al. Club car competitive cost analysis, System and information design symposium, Apr. 29, 2005, pp. 370-375.*

(Continued)

*Primary Examiner*—Jean M. Corrielus
*Assistant Examiner*—Baoquoc N. To
(74) *Attorney, Agent, or Firm*—Hamre, Schumann, Mueller & Larson, P.C.

(57) ABSTRACT

A man-hour management system (1 in FIG. 2) which manages man-hours for producing a product, comprising a walk man-hour conversion table (12) for performing registration management of standardized man-hours for walks; a work constituent condition table (10) for performing registration management of constituent work CW (element work), and conditions for each of the constituent work CW (element work); a standardized man-hour table (11) for performing registration management of standardized man-hour analysis contents and standardized man-hours for the constituent work CW (element work) or the constituent work CW (element work) conditions; a main man-hour management table (18) for performing registration management/reorganization management of constituent work CW (element work) items in units of processes, data being assigned to the constituent work CW (element work) items from the tables (10, 11, 12), or data being inputted and set to the constituent work CW (element work) items; a process name table (19) for performing registration management/reorganization management of names of the processes; and man-hour output means (OS) for outputting man-hour information. The man-hour management system can analyze man-hours in each individual process unit and for a state between the processes.

8 Claims, 54 Drawing Sheets

OTHER PUBLICATIONS

Deutsch. "Software Simulations Lead to Better Assembly". htttp://www.nytimes.com/library/tech/99/03/biztech/articles/22cad.html. Mar. 22, 1999.

Gobel. "Introduction to Simfactory 11.5". *Proceedings of the 1991 Winter Simulation Conference.* pp. 77-80. 1991.

* cited by examiner

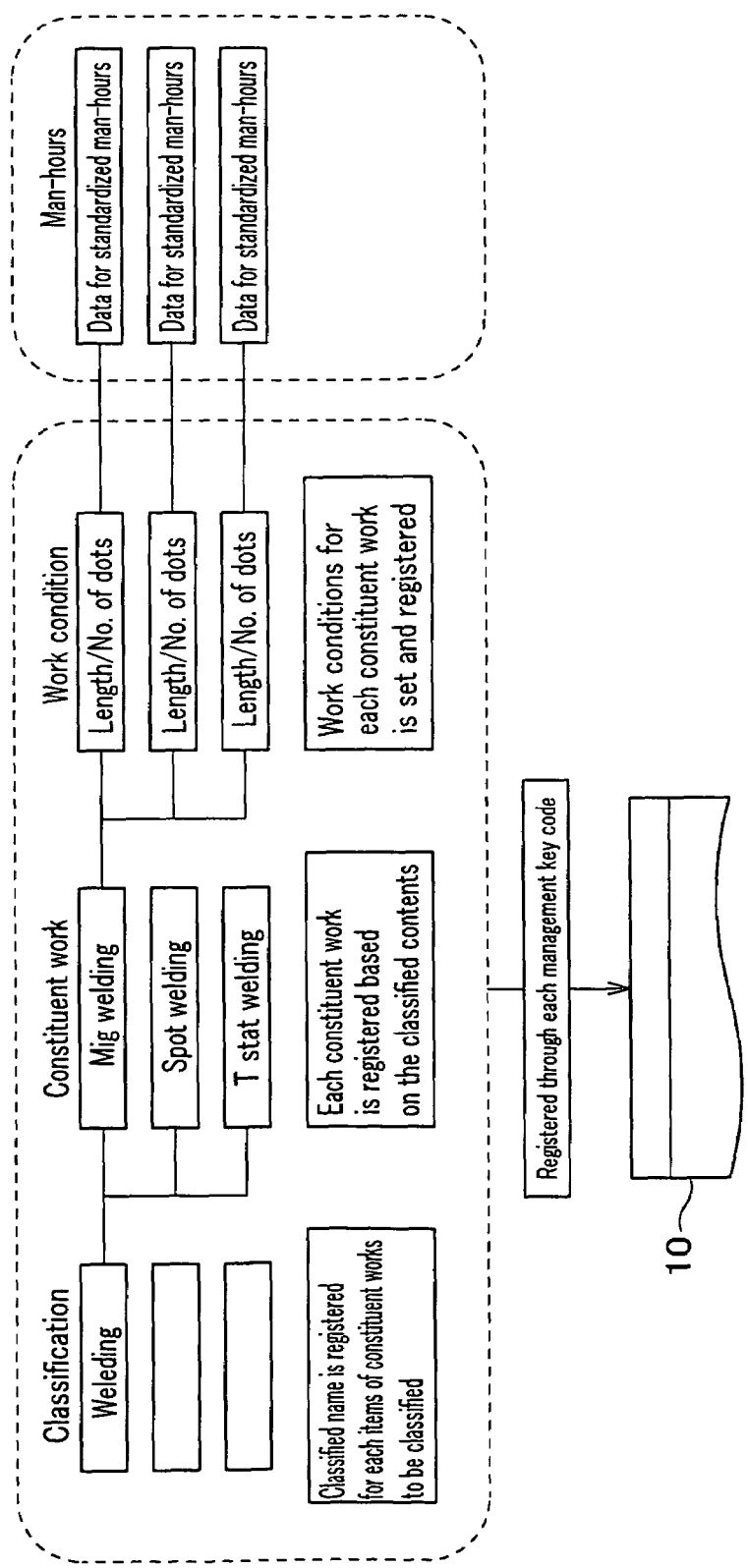

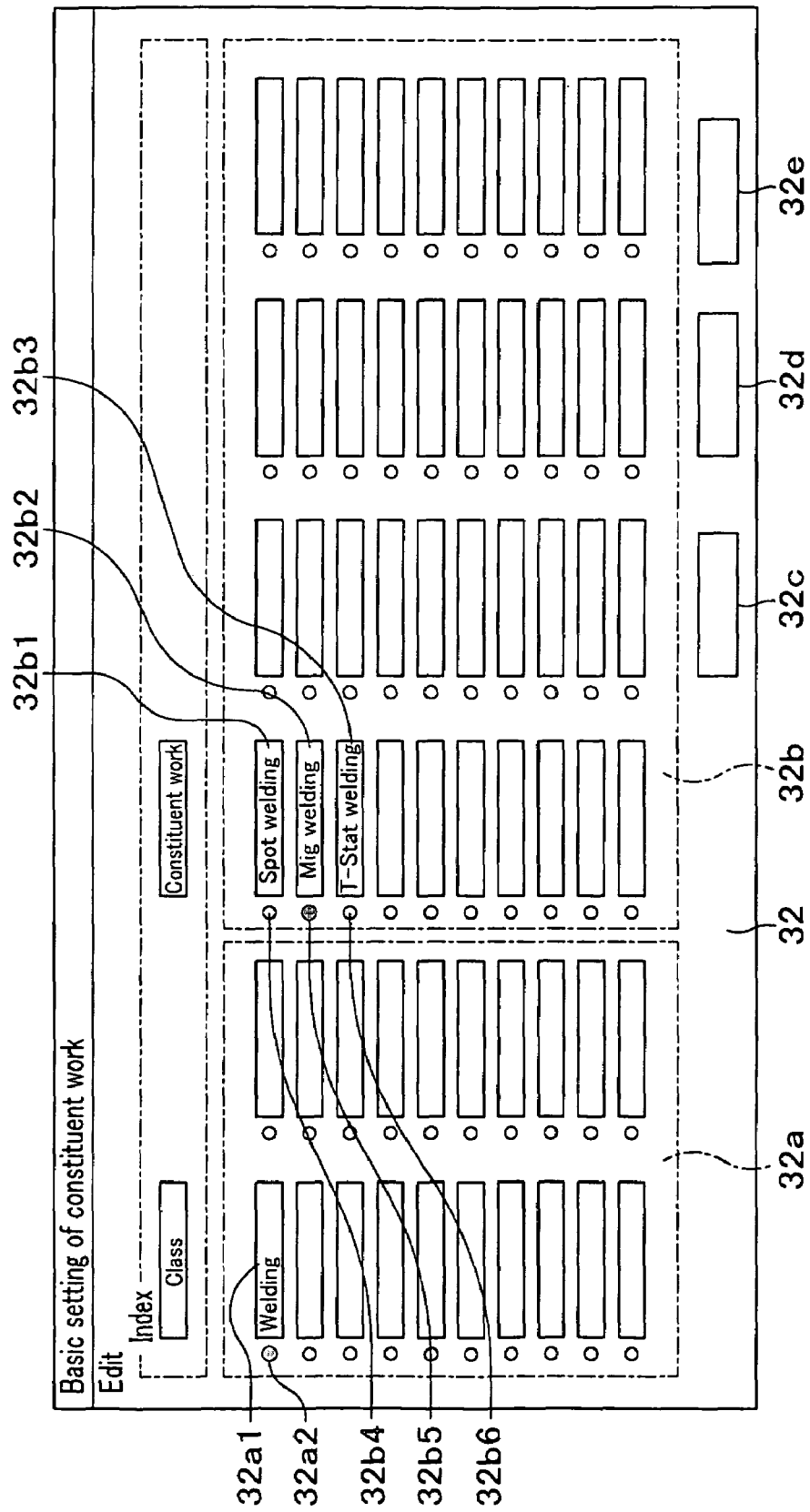

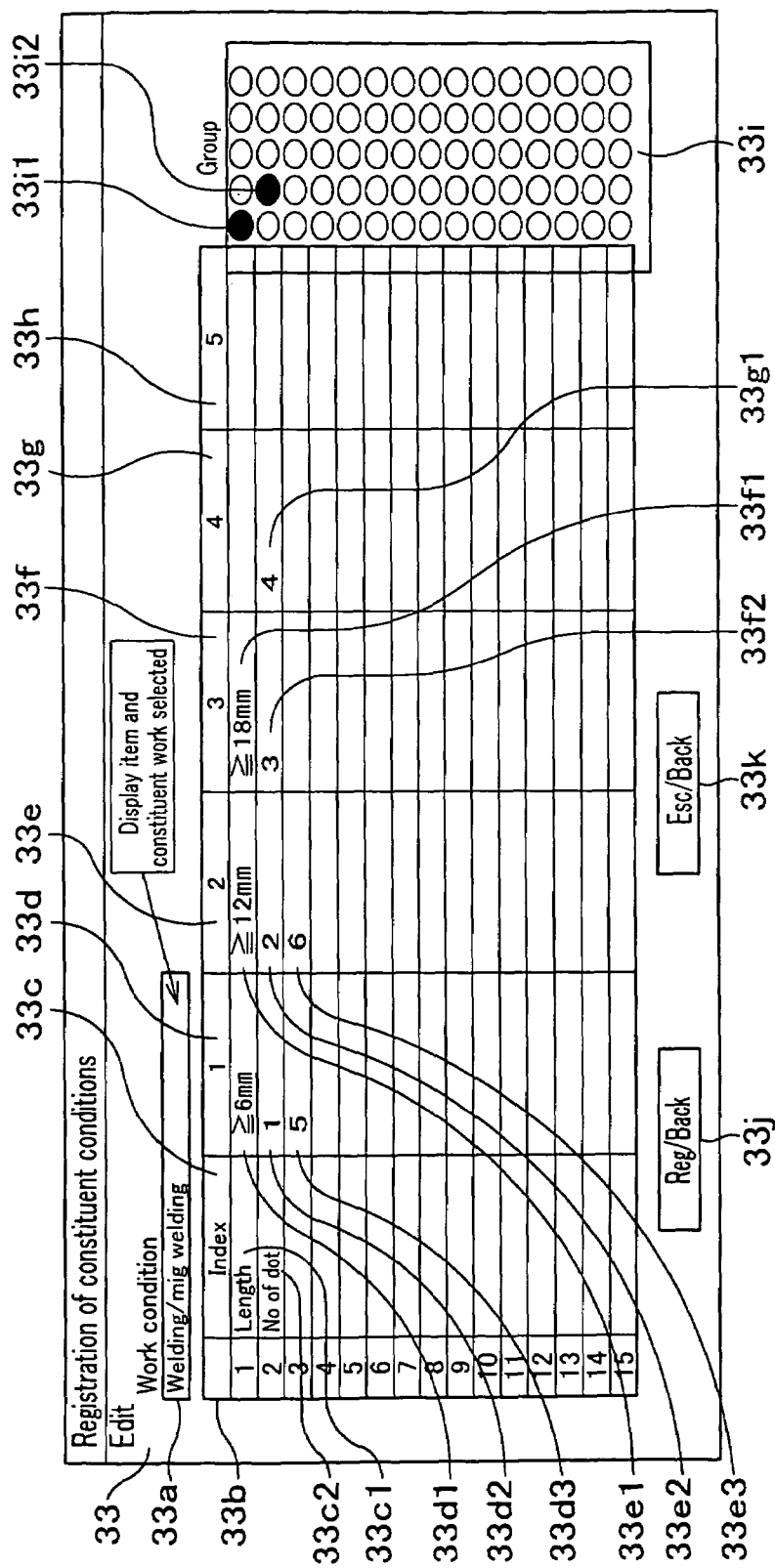

FIG.9B

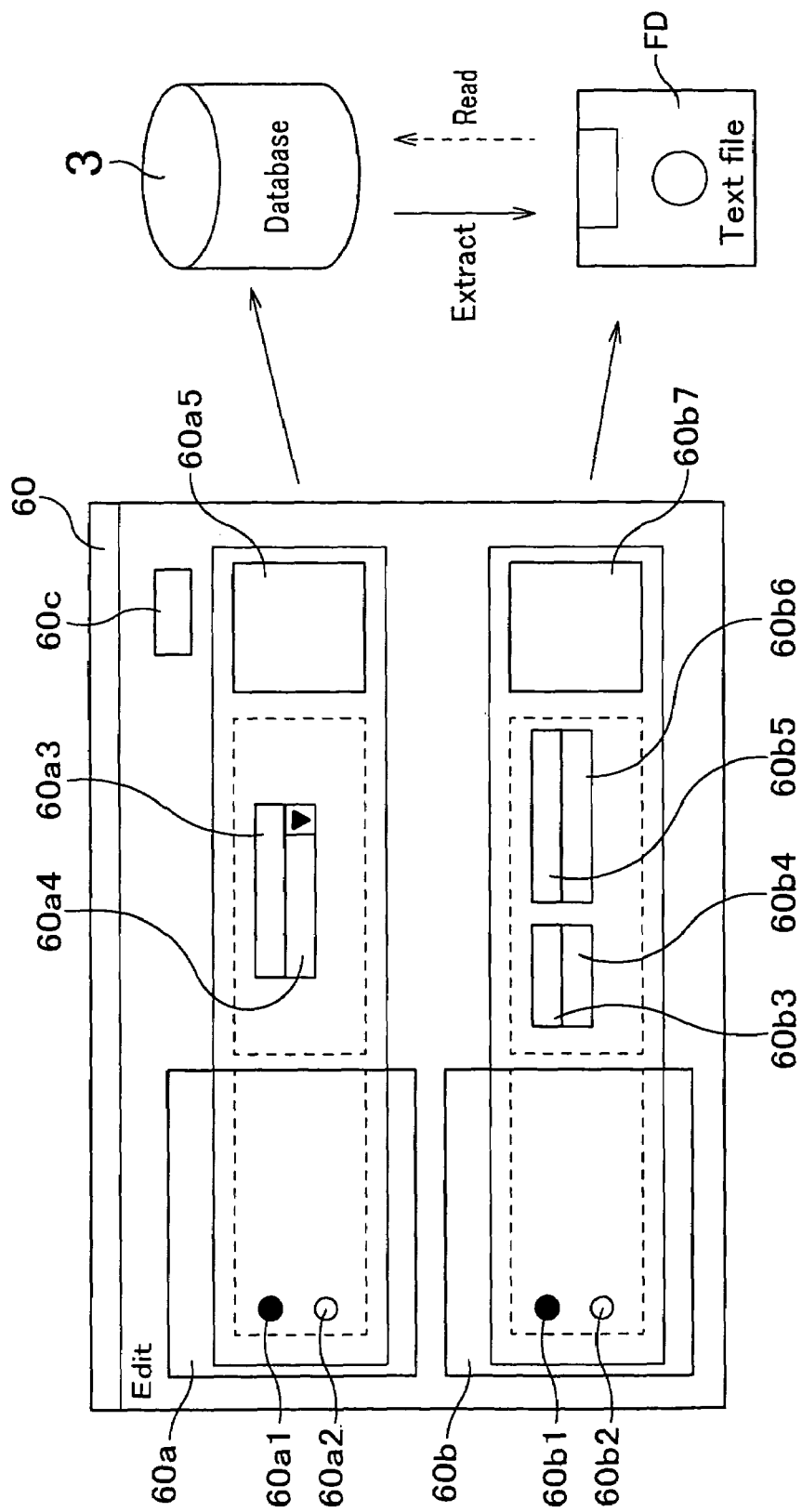

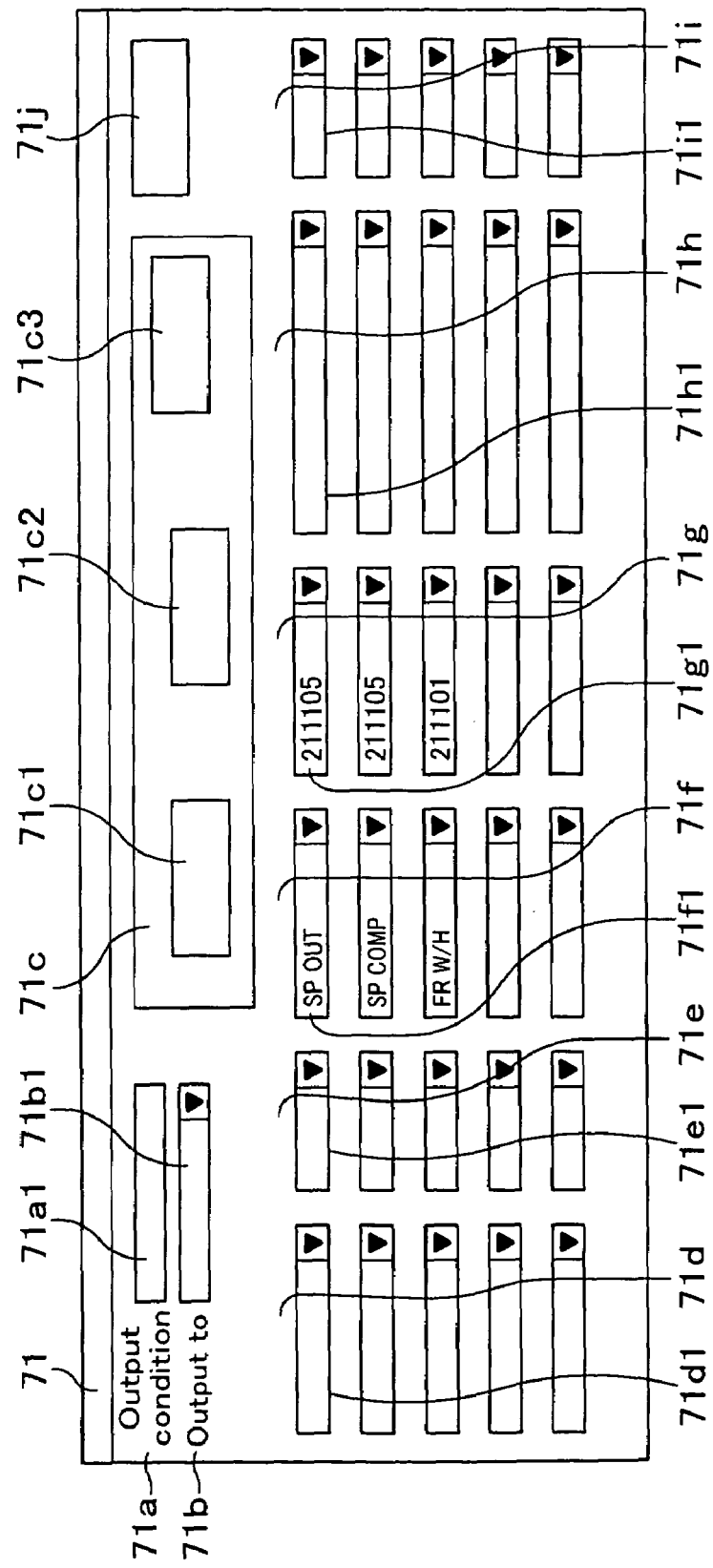

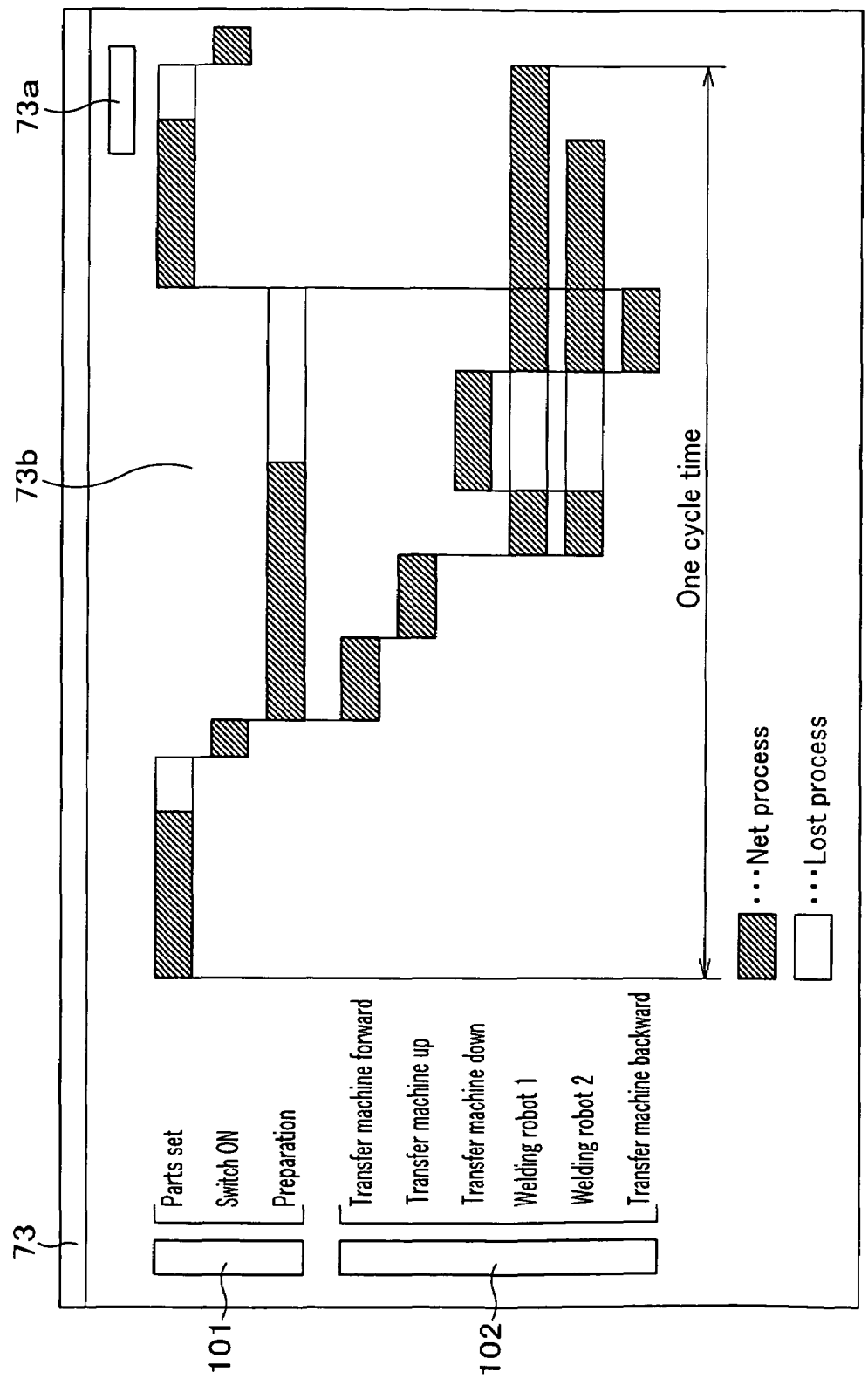

FIG.39

| | 75a | 75b | 75c | 75d | 75e | 75f | 75g | 75 | 75h | 75i | 75j | 75k | 75l | 75m | 75n | 75o | 75p |
|---|---|---|---|---|---|---|---|---|---|---|---|---|---|---|---|---|---|
| | | | | | | | | | No. of man-hour | | | | No. of Instlation man-hour | | | | |
| 1 | S2H | N/R | 1 | | FR W/H | 211101 | SET LH | | 19.0 | 19.2 | | 38.2 | 51.4 | | | 54.5 | |
| 2 | | | | | | | T.T | | | | | | 163.5 | 3.1 | | 199.0 | |
| 3 | | | | | | | 1ST | | | | | | 161.5 | 35.5 | | 183.5 | |
| 4 | | | | | | | 2ST | | | | | | | 15.2 | 6.8 | | |
| 5 | | | | | | | | | | | | | 161.5 | 53.8 | 11.6 | | |
| 6 | | | | | | Sub Total | | | 19.0 | 19.2 | | 38.2 | 371.6 | | | 437.0 | |
| 7 | S2H | N/R | 1 | | SP OUT | 211105 | RH | | | | | | 29.6 | | | 29.6 | |
| 8 | | | | | | | LH | | | | | | 29.6 | | | 29.6 | |
| 9 | | | | | | SP COMP | SR RH | | | | | | 127.8 | | | 127.8 | |
| 10 | | | | | | | SR LH | | | | | | 109.6 | | | 109.6 | |
| 11 | | | | | | Sub Total | | | | | | | 296.6 | | | 296.6 | |
| 12 | | | | | | | | | | | | | | | | | |

| | 76a | 76b | 76c | 76d | 76e | 76f | 76g | 76h | 76i | 76j | 76k | 76l | 76m |
|---|---|---|---|---|---|---|---|---|---|---|---|---|---|
| 1 | S2H | N/R | 1 | FR W/H | 211101 | T.T | T.T gun | | | | SPEC | | |
| 2 | | | | | | | SR M/C 1B | Set | 4 | | | | |
| 3 | | | | | | 1ST | SR M/C 1A | Set | 18 | | | | |
| 4 | | | | | | | SR M/C 2A | Set | 12 | | | | |
| 5 | | | | | | | SR M/C 3A | Set | 12 | | | | |
| 6 | | | | | | | SR M/C 1B | Set | 8 | | | | |
| 7 | | | | | | | SR M/C 2B | Set | 9 | | | | |
| 8 | | | | | | | SR M/C 3B | Set | 11 | | | | |
| 9 | | | | | | 2ST | SR M/C 1A | Set | 13 | | | | |
| 10 | | | | | | | SR M/C 2A | Set | 7 | | | | |
| 11 | | | | | | | SR M/C 3A | Set | 7 | | | | |
| 12 | | | | | | | SR M/C 1B | Set | 10 | | | | |
| 13 | | | | | | | SR M/C 2B | Set | 9 | | | | |
| 14 | | | | | | | SR M/C 3B | Set | 14 | | | | |
| 15 | | | | | | Sub Total | | Set | 12 | | | | |
| 16 | | | | | | | | | 146 | | | | |

76n

MAN-HOUR MANAGEMENT SYSTEM

BACKGROUND OF THE INVENTION

1. Field of the Invention

The present invention relates to a man-hour management system which manages man-hours for producing a product, and more particularly to a man-hour management system which offers man-hour information effective to diminish the numbers of man-hours in each individual process unit and between processes.

2. Description of the Related Art

In case of producing a product, processes and works or jobs in each process are managed in terms of man-hours in order to grasp how much labor is required for the production of the product. Besides, how a production cost is curtailed becomes important in the case of producing the product, and diminution in the number of man-hours is very effective for curtailing the production cost. Therefore, techniques for calculating the man-hours and managing them become very important for judging the degrees to which the arrangement of workers or operators, diminution in the number of wasteful man-hours, process organization, etc. in a production line contribute to the curtailment of the production cost and the achievement of a target production cost. In each manufacturer, accordingly, man-hours are managed by a man-hour management system utilizing various techniques, and they are analyzed on the basis of man-hour information delivered from the man-hour management system.

A man-hour analysis in the prior art is such that a process is separated into personal works and equipmental works, and that net man-hours are respectively cumulated for the works by persons and the works by equipment so as to be compared. By way of example, FIG. 44 shows a graph of net man-hours for respective works in one process as is utilized in the prior-art man-hour analysis. In the graph 100, the works of personal man-hours 101 and equipmental man-hours 102 are listed in a vertical direction, while the net man-hours for the respective works are cumulated in a horizontal direction. In the man-hour analysis based on the graph 100, the magnitudes of the net man-hours extending horizontally are compared, and works of large net man-hours (for example, a work by a welding robot 1 and a component preparing work) are narrowed down as works which are subjects for diminutions in the numbers of man-hours. Besides, automation, the enhancement of an equipment precision, the reconsideration of a personal work procedure, or the like is promoted for such a work narrowed down, so as to attain diminution in the number of net man-hours, in turn, curtailment in a production cost.

Since, however, the prior-art man-hour analysis is made for the individual works, it is alien to an analysis for overall man-hours required for one cycle in each actual process (the total man-hours of net man-hours and loss man-hours in each process in one cycle of product production). Therefore, the prior-art man-hour analysis cannot analyze man-hours in each individual process unit, between processes or in view of the whole production line. More specifically, it cannot analyze man-hours in the case where a certain work is transferred to the next work, or where a certain process is transferred to the next process. Further, it cannot analyze man-hours for the state between works proceeding concurrently or for the state between processes proceeding concurrently. Accordingly, a man-hour management system in the prior art is difficult to make a man-hour analysis for determining process organization, the arrangement of equipment within a factory, the arrangement of workers in a production line, or the like, in each individual process unit or in consideration of the state between processes. Consequently, it is difficult to efficiently curtail a production cost.

SUMMARY OF THE INVENTION

An object of the present invention is to provide a man-hour management system which can analyze man-hours in each individual process unit and between processes.

A man-hour management system according to the present invention having accomplished the above object is a man-hour management system which manages man-hours for producing a product, characterized by comprising a walk man-hour conversion table for performing registration management of standardized man-hours for walks which are generated by works; a work constituent condition table for performing registration management of constituent work CW (element work) for use in managing the man-hours, and conditions for each of the constituent work CW (element work); a standardized man-hour table for performing registration management of standardized man-hour analysis contents and standardized man-hours for the constituent work CW (element work) or the constituent work CW (element work) conditions which are under the registration management of said work constituent condition table; a main man-hour management table for performing registration management/reorganization management of constituent work CW (element work) items in units of processes, data being assigned to the constituent work CW (element work) items from said walk man-hour conversion table, said work constituent condition table and said standardized man-hour table, or data being inputted to and set as the constituent work CW (element work) items; a process name table for performing registration management/reorganization management of names of the processes; and man-hour output means for outputting man-hour information by being assigned data from said main man-hour management table and said process name table.

According to this man-hour management system, the standardized man-hours are set for the constituent work CW (element work) or the conditions of each of the constituent work CW (element work), and the constituent work CW (element work) items are managed in process units, so that a man-hour analysis can be made between the constituent work CW (element work) within each process or between the processes. Therefore, a process organization loss, etc. can be readily detected, and a plant capability loss, etc. can be relieved in a short time. Moreover, at a model change or at the development of a new car type, a man-hour analysis can be made on the basis of the data of a close car type under the registration management, so that process organization of little loss can be performed in a short term.

By the way, the "constituent work CW (element work)" is a simple work in each process. The "process" is a unit in which one work can be completed. The "standardized man-hours" are standard (reference) man-hours (work done) in the constituent work CW (element work) or in each of conditions having been set for the constituent work CW (element work). The "man-hour information" is information about man-hours as has been obtained in such a way that the data of the standardized man-hours or the likes managed in each individual process unit are converted into a form (such as table or graph) effective for analyzing man-hours. The information can be outputted by various means such as screen display, file output and paper sheet output.

Besides, the man-hour management system is characterized by comprising a change history table for performing save management of work change contents in units of the processes; so that said man-hour output means outputs the man-hour information by being assigned data also from said change history table.

According to this man-hour management system, each time man-hours are changed by the alteration of a shape, the curtailment of a cost, or the like, the change of work contents on that occasion is managed along with the changed man-hours, and hence, the course in which the man-hours have been changed can be readily grasped. In a man-hour analysis at the development of a new car type, a model change, or the like, therefore, data can be diverted to a similar alteration in shape, a similar place of curtailed cost, or the like.

Further, the man-hour management system is characterized by comprising a timing graph data table for performing registration management of data of a timing graph, data being assigned to said timing graph data table from said main man-hour management table; so that said man-hour output means outputs the man-hour information by being assigned data also from said timing graph data table.

According to this man-hour management system, the wait time and working time of each constituent work CW (element work) and the start time of each constituent work CW (element work) are managed as timing graph data, so that the wait time of the constituent work CW (element work) can be readily detected. Therefore, a wasteful wait time can be shortened in a short time.

Alternatively, the man-hour management system is characterized by comprising a line name table for performing registration management of modes of lines which implement works; so that said main man-hour management table is assigned data also from said line name table.

According to this man-hour management system, the lines for implementing processes or constituent work CW (element work) are registered and managed, so that the line which is implementing the process or the constituent work CW (element work) can be readily referred to.

Further, the man-hour management system is characterized by comprising a series table for performing registration management of series and types associated with the series; so that said main man-hour management table is assigned data also from said series table.

According to this man-hour management system, the series and types are registered and managed, so that the series or type for which the process or constituent work CW (element work) is proceeding can be readily referred to.

Moreover, the man-hour management system is characterized by comprising a derivation table for performing registration management of derivatives associated with each of the series and the types; so that said main man-hour management table is assigned data also from said derivation table.

According to this man-hour management system, the derivatives associated with the series are registered and managed, so that the series to which any of the derivatives being handled belongs can readily referred to.

Besides, the man-hour management system is characterized by comprising a database in which the tables are stored; and series data backup means for extracting the data of said tables in series units as have become unnecessary, from said database, and for re-storing said data of said tables extracted in series units, in said database.

According to this man-hour management system, the data having become unnecessary can be extracted from the database, and the extracted data can be stored in the database again, so that the database can be efficiently utilized.

In addition, the man-hour management system is characterized in that the constituent work CW (element work) has its each movement classified into one of a main action, a supplemental action and a quasi action, and that standardized man-hours analyzed are set for said each movement.

According to this man-hour management system, the standardized man-hours are set on the basis of each of the movements refined from the constituent work CW (element work), so that the set standardized man-hours differ very little from real man-hours of the constituent work CW (element work) by individual workers.

BRIEF DESCRIPTION OF THE DRAWINGS

FIGS. 7A through 7C are diagrams for explaining constituent work CW (element work) condition management in the embodiment, in which FIG. 7A shows the relationship between a classification table for constituent work CW (element work) and conditions and a work constituent condition table, FIG. 7B shows a screen for setting a constituent work CW (element work) name, and FIG. 7C shows a screen for registering conditions in a constituent work CW (element work);

FIGS. 9A and 9B are diagrams for explaining standardized man-hour registration in the embodiment, in which FIG. 9A shows the relationship between the classification table for constituent work CW (element work) and conditions and the standardized man-hour table, while FIG. 9B shows a screen for registering standardized man-hour analysis contents and standardized man-hours;

FIGS. 10A and 10B are diagrams for explaining constituent name condition item maintenance in the embodiment, in which FIG. 10A shows the relationship between the classification table for constituent work CW (element work) and conditions and the work constituent condition table as well as the standardized man-hour table, while FIG. 10B shows a screen for editing constituent name condition items;

FIGS. 12A and 12B are diagrams for explaining line name management in the embodiment, in which FIG. 12A shows the relationship between the registration screen and line name table of the line name management and the main screen of main man-hour management, while FIG. 12B shows the data hierarchical structure of an automobile production line;

FIGS. 17A and 17B are diagrams for explaining a main man-hour management system (main man-hour management) in the embodiment, in which FIG. 17A shows the main screen of the main man-hour management system (main man-hour management), while FIG. 17B is a diagram for explaining the sheet invoking screen of the main man-hour management;

FIGS. 18A through 18F are diagrams for explaining the derivation setting of the main man-hour management in the embodiment, in which FIG. 18A shows the main screen of the main man-hour management, FIG. 18B shows Example 1 of a derivation display selection screen, FIG. 18C shows Example 2 of the derivation display selection screen, FIG. 18D shows Example 3 of the derivation display selection screen, FIG. 18E is a diagram for explaining the display level of constituent work CW (element work) items for the setting of the derivation display selection screen, and FIG. 18F shows the priority level of the displays of the constituent work CW (element work) items;

FIGS. 29A and 29B are diagrams for explaining timing graph management in the embodiment, in which FIG. 29A shows a timing graph screen, while FIG. 29B shows an input screen for timing graph data;

FIGS. 33A and 33B are diagrams for explaining a series data backup system in the embodiment, in which FIG. 33A shows the relations between a database and data to-be-backed-up, while FIG. 33B shows the classification of series data;

FIG. 34 shows the main screen of the series data backup system in the embodiment;

FIG. 36 shows the condition setting screen of the man-hour output system in the embodiment;

FIGS. 37A and 37B are diagrams for explaining timing graph outputs in the embodiment, in which FIG. 37A shows a main man-hour management screen, while FIG. 37B shows a timing graph screen;

FIG. 39 shows an output screen for net & loss man-hour aggregation table outputs in the embodiment;

FIG. 40 shows an output screen for individual-process specification aggregation table outputs in the embodiment;

FIG. 42A is a diagram showing losses involved within a basic time (man-hours), while

PREFERRED EMBODIMENT OF THE INVENTION

Figure 1:
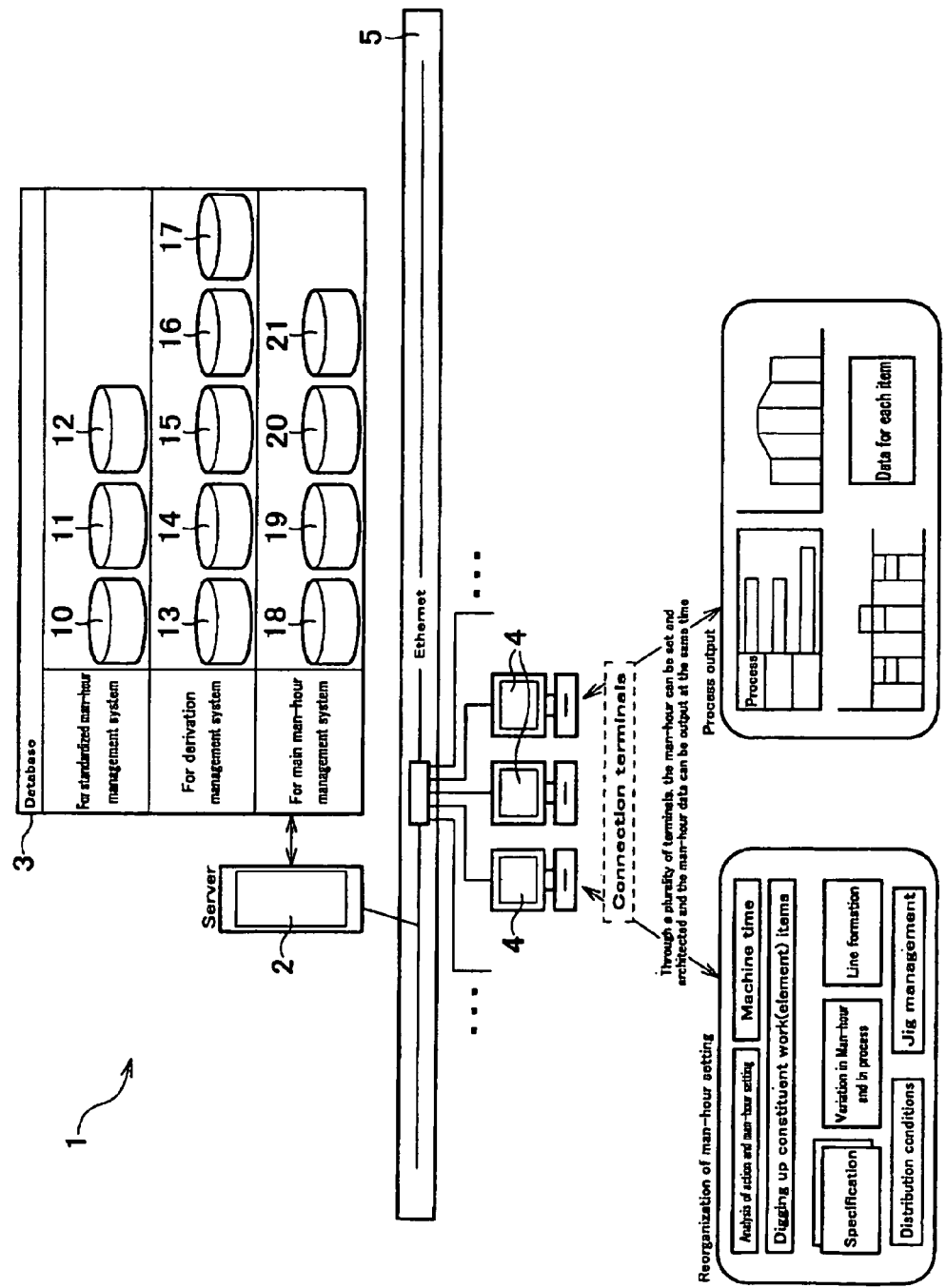
FIG. 1 is a diagram showing the general construction of a man-hour management system according to an embodiment of the present invention.

An embodiment of a man-hour management system according to the present invention will be described below with reference to the drawings.

With the man-hour management system according to the present invention, standardized man-hours for the walk of a worker are managed by a walk man-hour conversion table, a constituent work CW (element work) serving as a reference for managing standardized man-hours and conditions in the constituent work CW (element work) are managed by a work constituent condition table, and standardized man-hours for the constituent work CW (element work) or the respective conditions in the constituent work CW (element work) are managed by a standardized man-hour table. Besides, with the man-hour management system, in order to manage item data for the constituent work CW (element work) in each individual process unit, the standardized man-hours of every constituent work CW (element work) or every condition of the constituent work CW (element work) are managed by a main man-hour management table in each individual process unit on the basis of the walk man-hour conversion table, work constituent condition table and standardized man-hour table, while the names of processes are managed by a process name table. Further, with the man-hour management system, man-hour information can be outputted in each individual process unit on the basis of the main man-hour management table and process name table. In addition, with the man-hour management system, a plurality of production lines are managed by a line name table, a plurality of series are managed by a series table, and derivatives within the series are managed by a derivation table, while the data of the three tables are managed in each individual process unit by the main man-hour management table. Moreover, with the man-hour management system, the alteration history of the main man-hour management table is managed by a change history table, and the standardized man-hour information of the main man-hour management table is managed as time-series data by a timing graph data table. Therefore, the man-hour management system according to the present invention can analyze man-hours in each individual process unit.

In this embodiment, the man-hour management system according to the present invention shall be applied to a man-hour management system in automobile production. Further, in this embodiment, the field of welding will be mentioned as an example from within the automobile production. In case of automobiles, sorts of cars correspond to series, and each of the sorts of cars includes types of cars, such as sedan type, wagon type and hardtop type. Further, the same type of cars includes cars of 4WD and 2WD, AT and MT, right steering wheel and left steering wheel, etc., which correspond to derivatives. Besides, a large-scale automobile production factory is furnished with a plurality of production lines such as a first line and a second line, and line names are given in each individual work unit within the production lines.

Besides, in this embodiment, a unit which is the minimum unit of self-completion and in which a cost constitution can be grasped shall be defined as a "cost center". Besides, in this embodiment, work contents based on the cost center are set as a unit for managing man-hours. In the case of, for example, the welding in the automobile production, the cost center can be sorted into a front floor, a rear floor, a dashboard, a roof, a side panel, a floor subassembly, a roof subassembly, a front door, a rear door, a trunk tailgate, etc. That is, the cost center can be regarded as one line. Besides, the line is constructed of the aggregate of a plurality of processes being units in each of which one work can be completed. Further, each of the processes is constructed of the aggregate of a plurality of constituent work CW (element work) each of which is a simple work. Also, in this embodiment, man-hours in the case where a predetermined basic time is entirely expended on works shall be defined as "net man-hours", whereas those man-hours not expended on works which can occur within the basic time shall be defined as "loss man-hours". Incidentally, the "basic time" is a time period for which workers must work, and which is obtained by subtracting fixed idle times (such as a mealtime, a breathing time, a time for morning meeting, and a time for closing meeting) from compulsory hours (working hours) stipulated by a company.

By the way, in a case where the cost center is considered as one product, a line including a plurality of processes exists in order to finish up the product. The cost constitution is an index for ascertaining the appropriateness of a current production cost or finding out a clue to the realization of a still lower production cost, and it is obtained in such a way that line characteristics are grasped by calculating net man-hours and loss man-hours throughout the processes in the line.

Figure 42A:
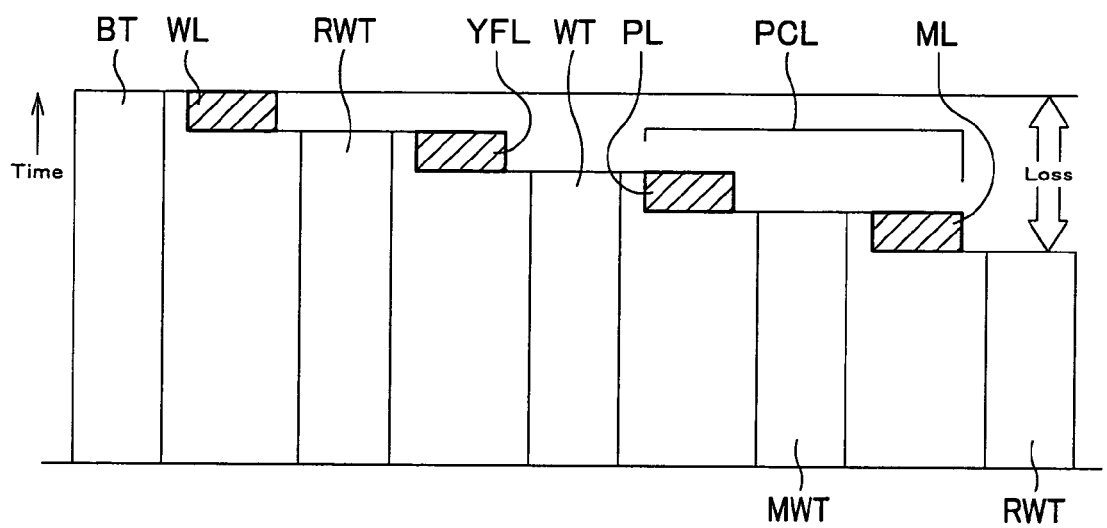
Figure 42B:
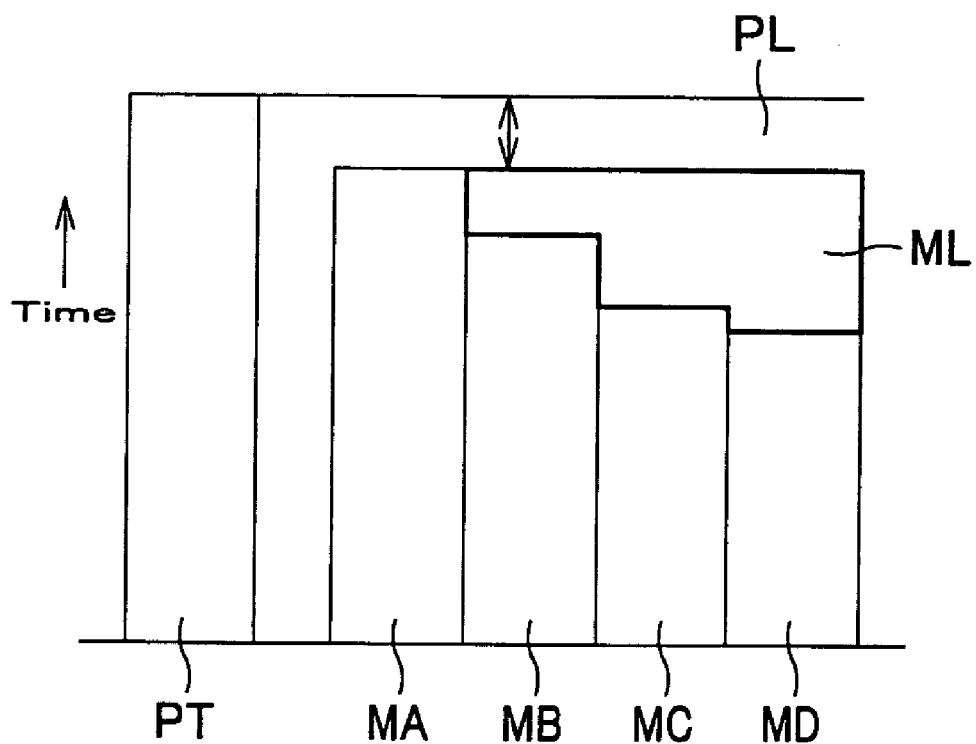
FIG. 42B is a diagram showing the relationship between a process organization loss as well as a man-hour difference loss and car types of different man-hours.

Here, the kinds of losses occurring within a basic time will be described with reference to FIGS. 42A and 42B. In FIG. 42A, the time (man-hours) is represented in a vertical direction, while the kinds of losses are listed in a lateral direction. In case of producing a product, a working loss WL, a quality yield loss YFL, a process organization loss PL and a man-hour difference loss ML occur relative to the basic time BT, and a real working time RWT, a working time WT, a maximum whole time (man-hours) MWT and a substantial whole time RWT are obtained by reducing the respective loss components from the basic time BT.

The real working time RWT is a time period based on the number of cars to-be-produced, that is, a time period required for really producing a set number of cars. More concretely, the real working time RWT is a time period (line tact set time) obtained in such a way that predicted idle times for a line trouble, the changeover of car types, the changeover and preparation of components, work starting safety checking, etc. are subtracted from the basic time BT. The working time WT is a time period based on the number of cars to-be-handed-over, that is, a time period required for producing the number of cars which are handed over to the next process as conforming articles among the cars produced in the real working time RWT. The maximum whole time MWT is a time period based on maximum man-hours, that is, a time period (work done) required in a case where only the car type (component) of the maximum man-hours is produced in a line of multiple car types. By the way, in a line of single car type, the maximum whole time MWT is a time period required for the production of the specific car type which is produced in this line. The substantial whole time RWT is a time period based on substantial whole man-hours, that is, a time period required for production in the case where a plurality of car types or a plurality of derivatives coexist in the set number of cars to-be-produced.

The working loss WL is a time period obtained by subtracting the real working time RWT from the basic time BT, and is a predicted idle time period within the basic time BT. The quality yield loss YFL is a time period obtained by subtracting the working time WT from the real working time RWT, that is, a time period required for producing the number of cars which are not handed over to the next process as nonconforming articles among the cars produced in the real working time RWT. The process organization loss PL is a time period obtained by subtracting the maximum whole time MWT from the working time WT. This loss PL occurs when car type and component man-hours are allocated to the tact set number of processes, and it especially signifies the difference between the tact and the man-hours of the maximum man-hour car type (component). The man-hour difference loss ML is a time period obtained by subtracting the substantial whole time RWT from the maximum whole time MWT, and it is the difference of man-hours between car types or between derivatives as occurs in case of producing at least two car types (or/and at least two derivatives) in one line. Incidentally, the process organization loss PL and the man-hour difference loss ML are termed a "plant capability loss PCL" when added up. The plant capability loss PCL is a time period which corresponds to a difference in the number of cars as occurs in case of producing the number of cars less than the production capability of a plant.

Incidentally, the "tact" is a production time period (man-hours) required for producing one car in anticipation of nonconforming articles. By way of example, in a case where 500 conforming cars are to be produced in 8 hours in anticipation of a nonconformity percentage of 5%, 525 cars must be produced in 8 hours. The tact in this case is about 55 seconds (=8×3600÷525), and processes are organized so that one car can be produced in about 55 seconds.

Here, the relationship between car types of different man-hours and the process organization loss PL as well as the man-hour difference loss ML will be described with reference to FIG. 42B. In FIG. 42B, the time (man-hours) is represented in a vertical direction, while the car types of different man-hours are listed in a lateral direction. Car type A is a car type of maximum man-hours, and man-hours required for production decrease in the order of car type B, car type C and car type D. The process organization loss PL is the difference between a practice tact PT and type-A man-hours MA. Besides, the man-hour difference loss ML is the differences between the type-A man-hours MA and type-B man-hours MB, type-C man-hours MC and type-D man-hours MD. Incidentally, the man-hour management system according to this embodiment is a system which is effective to analyze the process organization loss PL as well as the man-hour difference loss ML (plant capability loss PCL), and to relieve the losses.

Besides, in this embodiment, the magnitudes of standard (reference) man-hours (works done) are analyzed and grasped for respective constituent work CW (element work) in a cost center by employing a unified technique (for example, MOST [Maynard Operation Sequence Technique], thereby to set standardized times (man-hours). Incidentally, the analysis may well be made by employing any expedient other than the MOST, for example, an MTM [Method-time Measurement] technique or a stopwatch.

Incidentally, the "unified technique" is a technique for setting the standard times (man-hours) of works, and it includes the MTM technique, and the MOST evolved from the MTM technique. Since the MTM technique divides operations or movements finely (into, for example, "stretch", "grip", "carry" and "unhand"), it requires a long time for an analysis or measurement, and it requires a large number of man-hours for calculating the standard time of one work (for example, taking and positioning). With the MOST, a standard time is preset every constituent work CW (element work) (for example, the sum between "stretch an arm" and "grip" for a movement "take up", or the sum between "carry" and "unhand" for a movement "put"), and one simple work (for example, taking and positioning) can be easily evaluated by the sum between the standard times of constituent work CW (element work).

Figure 43:
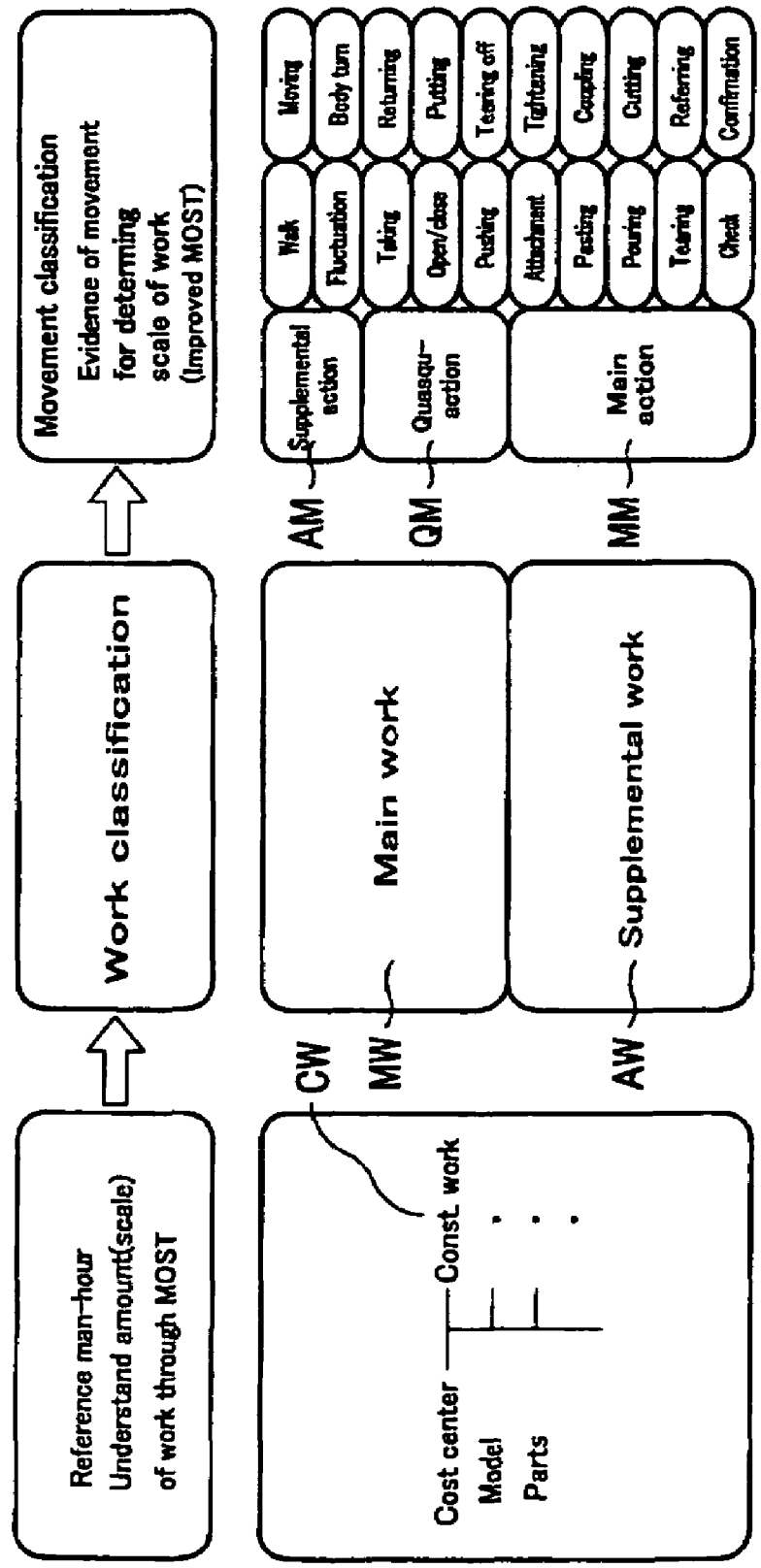
FIG. 43 is a diagram for explaining the refinement of a constituent work CW (element work) based on an improved MOST according to the embodiment.
Figure 44:
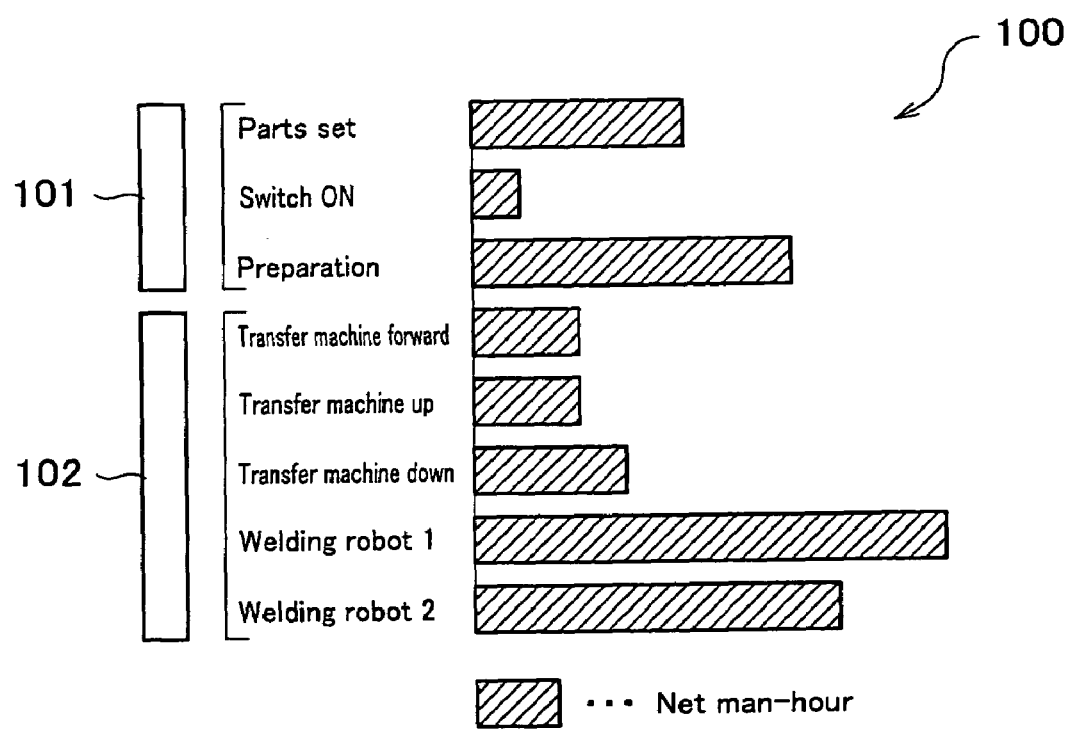
FIG. 44 is a graph showing net man-hours for respective works in a prior-art analysis.

Further, in this embodiment, a constituent work CW (element work) is refined and analyzed because reference man-hours cannot be satisfactorily analyzed and grasped with the unified technique. More specifically, in this embodiment as shown in FIG. 43, a constituent work CW (element work) is sorted into a main work MW or a supplementary movement SM in a work classification, and each of the main work MW and supplementary movement SM is refined into a main action MA, a supplemental action SA or a quasi action QA in a movement classification. Besides, the main action MA, supplemental action SA and quasi action QA are analyzed, and standardized man-hours are set for the respective movements. When, in this manner, the constituent work CW (element work) is classified into the movements so as to set the standardized man-hours therefore, the man-hours conform to the real movements by a worker and are highly reliable as standard (reference) man-hours (work done). Here in this embodiment, the technique by which the constituent work CW (element work) is refined and analyzed shall be called the "improved MOST". In the man-hour management system of this embodiment, the standardized man-hours obtained for the refined main action MA, supplemental action SA or quasi action QA by the work analysis of a car type to-be-mass-produced based on the improved MOST are stored as data.

The main work MW is one in the constituent work CW (element work). The supplementary movement SM is one which assists in the main work MW.

The main action MA is the basic movement in the main work MW or the supplementary movement SM. By way of example, it is a movement which recurs 100%, and which includes attachment, tightening, pasting, coupling, check and carrying. The supplemental action SA is one for establishing the main work MW or the supplementary movement SM, and it includes, for example, walk, moving, fluctuation and a body turn. The quasi action QA is a preparatory or rearrangement movement for the main action MA in a series of movements, and it includes, for example, taking, returning, opening or closing, putting, pressing, sending, tearing off, rotating and pushing a button.

Now, the general construction of a man-hour management system 1 will be described with reference to FIG. 1. The man-hour management system 1 is chiefly constructed of a server 2, a database 3, connection terminals 4, 4, 4, . . . , and an Ethernet 5.

The server 2 is one for sharing the database 3, and it is connected to the connection terminals 4, 4, 4, . . . through the Ethernet 5. Herein, the server 2 permits the connection terminals 4, 4, 4, . . . to read and write the data of various tables 10–21 stored in the database 3.

The database 3 includes a storage device such as hard disk, and stores therein the tables 10–21 which are utilized in the man-hour management system 1. Incidentally, the database 3 is managed by the server 2 and can be accessed through the Ethernet 5 by the connection terminals 4, 4, 4, . . . . The tables stored in the database 3 are the work constituent condition table 10, standardized man-hour table 11 and walk man-hour conversion table 12 for a standardized man-hour management system, the series table 13, line name table 14, derivation table 15, derivation format table 16 and derivation application table 17 for a derivation management system, and the main man-hour management table 18, process name table 19, change history table 20 and timing graph data table 21 for a main man-hour management system.

By the way, in this embodiment, the work constituent condition table 10 corresponds to a "work constituent condition table" mentioned in the appended claims, the standardized man-hour table 11 corresponds to a "standardized man-hour table" mentioned in the same, the walk man-hour conversion table 12 corresponds to a "walk man-hour conversion table" mentioned in the same, the series table 13 corresponds to a "series table" mentioned in the same, the line name table 14 corresponds to a "line name table" mentioned in the same, the derivation table 15 corresponds to a "derivation table" mentioned in the same, the derivation format table 16 corresponds to a "derivation format table" mentioned in the same, the derivation application table 17 corresponds to a "derivation application table" mentioned in the same, the main man-hour management table 18 corresponds to a "main man-hour management table" mentioned in the same, the process name table 19 corresponds to a "process name table" mentioned in the same, the change history table 20 corresponds to a "change history table"

mentioned in the same, and the timing graph data table 21 corresponds to a "timing graph data table" mentioned in the same.

Each of the connection terminals 4, 4, 4, . . . is a terminal for executing the applications of the man-hour management system 1, and an electronic computer such as personal computer is employed therefor. Although not shown in detail, each of the connection terminals 4, 4, 4, . . . includes the computer proper, a display, a keyboard and a hard disk drive. If necessary, it includes a compact disk drive, a floppy disk drive, an audio output device, a printer etc. Further, each of the connection terminals 4, 4, 4, . . . stores in its hard disk, application programs for executing the applications of the man-hour management system 1. In addition, each of the connection terminals 4, 4, 4, . . . shall have a multiwindow environment as an OS [Operating System]. Besides, each of the connection terminals 4, 4, 4, . . . executes the applications of the man-hour management system 1 in accordance with the operations of a user, thereby to register/reorganize data in the tables 10–21 or to output man-hour information on the basis of the data of the tables 10–21.

The Ethernet 5 is a local area network of bus type laid in an automobile production factory. The server 2 is connected to the Ethernet 5, and the database 3, the connection terminals 4, 4, 4, . . . , etc. are connected thereto through the server 2.

Figure 2:
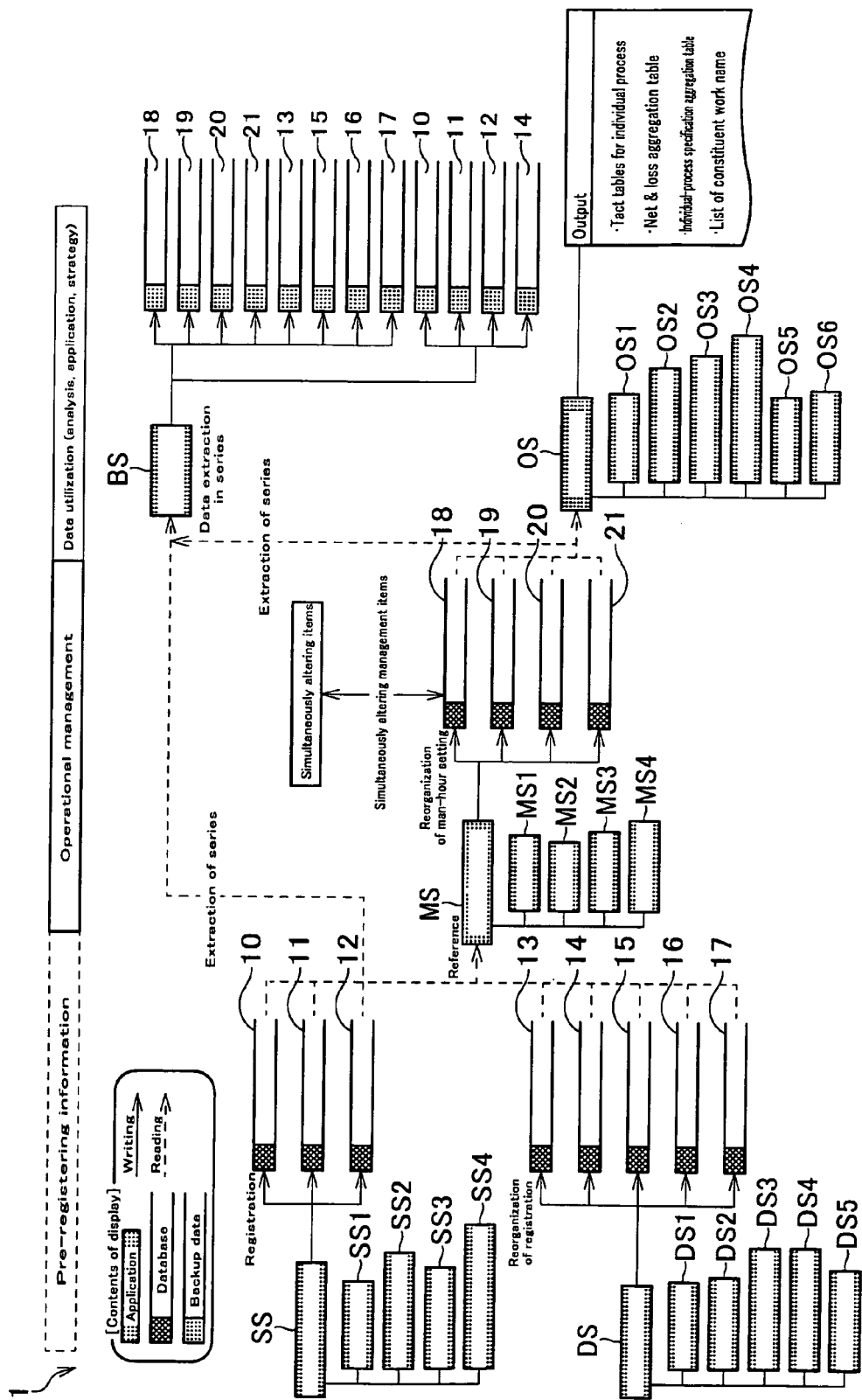
FIG. 2 is a diagram showing the system architecture of the man-hour management system according to the embodiment.

Next, the system architecture of the man-hour management system 1 will be described with reference to FIG. 2. The man-hour management system 1 includes a standardized man-hour management system SS, a derivation management system DS, a main man-hour management system MS, a series data backup system BS and a man-hour output system OS. The standardized man-hour management system SS and the derivation management system DS are systems for pre-registering/pre-reorganizing information necessary for a man-hour analysis. The main man-hour management system MS is a system for performing the operational management of the pre-registered information about man-hours. The series data backup system BS and the man-hour output system OS are systems for making the most of data about man-hours, that is, for outputting the data for the man-hour analysis, backing up the data, utilizing the man-hour information for a minor change or a model change, and so forth.

The standardized man-hour management system SS is a system which performs the registration management of the basic data of the preceding information of the man-hour management system 1 concerning man-hours, and which includes walk man-hour management SS1, constituent work CW (element work) condition management SS2, standardized man-hour registration SS3 and constituent name condition item maintenance SS4. The application programs of the standardized man-hour management system SS include a standardized man-hour management system program as a main program, and a walk man-hour management program, a constituent work CW (element work) condition management program, a standardized man-hour registration program and a constituent name condition item maintenance program as subprograms. Incidentally, these programs are stored in each of the hard disks of the server 2 and connection terminals 4, 4, 4, . . . . Besides, the applications of the standardized man-hour management system SS are executed in such a way that the respectively corresponding programs are loaded into each of the connection terminals 4, 4, 4, . . . in accordance with the user's operation. Further, the standardized man-hour management system SS registers data in the work constituent condition table 10, standardized man-hour table 11 and walk man-hour conversion table 12 through the server 2 in accordance with the executions of the applications. By the way, the standardized man-hour management system SS is constructed of the standardized man-hour management system program, walk man-hour management program, constituent work CW (element work) condition management program, standardized man-hour registration program and constituent name condition item maintenance program; the server 2 and connection terminals 4, 4, 4, . . . ; the work constituent condition table 10, standardized man-hour table 11 and walk man-hour conversion table 12; and so forth.

The derivation management system DS is a system which performs the registration management/reorganization management of data corresponding to multifarious variations (such as the data of a plurality of production lines, those of a plurality of series, those of a plurality of car types, and those of a plurality of derivatives), as the preceding information of the man-hour management system 1 concerning man-hours, and which includes line name management DS1, series registration management DS2, derivation classification registration management DS3, derivation format registration management DS4 and derivation code table management DS5. The application programs of the derivation management system DS include a derivation management system program as a main program, and a line name management program, a series registration management program, a derivation classification registration management program, a derivation format registration management program and a derivation code table management program as subprograms. Incidentally, these programs are stored in each of the hard disks of the server 2 and connection terminals 4, 4, 4, . . . . Besides, the applications of the derivation management system DS are executed in such a way that the respectively corresponding programs are loaded into each of the connection terminals 4, 4, 4, . . . in accordance with the user's operation. Further, the derivation management system DS registers/reorganizes data in the series table 13, line name table 14, derivation table 15, derivation format table 16 and derivation application table 17 through the server 2 in accordance with the executions of the applications. By the way, the derivation management system DS is constructed of the derivation management system program, line name management program, series registration management program, derivation classification registration management program, derivation format registration management program and derivation code table management program; the server 2 and connection terminals 4, 4, 4, . . . ; and the series table 13, line name table 14, derivation table 15, derivation format table 16 and derivation application table 17.

The main man-hour management system MS is a system which performs the management, aggregation, display management, etc. of man-hours on the basis of the preceding information of the man-hour management system 1 concerning man-hours, and which includes main man-hour management MS1, process name management MS2, change history management MS3 and timing graph management MS4. The application programs of the main man-hour management system MS include a main man-hour management system program as a main program, and a main man-hour management program, a process name management program, a change history management program and a timing graph management program as subprograms. Incidentally, these programs are stored in each of the hard disks of the server 2 and connection terminals 4, 4, 4, . . . . Besides, the applications of the main man-hour management system MS are executed in such a way that the respectively corresponding programs are loaded into each of the connection terminals 4, 4, 4, . . . in accordance with the user's operation. Further, the main man-hour management system MS registers/reorganizes data in the main man-hour management table 18, process name table 19, change history table 20 and timing graph data table 21 through the server 2 in accordance with the executions of the applications. By the way, the main man-hour management system MS is constructed of the main man-hour management system program, main man-hour management program, process name management program, change history management program and timing graph management program; the server 2 and connection terminals 4, 4, 4, . . . ; the main man-hour management table 18, process name table 19, change history table 20 and timing graph data table 21;and so forth.

The series data backup system BS is a system by which the tables 10–21 stored in the database 3 are backed up in each individual series unit. This series data backup system BS includes a series data backup system program as its application program. Incidentally, this program is stored in each of the hard disks of the server 2 and connection terminals 4, 4, 4, . . . . Besides, the application of the series data backup system BS is executed in such a way that the program is loaded into each of the connection terminals 4, 4, 4, . . . in accordance with the user's operation. Further, in accordance with the execution of the application, the series data backup system BS stores the data of the tables 10–21 from the database 3 in a floppy disk, a hard disk or the like through the server 2 in each individual series unit, and it also restores in the database 3 data in each individual series unit backed up in a floppy disk, a hard disk or the like. The series data backup system BS is constructed of the series data backup system program; the server 2 and connection terminals 4, 4, 4, . . . ; and so forth.

By the way, in this embodiment, the series data backup system BS corresponds to "series data backup means" mentioned in the appended claims.

The man-hour output system OS is a system which outputs the man-hour information of the man-hour management system 1 for making a man-hour analysis, and which includes timing graph output OS1, process balancing table output OS2, net & loss aggregation table output OS3, individual-process specification aggregation table output OS4, history management table output OS5 and main man-hour management output OS6. The application programs of the man-hour output system OS include a man-hour output system program as a main program, and a timing graph output program, a process balancing table output program, a net & loss aggregation table output program, an individual-process specification aggregation table output program, a history management table output program and a main man-hour management output program as subprograms. Incidentally, these programs are stored in each of the hard disks of the server 2 and connection terminals 4, 4, 4, . . . . Besides, the applications of the man-hour output system OS are executed in such a way that the respectively corresponding programs are loaded into each of the connection terminals 4, 4, 4, . . . in accordance with the user's operation. Further, in accordance with the executions of the applications, the man-hour output system OS converts output data on the basis of the data of the tables 10–21 of the database 3, thereby to deliver a display output to the display of each of the connection terminals 4, 4, 4, . . . , a paper sheet output to a printer, a file output to a floppy disk or the like, and so forth. Such output data are utilized for finding a clue to diminution in the number of man-hours on the basis of the clarification of a working time as well as a wait time and the clarification of net man-hours as well as loss man-hours, for organizing processes for a minor change, a full model change or a new model change, for verifying the balance of the process organization as well as a process capability, and so forth. By the way, the man-hour output system OS is constructed of the man-hour output system program, timing graph output program, process balancing table output program, net & loss aggregation table output program, individual-process specification aggregation table output program, history management table output program and main man-hour management output program; the server 2 and connection terminals 4, 4, 4, . . . ; and so forth.

In this embodiment, the man-hour output system OS corresponds to "man-hour output means" mentioned in the appended claims.

Figure 3:
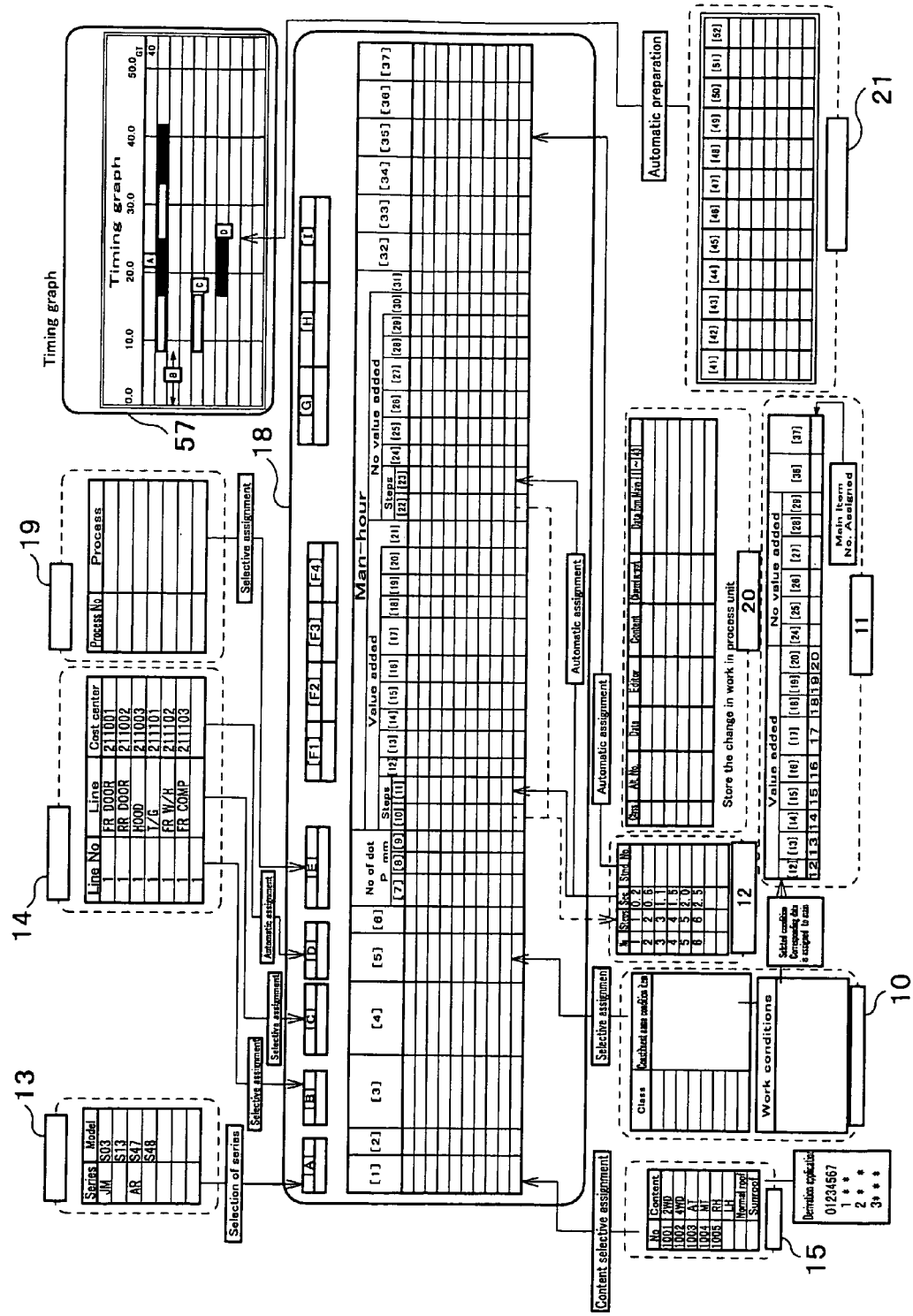
FIG. 3 is a diagram showing the relations of a main man-hour management table with various other tables in the embodiment.

Here, the main man-hour management table 18 will be described with reference to FIG. 3. This table 18 is a basic table in the case of making a man-hour analysis by the man-hour management system 1, and it manages item data for constituent work CW (element work) in process units.

The main man-hour management table 18 is selectively assigned or automatically assigned the pre-registered data of the work constituent condition table 10, standardized man-hour table 11, walk man-hour conversion table 12, series table 13, line name table 14, derivation table 15, derivation format table 16 and derivation application table 17, and the data of the process name table 19, whereby data are registered/reorganized. Besides, the main man-hour management table 18 manages information about man-hours which are necessary for making a man-hour analysis in process units managed by the process name table 19. Further, the main man-hour management table 18 offers man-hour information to the man-hour output system OS in order to output the man-hour information necessary for the man-hour analysis.

The data which are under registration management/reorganization management by the main man-hour management table 18 include series [A], line No [B], line name [C], cost center [D], process name [E], derivation display selection [F], total man-hours [G], aggregation of man-hours having values added [H] and aggregation of man-hours having no values added [I]; derivation [1], procedure [2], constituent work CW (element work) (what) [3], constituent work CW (element work) (where) [4], constituent work CW (element work) (how) [5], frequency [6], SPOT [7] indicating the number of dots, and MIG [8] and sealer [9]; number of steps [10], time of steps in seconds [11], waist [12], taking and putting [13], setting [14], pushing a button [15], fluctuating time [16], positioning [17], personal work [18], equipmental work [19], carrying [20] and subtotal [21] in the presence of the value-added of man-hours; number of steps [22], time of steps in seconds [23], waist [24], taking and putting [25], fluctuating time [26], positioning [27], personal work [28], wait [29], carrying [20] and subtotal [30] in the absence of the value-added of man-hours; total of the man-hours [31]; and TARGET part No [32], DWG No [33], remarks [34], standard walk [35], standard work [36] and standard work [37]. The data in the main man-hour management table 18 are stored in process units, and the stored data corresponding to each process shall be called a "worksheet". Incidentally, since a plurality of constituent work CW (element work) are included in one process, constituent work CW (element work) items [1]–[37] are respectively set for each constituent work CW (element work) in one worksheet. By the way, the data of the main man-hour management table 18 explained in this embodiment are ones in the field of welding, and the contents of data are different in the other fields of assemblage, painting etc.

Figure 4:
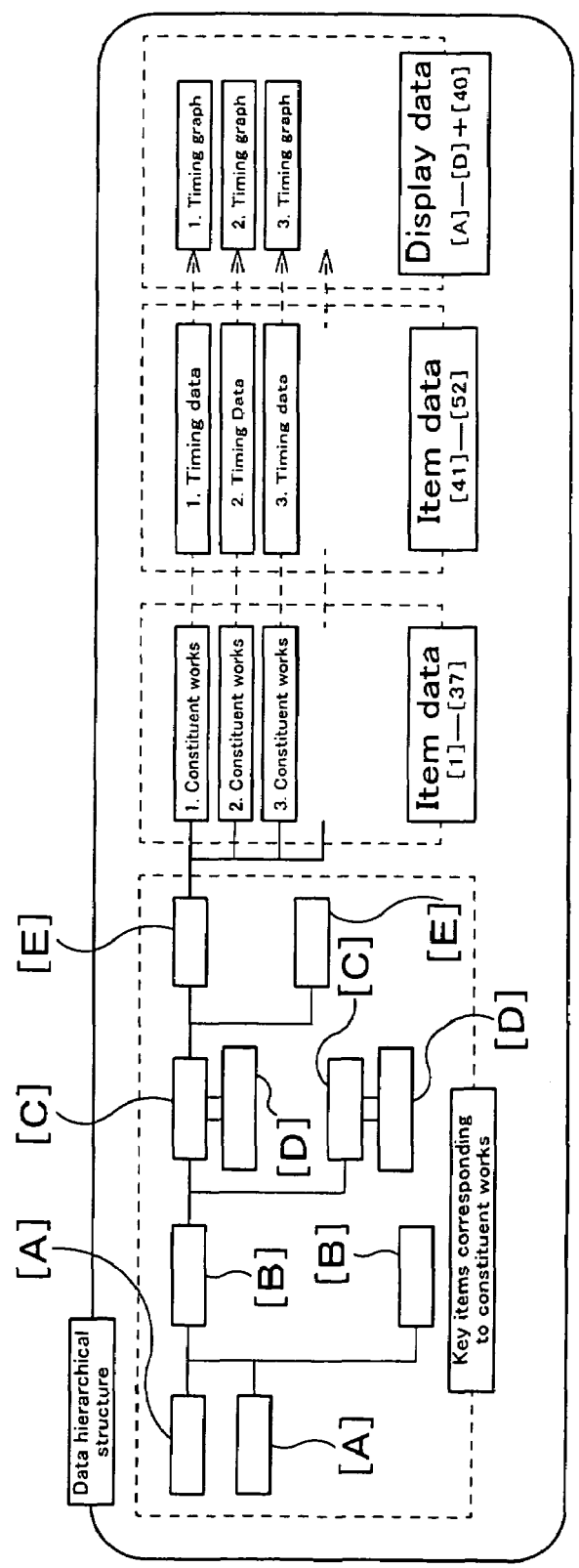
FIG. 4 is a diagram showing the data hierarchical structure of the man-hour management system in the embodiment.

Here, the hierarchical structure of the data of the man-hour management system 1 will be described with reference to FIG. 4. The man-hour management system 1 forms the hierarchical structure with an apex at a plurality of or a single series (car type) [A]. Besides, since a plurality of production lines exist in an automobile production factory, a plurality of line Nos [B] are constructed as the lower layer of the series [A]. Incidentally, in case of a single production line, there is only one line No [B]. Further, since each production line is constructed of a plurality of lines each corresponding to a cost center, a plurality of line names [C] (cost centers [D]) are constructed as the lower layer of the line No [B]. Incidentally, in a case where the production line has only one cost center, there is only one line name [C]. Subsequently, since each cost center is constructed of a plurality of processes, a plurality of process names [E] are constructed as the lower layer of the line No [C]. Incidentally, in a case where the cost center has only one process, there is only one process name [E]. By the way, the main man-hour management table 18 has each worksheet invoked using the series [A], line No [B], line name [C] (cost center [D]) and process name [E] as keys.

Further, since each process is constructed of a plurality of constituent work CW (element work), item data [1]–[37] are respectively registered and managed for the plurality of constituent work CW (element work) as the lower layer of the process name. By the way, since the timing graph data table 21 is set on the basis of the main man-hour management table 18, timing graph data [41]–[51] are respectively registered and managed for the constituent work CW (element work) items [1]–[37]. Besides, a timing graph screen 57 (FIG. 29A), etc. are outputted on the basis of the timing graph data [41]–[51].

A series for which work man-hours are managed, is set as the series [A]. The name/names of series registered in the series table 13 (for example, a name "JM" or "AR", or names "JM-S03" and "JM-S13" in the presence of a plurality of car types) is/are selected and set as the series [A].

A production line for which work man-hours are managed, is set as the line No [B]. A line No registered in the line name table 14 (for example, "line 1" or "line 2") is selected and set as the line No [B].

The name of a line in which a work implemented, is set as the line name [C].

A line name registered in the line name table 14 (for example, "FRDOOR" or "RRDOOR") is selected and set as the line name [C].

A cost center as to which a work is proceeding, is set as the cost center [D]. A cost center No registered in the line name table 14 (for example, "211001" or "211002") is selected and set as the cost center [D].

The name of a process for which a work is proceeding, is set as the process name [E]. A process name registered in the process name table 19 is selected and set as the process name [E].

A code for effecting display selection in order to assign a derivation code to the derivation [1], is set as the derivation display selection [F]. The code name of a derivative registered in the derivation table 15 (for example, "All", "RH", "LH", "2WD" or "4WD") is selected and set as the derivation display selection [F].

The total of standardized man-hours in worksheet (process) units is set as the total man-hours [G]. The total man-hours [G] is the total of the aggregation of man-hours having values added [H] and the aggregation of man-hours having no values added [I]. By the way, in a case where the aggregation of man-hours having values added [H] or/and the aggregation of man-hours having no values added [I] have been altered, the total man-hours [G] is re-computed in real time.

The total of the subtotals [21] in worksheet (process) units is set as the aggregation of man-hours having values added [H]. By the way, the subtotals [21] exist in the number of constituent work CW (element work) within one worksheet. Incidentally, the "man-hours having values added" are man-hours which are directly contributive to the production of a product.

The total of the subtotals [30] in worksheet (process) units is set as the aggregation of man-hours having no values added [I]. By the way, the subtotals [30] exist in the number of constituent work CW (element work) within one worksheet. Incidentally, the "man-hours having no values added" are man-hours for rearrangement and wait, and they include wait man-hours and loss man-hours.

Any of classified derivatives for which constituent work CW (element work) occur, is set as the derivation [1]. Any of code names registered in the derivation table (for example, "RH", "LH", "AT", "MT", "2WD", "4WD", "normal roof" or "sunroof") is selected and set as the derivation [1]. By the way, the derivation code selected by the derivation selection [F] is assigned to the derivation [1].

The sequence of works in a process is set as the procedure [2].

The name of a component and the name of a work forming a constituent work CW (element work), are set as the constituent work CW (element work) (what) [3].

The name of a place in which a work is implemented, is set as the constituent work CW (element work) (where) [4].

A constituent work CW (element work) name for an individual work item is set as the constituent work CW (element work) (how) [5]. Any of constituent work CW (element work) names registered in the work constituent condition table 10 (for example, "spot welding" or "mig welding") is selected and registered as the constituent work CW (element work) (how) [5].

The number of times which the same work is repeated, is set as the frequency [6].

The number of spots is set as the SPOT [7]. The size (welding length) of a mig is set as the MIG [8]. The size of a sealer is set as the sealer [9]. By the way, since most of works in welding are spot welding, mig welding and sealer coating, the number of dots is important for analyzing man-hours in the field of welding, and it is therefore set. Incidentally, "one dot" signifies that the spot welding is implemented one time.

Set as the number of steps [10] is the number of steps which a worker requires since his/her start of walk or moving to a destination till his/her arrival thereat in order to implement a work. The standardized man-hours (time value) of the walk is set as the time of steps in seconds [11]. The time of steps in seconds [11] is automatically set by being assigned standardized man-hours registered in the walk man-hour conversion table 12, with the number of steps [10] as a key.

The standardized man-hours (time value) of the movement of bending and turning a worker's waist are set as the waist [12]. Set as the taking and putting [13] are the standardized man-hours (time value) of the work of taking and putting a workpiece, a portable spot welding machine or a clamping tool. Set as the setting [14] are the standardized man-hours (time value) of the work of clamping the workpiece or confronting the workpiece to the portable spot welding machine or the clamping tool. The standardized man-hours (time value) of the work of pushing a switch are set as the pushing a button [15]. Set as the fluctuating time [16] are standardized man-hours (time value) which correspond to a welding time based on spot welding or mig welding, the coating time of a sealer, and a clamping time for a bolt and a nut. The standardized man-hours (time value) of the work of positioning the workpiece are set as the positioning [17]. The standardized man-hours (time value) of a personal work are set as the personal work [18]. The standardized man-hours (time value) of an equipmental (robot) work are set as the equipmental work [19]. The standardized man-hours (time value) of the work of carrying the workpiece are set as the carrying [20]. Incidentally, the items [12]–[20] in the "man-hours having values added" are automatically set by being assigned standardized man-hours registered in the standardized man-hour table 11, with keys being the constituent work CW (element work) or the conditions thereof in the case of the constituent work CW (element work) name setting of the constituent work CW (element work) (how) [5].

The total of the standardized man-hours of the works having values added is set in constituent work CW (element work) units as the subtotal [21]. This subtotal [21] is the total of the standardized man-hours of the items [11]–[20] in the "man-hours having values added". By the way, in a case where the standardized man-hours of the items [11]–[20] in the "man-hours having values added" have been altered, the subtotal [21] is re-computed in real time.

Set as the number of steps [22] is the number of steps which a worker requires since his/her start of walk or moving to a destination till his/her arrival thereat in order to implement a work. The standardized man-hours (time value) of the walk is set as the time of steps in seconds [23]. The time of steps in seconds [23] is automatically set by being assigned standardized man-hours registered in the walk man-hour conversion table 12, with the number of steps [22] as a key.

The standardized man-hours (time value) of the movement of bending and turning a worker's waist are set as the waist [24]. Set as the taking and putting [25] are the standardized man-hours (time value) of the work of taking and putting a workpiece, a portable spot welding machine or a clamping tool. Set as the fluctuating time [26] are standardized man-hours (time value) which correspond to a welding time based on spot welding or mig welding, the coating time of a sealer, and a clamping time for a bolt and a nut. The standardized man-hours (time value) of the work of positioning the workpiece are set as the positioning [27]. The standardized man-hours (time value) of a personal work are set as the personal work [28]. Standardized man-hours (time value) corresponding to a personal or equipmental standby time are set as the wait [29]. Incidentally, the items [24]–[29] in the "man-hours having no values added" are automatically set by being assigned standardized man-hours registered in the standardized man-hour table 11, with keys being the constituent work CW (element work) or the conditions thereof in the case of the constituent work CW (element work) name setting of the constituent work CW (element work) (how) [5].

The total of the standardized man-hours of the works having no values added is set in constituent work CW (element work) units as the subtotal [30]. This subtotal [30] is the total of the standardized man-hours of the items [23]–[29] in the "man-hours having no values added". By the way, in a case where the standardized man-hours of the items [23]–[29] in the "man-hours having no values added" have been altered, the subtotal [30] is re-computed in real time.

The total of standardized man-hours in constituent work CW (element work) units is set as the total [31]. This total [31] is the sum between the subtotal [21] of the man-hours having values added and the subtotal [30] of the man-hours having no values added. By the way, in a case where the value/values of the subtotal [21] of the man-hours having values added or/and the subtotal [30] of the man-hours having no values added has/have been altered, the total [31] is recomputed in real time.

A part No (main, type, class) is inputted to and set as the TARGET part No [32].

The main No of the part of each constituent work CW (element work) is inputted to and set as the DWG No [33].

Remarks on each constituent work CW (element work) are inputted to and set as the remarks [34].

Set as the standard walk [35] is a standardized material No which is assigned the standardized man-hours set in the time of steps in seconds [11] or the time of steps in seconds [23]. The standard walk [35] is automatically set by being assigned the standardized material No registered in the walk man-hour conversion table 12, with the time of steps in seconds [11] or the time of steps in seconds [23] as a key.

Set as the standard work [36] is a standardized material No which is assigned the standardized man-hours set in the items [12]–[20] in the "man-hours having values added". Set as the standard work [37] is a standardized material No which is assigned the standardized man-hours set in the items [24]–[29] in the "man-hours having no values added". The standard work [36] or [37] is automatically set by being assigned the standardized material No registered in the standardized man-hour table 11, with a key being the constituent work CW (element work) or the conditions thereof in the case of the constituent work CW (element work) name setting of the constituent work CW (element work) (how) [5].

Also, there will be described the timing graph data table 21 which is set on the basis of the main man-hour management table 18. Data which are set in the timing graph data table 21 are S. T [41], wait 1 [42], working or operation 1 [43], wait 2 [44], working 2 [45], wait 3 [46], working 3 [47], wait 4 [48], working 4 [49], wait 5 [50], working 5 [51] and total [52].

The start time of a timing graph for each constituent work CW (element work) is set as the S. T [41]. This S. T [41] is automatically set by being assigned the total [52] of an upper line.

If wait times are involved in the works of the items [11]–[20] of the "man-hours having values added" in the constituent work CW (element work), they are respectively set as the wait 1 [42]–wait 5 [50]. Accordingly, although only the five setting columns of the wait 1 [42]–wait 5 [50] are indicated as the wait times, setting columns increase as wait 6, . . . in the presence of six or more wait times. Besides, in the presence of four or less wait times, "0" (blank) is set in one or more of the setting columns of the wait 1 [42]–wait 5 [50]. These waits 1 [42]–5 [50] are respectively set by measuring wait times in the movements of the items [11]–[20]. Incidentally, the wait [29] of the main man-hour management table 18 corresponds to the total of the wait 1 [42]–wait 5 [50].

The working times of the items [11]–[20] of the "man-hours having values added" in the constituent work CW (element work) are respectively set as the working 1 [43] –working 5 [51]. Accordingly, although only the five setting columns of the working 1 [43]–working 5 [51] are indicated as the working times, setting columns increase as working 6, . . . in the presence of six or more working times. Besides, in the presence of four or less working times, "0" (blank) is set in one or more of the setting columns of the working 1 [43]–working 5 [51]. These workings 1 [43]–5 [51] are automatically set by being assigned the working times of the items [11]–[20].

Set as the total [52] is the total of the start time and the working times, including the wait times, of the "works having values added" of the constituent work CW (element work). That is, it is the total of the S. T [41], the wait 1 [42]–wait 5 [50] and the working 1 [43]–working 5 [51]. By the way, in a case where the value/values of the S. T [41], wait 1 [42]–wait 5 [50] or/and working 1 [43]–working 5 [51] have been altered, the total [52] is re-computed in real time.

Next, the standardized man-hour management system SS will be described with reference to FIG. 5 through FIG. 10B. Using the improved MOST, the standardized man-hour management system SS refines each of the constituent work CW (element work) and sets standardized man-hours for the constituent work CW (element work) so as to register them beforehand.

Figure 5:
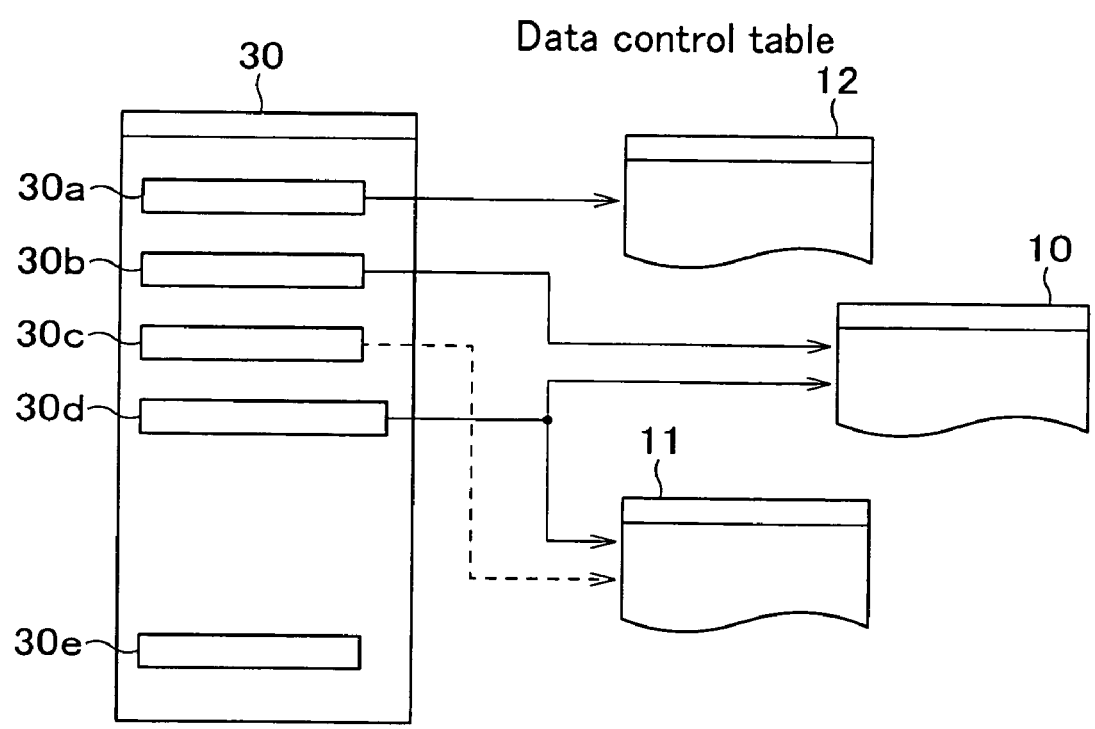
FIG. 5 shows the menu screen of a standardized man-hour management system in the embodiment.

The standardized man-hour management system SS is such that, when a standardized man-hour management system starting icon (not shown) indicated on the display of the connection terminal 4 is clicked by a user, a standardized man-hour management system program is loaded into the RAM of the connection terminal 4 and is run by the CPU thereof. Then, the menu screen 30 of the standardized man-hour management system SS as shown in FIG. 5 is indicated on the display of the connection terminal 4.

Displayed on the menu screen 30 are a selection button 30a for the walk man-hour management SS1, a selection button 30b for the constituent work CW (element work) condition management SS2, a selection button 30c for the standardized man-hour registration SS3, a selection button 30d for the constituent name condition item maintenance SS4, and a quit button 30e. Herein, when the user clicks any of the selection buttons 30a–30d, a corresponding application is executed, and when he/she clicks the quit button 30e, the application of the standardized man-hour management system SS is ended to erase the menu screen 30 from the display of the connection terminal 4.

Figure 6:
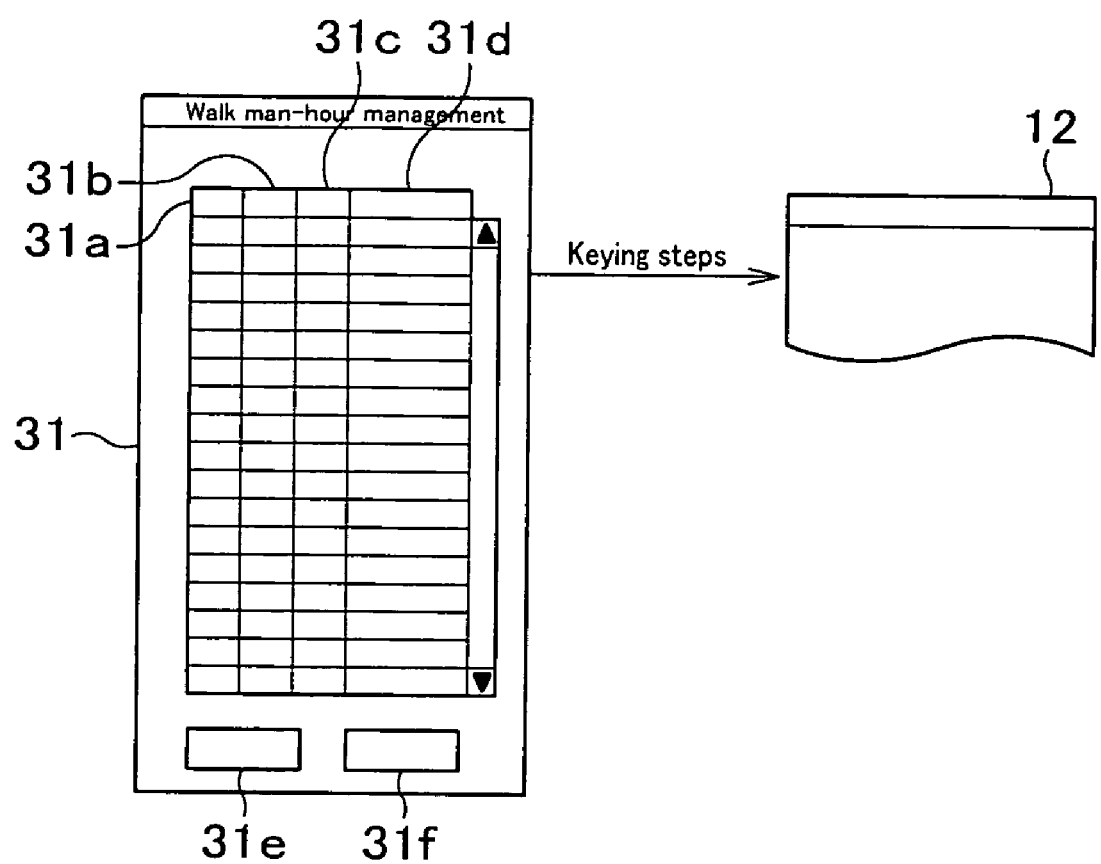
FIG. 6 shows the registration screen of walk man-hour management in the embodiment.
Figure 8:
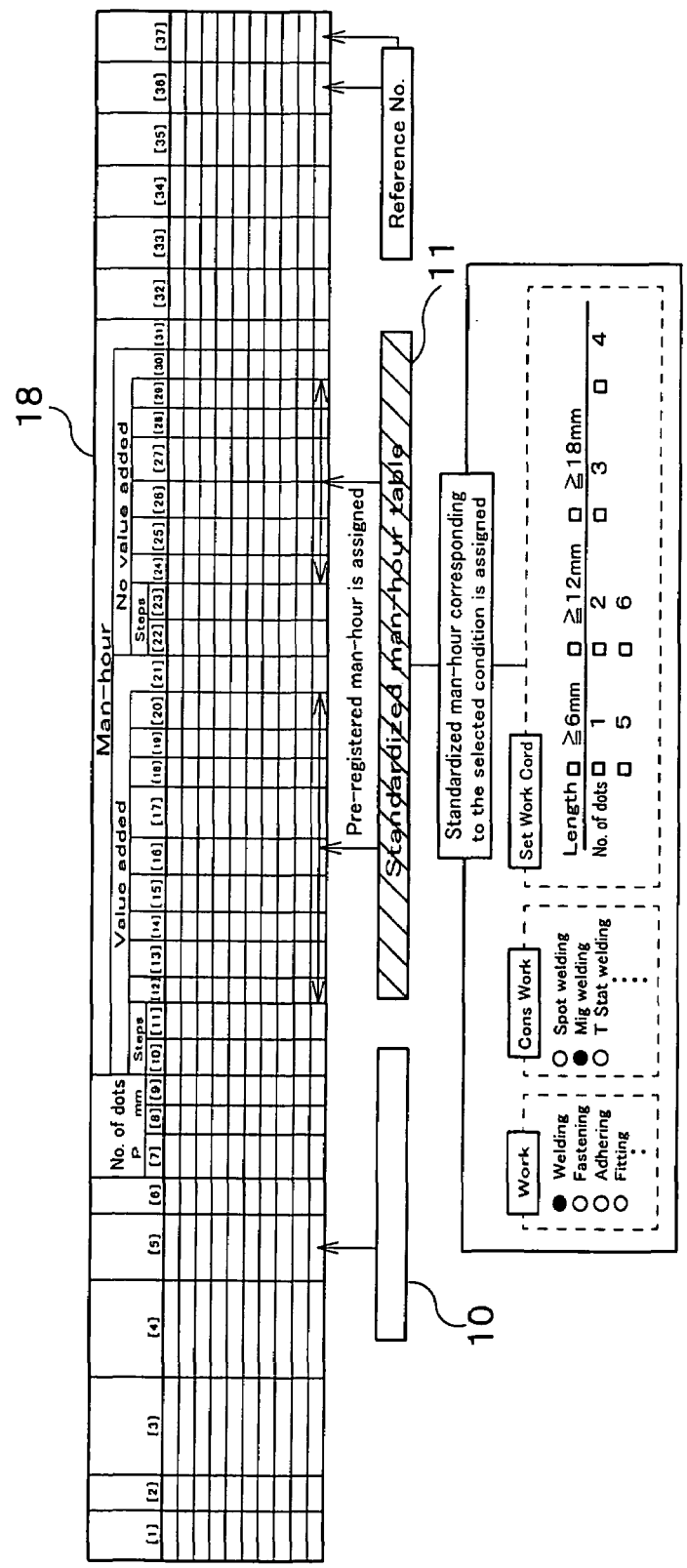
FIG. 8 is a diagram showing the relationship between the main man-hour management table and the work constituent condition table as well as a standardized man-hour table in the embodiment.

Next, the walk man-hour management SS1 will be described with reference to FIG. 5 and FIG. 6. The walk man-hour management SS1 registers and manages the standardized man-hours (walk man-hours or walk time) of a walk region generated by a work, and it registers and manages data by the walk man-hour conversion table 12. Walk data for use in the main man-hour management system MS are registered in the walk man-hour conversion table 12 beforehand, whereby the automatic assignment of the standardized man-hours of walk is permitted. The data which are registered and managed correspond to the numbers of steps [10], [22] and the times of steps in seconds [11], [23] in the main man-hour management table 18. The numbers of steps [10], [22] and the times of steps in seconds [11], [23] are previously measured using the improved MOST, and are registered in the walk man-hour conversion table 12. Incidentally, the numbers of steps [10], [22] and the times of steps in seconds [11], [23] correspond to the supplemental actions of main works.

The walk man-hour management SS1 is such that, when the selection button 30a of the menu screen 30 indicated on the display of the connection terminal 4 is clicked by the user, a walk man-hour management program is loaded into the RAM of the connection terminal 4 and is run by the CPU thereof. Then, the registration screen 31 of the walk man-hour management SS1 as shown in FIG. 6 is indicated on the display of the connection terminal 4. At the start-up of the registration screen 31, data already registered in the walk man-hour conversion table 12 are read out and are displayed on the registration screen 31. Herein, the data of the walk man-hour conversion table 12 are the numbers of steps, the times of steps in seconds, and the standardized material Nos. Incidentally, the standardized material No is obtained by encoding the number of seconds expended per number of steps measured using the improved MOST. On the registration screen 31, accordingly, a data No column 31a, a number-of-steps column 31b, a number-of-seconds column 31c and a standardized material No column 31d are arrayed and displayed in correspondence with the data of the walk man-hour conversion table 12.

In case of registering the number of steps, the time of steps in seconds, and the standardized material No, the user inputs numerical values to the data No column 31a, number-of-steps column 31b, number-of-seconds column 31c and standardized material No column 31d of the registration screen 31. Besides, when the user clicks the registration button 31f of the registration screen 31, the inputted numerical values are registered in the walk man-hour conversion table 12. By the way, in case of registering no data, or in case of returning to the menu screen 30 of the standardized man-hour management system SS, the user clicks the previous screen button 31e of the registration screen 31. Then, the registration screen 31 is erased from the display of the connection terminal 4, and the menu screen 30 is displayed.

Next, the constituent work CW (element work) condition management SS2 will be described with reference to FIG. 5 and FIGS. 7A–7C. The constituent work CW (element work) condition management SS2 registers and manages constituent work CW (element work) names for use in man-hour management and also registers and manages conditions correspondent to constituent work CW (element work) for assigning standardized man-hours correspondent to the constituent work CW (element work), and it registers and manages data by the work constituent condition table 10. Item data for use in the main man-hour management system MS are registered in the work constituent condition table 10 beforehand, whereby the selective assignment of the constituent work CW (element work) name and the standardized man-hours is permitted. The data which are registered and managed are the constituent work CW (element work) name and the conditions thereof classified by the improved MOST as correspond to the constituent work CW (element work) (how) [5] of the main man-hour management table 18.

The constituent work CW (element work) condition management SS2 is such that, when the selection button 30b of the menu screen 30 indicated on the display of the connection terminal 4 is clicked by the user, a constituent work CW (element work) condition management program is loaded into the RAM of the connection terminal 4 and is run by the CPU thereof. Then, the setting screen 32 of the constituent work CW (element work) condition management SS2 as shown in FIG. 7B is indicated on the display of the connection terminal 4. At the start-up of the setting screen 32, data already registered in the constituent work CW (element work) condition table 10 are read out and are displayed on the setting screen 32. Herein, the data of the constituent work CW (element work) condition table 10 are concretely the class (field) of the constituent work CW (element work), the constituent work CW (element work) name, and the conditions correspondent to the constituent work CW (element work). By the way, the setting screen 32 is a screen for setting the class and name of the constituent work CW (element work), and a class column 32a and a constituent work CW (element work) name column 32b are arrayed and displayed on this screen 32. Incidentally, the class column 32a includes a plurality of text boxes 32a1, . . . for setting and registering the classes of the constituent work CW (element work), and check columns 32a2, . . . corresponding to the respective text boxes 32a1, . . . . Besides, the constituent work CW (element work) name column 32b includes a plurality of text boxes 32b1, 32b2, 32b3, . . . for setting and registering the constituent work CW (element work) names, and check columns 32b4, 32b5, 32b6 . . . corresponding to the respective text boxes 32b1, 32b2, 32b3, . . . .

Here in the example, as shown in FIG. 7A, the class (field) of the constituent work CW (element work) is "welding", the constituent work CW (element work) names are "mig welding", "spot welding" and "T-stud welding", and the conditions for the constituent work CW (element work) are the "length of welding" and the "number of dots of welding". Incidentally, standardized man-hours are respectively set for the conditions of each constituent work CW (element work). By the way, in a case where no conditions are set for the constituent work CW (element work), standardized man-hours are respectively set for the constituent work CW (element work) themselves.

First, in case of setting and registering the class of the constituent work CW (element work), the user moves a cursor to that one of the text boxes 32a1, . . . of the class column 32a of the setting screen 32 for which the class is to be set. Subsequently, the user inputs the class of the constituent work CW (element work) to the specified text box 32a1. By way of example, "welding" is inputted to the text box 32a1 as shown in FIG. 7B. Otherwise, "painting", "assemblage" etc. are inputted. Further, in case of setting and registering the constituent work CW (element work) names for the class of each constituent work CW (element work), the user selects that one of the check columns 32a2, . . . in the class column 32a which corresponds to the class for inputting the constituent work CW (element work) names. Then, the constituent work CW (element work) names for the selected class can be inputted to the constituent work CW (element work) name column 32b. By way of example, the check column 32a2 is selected as shown in FIG. 7B, and the constituent work CW (element work) names for the class "welding" can be inputted in this state. Subsequently, the user moves the cursor to those of the text boxes 32b1, 32b2, 32b3, . . . of the constituent work CW (element work) name column 32b on the setting screen 32 for which the constituent work CW (element work) names are to be set. Besides, the user inputs the constituent work CW (element work) names to the specified ones of the text boxes 32b1, 32b2, 32b3, . . . . By way of example, the "spot welding" is inputted to the text box 32b1, the "mig welding" to the text box 32b2 and the "T-stud welding" to the text box 32b3 as shown in FIG. 7B. Besides, in case of registering the inputted class and names of the constituent work CW (element work), the user clicks the registration/previous screen button 32d of the setting screen 32, whereby the inputs are registered in the work constituent condition table 10. By the way, in case of registering no data, or in case of returning to the menu screen 30, the user clicks the cancel/previous screen button 32e of the setting screen 32. Then, the setting screen 32 is erased from the display of the connection terminal 4, and the menu screen 30 is displayed.

Further, in case of registering the conditions for each constituent work CW (element work), the user selects that one of the check columns 32b4, 32b5, 32b6, . . . of the constituent work CW (element work) in the constituent work CW (element work) name column 32b of the setting screen 32 which corresponds to the constituent work CW (element work) for inputting the conditions. By way of example, let's consider a case as shown in FIG. 7B where the check column 32a2 is highlighted so as to select the "welding" in the class column 32a, and where the check column 32b5 is highlighted so as to select the "mig welding" in the constituent work CW (element work) name column 32b. In this case, a registration screen 33 (refer to FIG. 7C) for the conditions corresponding to the selected constituent work CW (element work) is displayed, and the conditions corresponding to the selected constituent work CW (element work) can be inputted to the condition column 33b of the registration screen 33. At the start-up of the registration screen 33, data already registered in the constituent work CW (element work) condition table 10 are read out and are displayed on the registration screen 33. By the way, the registration screen 33 is a screen for setting the conditions of each constituent work CW (element work), and the condition column 33b is arranged and displayed on this screen 33. This condition column 33b includes a header column 33c for registering the conditions of the corresponding constituent work CW (element work); an item 1 column 33d, item 2 column 33e, item 3 column 33f, item 4 column 33g and item 5 column 33h for registering data for the conditions; and a grouping column 33i for grouping the conditional data. Herein, the data of the conditional items are registered in the item 1–5 columns 33d–33h. In the presence of six or more conditions to-be-registered, the conditions are registered in a plurality of stages of the item 1–5 columns 33d–33h. Besides, the grouping column 33i includes check columns in correspondence with the positions of the text boxes of the item 1 column 33d, item 2 column 33e, item 3 column 33f, item 4 column 33g and item 5 column 33h. Incidentally, the class and the constituent work CW (element work) name selected on the setting screen 32 are displayed in the work condition item column 33a of the registration screen 33. By way of example, the "welding/mig welding" are displayed as shown in FIG. 7C.

In case of inputting the conditions, the user moves the cursor to the text boxes 33c1, 33c2, . . . of the header column 33c. Besides, he/she inputs the conditional items to the specified text boxes 33c1, 33c2, . . . . By way of example, as shown in FIG. 7C, a "length" is inputted to the text box 33c1, and the "number of dots" to the text box 33c2. Subsequently, in case of inputting the conditional data to the conditional item "length", the user moves the cursor to the text box 33d1 of the item 1 column 33d, etc. Besides, he/she inputs the conditional data to the specified text box 33d1, etc. In the presence of a plurality of conditional data for each conditional item, the conditional data are successively inputted to the text box 33e1 of the item 2 column 33e, the text box 33f1 of the item 3 column 33f, . . . . By way of example, in the presence of three conditional data for the conditional item "length", data "at most 6 mm", "at most 12 mm" and "at most 18 mm" are successively inputted to the text boxes 33d1, 33e1 and 33f1 as shown in FIG. 7C. Further, in case of inputting the conditional data to the conditional item "number of dots", the user moves the cursor to the text box 33d2 of the item 1 column 33d, etc. Besides, he/she inputs the conditional data to the specified text box 33d2, etc. In the presence of a plurality of conditional data for each conditional item, the conditional data are successively inputted to the text box 33e2 of the item 2 column 33e, the text box 33f2 of the item 3 column 33f, . . . . By way of example, in the presence of six conditional data for the conditional item "number of dots", the data are inputted to two stages such as the text boxes 33d2 and 33d3 of the item 1 column 33d for the "number of dots", as shown in FIG. 7C. More specifically, the data "1 dot", "2 dots", "3 dots", "4 dots", "5 dots" and "6 dots" are successively inputted to text boxes 33d2, 33e2, 33f2, 33g1, 33d3 and 33e3. Lastly, in case of registering the conditional data for each constituent condition, the user selects the check column 33i1, etc. of the grouping column 33i in order to group the conditional data of the constituent condition. By way of example, in order to group the conditional data "at most 6 mm" as the "length" and the conditional data "2 dots" as the "number of dots" of the constituent condition "mig welding", the check columns 33i1 and 33i2 of the grouping column 33i corresponding respectively to the data "at most 6 mm" as the "length" and the data "2 dots" as the "number of dots" are selected as shown in FIG. 7C. Besides, the user clicks the registration/previous screen button 33j of the registration screen 33, whereby the conditional data are registered in the work constituent condition table 10. By the way, in case of registering no data, or in case of returning to the menu screen 30, the user clicks the cancel/previous screen button 33k of the registration screen 33. Then, the registration screen 33 is erased from the display of the connection terminal 4, and the menu screen 30 is displayed.

Next, the standardized man-hour registration SS3 will be described with reference to FIG. 5, FIG. 8 and FIGS. 9A–9B. The standardized man-hour registration SS3 registers and manages standardized man-hour analysis contents and standardized man-hours for the conditions of each constituent work CW (element work), and it registers and manages data by the standardized man-hour table 11. With the standardized man-hour registration SS3, the standardized man-hours are respectively registered in the standardized man-hour table 11, as to the conditions of the constituent work CW (element work) registered in the work constituent condition table 10 (refer to FIG. 8). Incidentally, the standardized man-hour analysis contents to be registered in the standardized man-hour table 11 are data corresponding to the conditions of the constituent work CW (element work), and they are concretely the class (field) of the constituent work CW (element work), the names thereof and the conditions thereof. The standardized man-hour data for use in the main man-hour management system MS are registered in the standardized man-hour table 11 beforehand, whereby the automatic assignment of the standardized man-hours is permitted. The data to be registered and managed are standardized man-hours measured by the improved MOST, corresponding to the items [12]–[20] of the "man-hours having values added" and the items [24]–[29] of the "man-hours having no values added" in the main man-hour management table 18, and the standardized material Nos corresponding to the standard works [36], [37] (refer to FIG. 8). Incidentally, the "man-hours having values added" are man-hours which are directly contributive to the production of a product. Besides, the "man-hours having no values added" are man-hours which are not directly contributive to the production of the product, and which are man-hours for rearrangement, wait, etc.

The standardized man-hour registration SS3 is such that, when the selection button 30c of the menu screen 30 indicated on the display of the connection terminal 4 is clicked by the user, a standardized man-hour registration program is loaded into the RAM of the connection terminal 4 and is run by the CPU thereof. Then, the registration screen 34 of the standardized man-hour registration SS3 as shown in FIG. 9B is indicated on the display of the connection terminal 4. At the start-up of the registration screen 34, data already registered in the work constituent condition table 10 and standardized man-hour table 11 are read out and are displayed on the registration screen 34. Herein, the data of the standardized man-hour table 11 are concretely the class (field) of the constituent work CW (element work), the names of the constituent work CW (element work) and the conditions correspondent to each of the constituent work CW (element work) as the standardized man-hour analysis contents, and the standardized man-hours of the items [12]–[20] of the "man-hours having values added" and the items [24]–[29] of the "man-hours having no values added", as well as the standardized material Nos of the standard works [36], [37]. By the way, a standardized man-hour analysis content column 34a and a standardized man-hour column 34b are displayed on the registration screen 34. Incidentally, in order to select the class, the constituent work CW (element work) name and the conditions for each constituent work CW (element work) as are registered in the work constituent condition table 10, the standardized man-hour analysis content column 34a includes a class selection column 34c, a constituent work CW (element work) name selection column 34d and a condition selection column 34e, and the respective selection columns 34c, 34d and 34e include check columns 34c1, 34d1 and 34e1, . . . . The standardized man-hour column 34b includes text boxes 34b1–34b17 in correspondence with the standardized man-hours of the items [12]–[20] of the "man-hours having values added" and the items [24]–[29] of the "man-hours having no values added", and the standard works [36], [37].

Figure 9A:
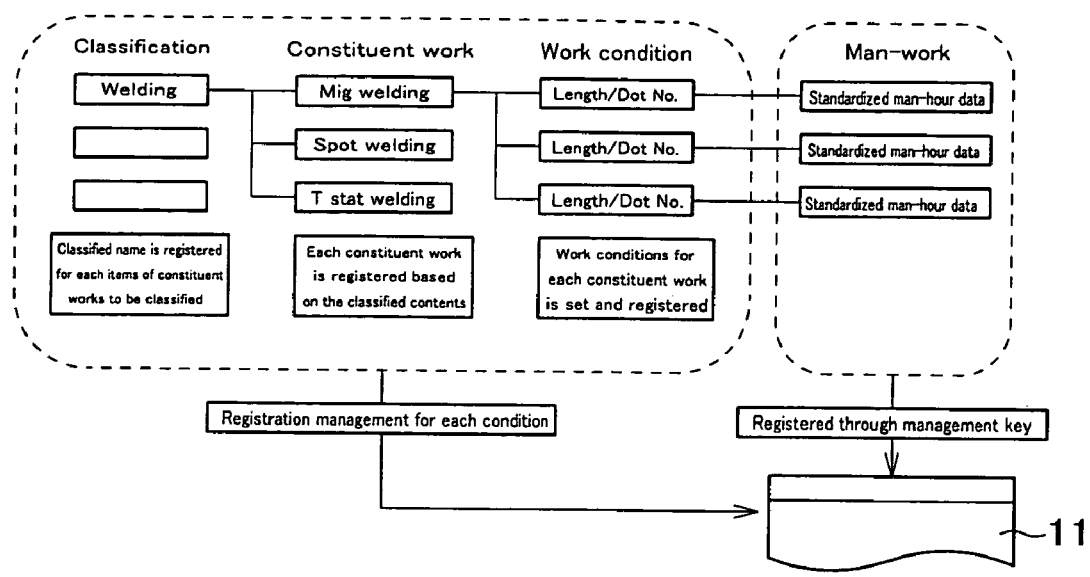
Figure 9B:
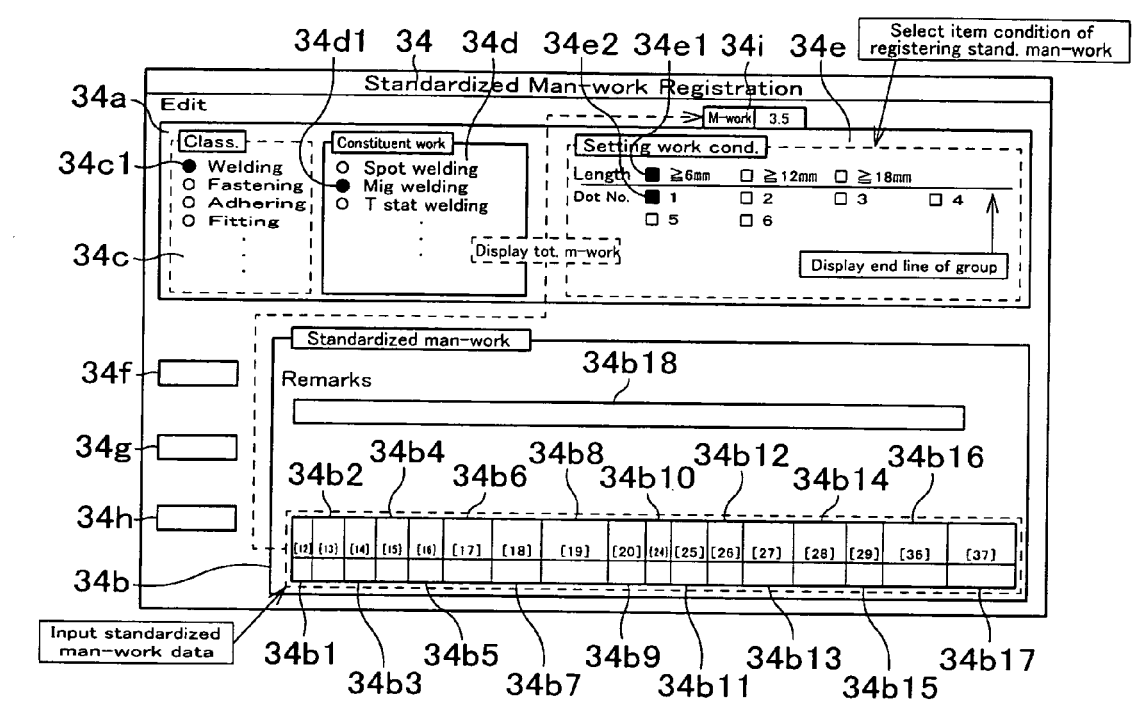

In the example shown in FIGS. 9A and 9B, the standardized man-hours are set for "welding" being the class of the constituent work CW (element work), "mig welding" being the constituent work CW (element work) name, and "at most 6 mm as the length of welding" and "one dot as the number of dots of welding" being the conditions of the constituent work CW (element work).

First, in case of selecting standardized man-hour analysis contents (that is, in case of selecting the class of a constituent work CW (element work) for which standardized man-hours are to be registered, the name of the constituent work CW (element work), and conditions correspondent to the constituent work CW (element work)), the user selects the class of a subject for the registration of the standardized man-hours, from among the check columns 34c1, . . . of the class selection column 34c. Then, constituent work CW (element work) names registered in the work constituent condition table 10 are displayed on the constituent work CW (element work) name selection column 34d in correspondence with the selected class. Besides, the user selects the constituent work CW (element work) name of the subject for the registration of the standardized man-hours, from among the check columns 34d1, . . . of the constituent work CW (element work) name selection column 34d. Then, conditions registered in the work constituent condition table 10 in correspondence with the selected constituent work CW (element work) name are displayed in the condition selection column 34e. Therefore, the user selects the conditions for which the standardized man-hours are to be registered, from among the check columns 34e1, . . . of the condition selection column 34e. When the class, name and conditions of the constituent work CW (element work) have been all selected, the items of pertinent works, movements, etc. are displayed in the standardized man-hour column 34b. By way of example, check columns 34c1, 34d1, 34e1 and 34e2 are selected as shown in FIG. 9B in order to select the class "welding", the constituent work CW (element work) name "mig welding" and the conditions "at most 6 mm as the length of welding" and "one dot as the number of dots for welding". By the way, in a case where data are already registered in the standardized man-hour table 11 in correspondence with the class, name and conditions of the selected constituent work CW (element work), they are read out and displayed in the text boxes 34b1–34b17 of the standardized man-hour column 34b. On the other hand, in a case where no data are registered in the standardized man-hour table 11 in correspondence with the class, name and conditions of the selected constituent work CW (element work), the text boxes 34b1–34b17 of the standardized man-hour column 34b become blank.

Subsequently, in case of inputting the standardized man-hours for the class of the selected constituent work CW (element work), the name thereof and the conditions thereof, the user inputs the numerical values of the standardized man-hours to the text boxes 34b1–34b15 for the items [12]–[20] of the "man-hours having values added" and the items [24]–[29] of the "man-hours having no values added", respectively. Further, the user inputs the numerical values of the standardized material Nos to the text boxes 34b16–34b17 of the standard works [36]–[37], respectively. Besides, he/she inputs remarks to the remarks column 34b18 of the registration screen 34. Incidentally, when the call button 34h of the registration screen 34 is clicked, the total of the standardized man-hours is displayed in the man-hour column 34i of this screen. Subsequently, in case of registering the selected standardized man-hour analysis contents and the inputted standardized man-hours, the user clicks the registration button 34f of the registration screen 34, whereby the contents and the man-hours are registered in the standardized man-hour table 11. By the way, in case of registering no data, or in case of returning to the menu screen 30, the user clicks the previous screen button 34g of the registration screen 34. Then, the registration screen 34 is erased from the display of the connection terminal 4, and the menu screen 30 is displayed.

Figure 10A:
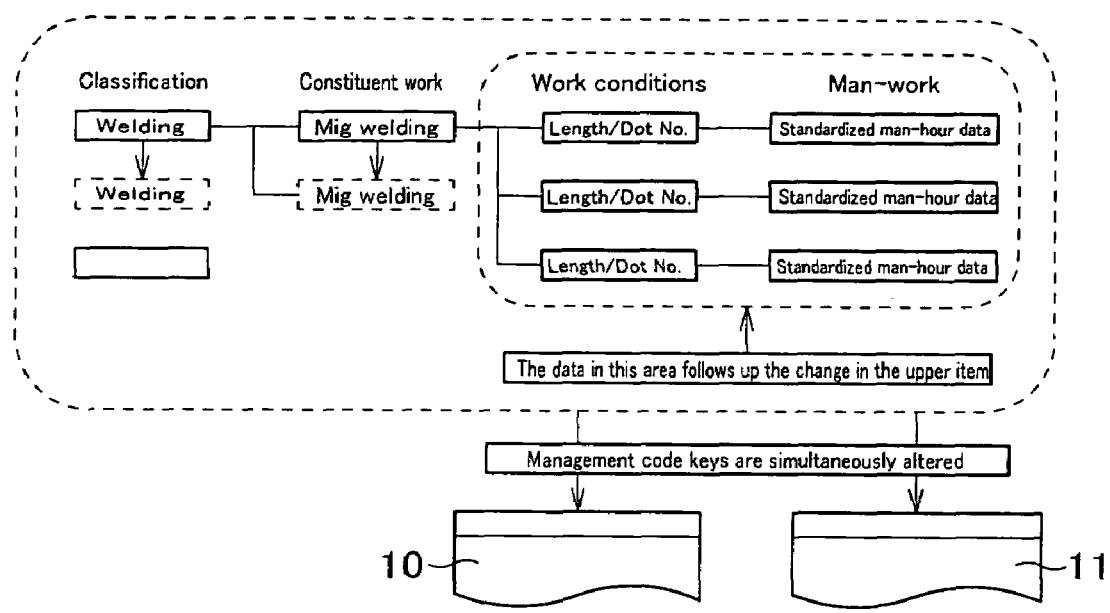
Figure 10B:
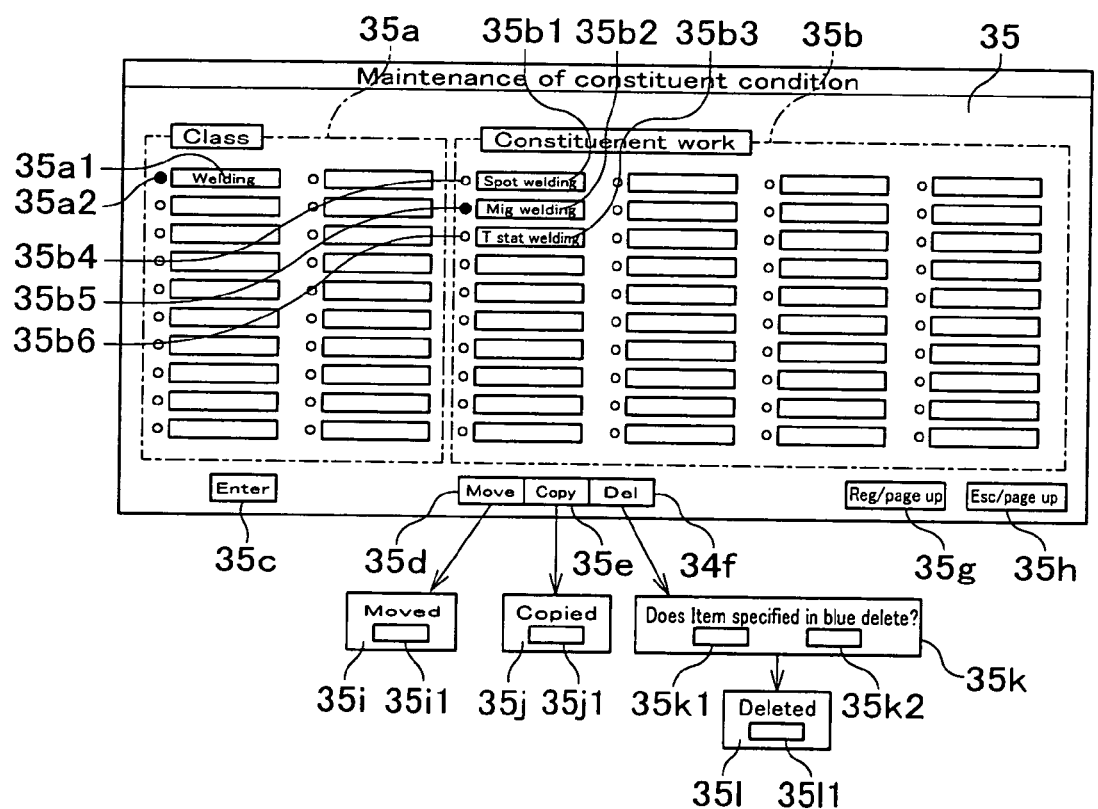

Next, the constituent name work condition item maintenance SS4 will be described with reference to FIG. 5 and FIG. 10A-10B. The constituent name work condition item maintenance SS4 performs maintenance (registration position alteration, copying, deletion, etc.) for the registered contents of the work conditions and the standardized man-hours in constituent work CW (element work) units, regarding the constituent work CW (element work) items registered by the constituent work CW (element work) condition management SS2, and it registers and manages data by the work constituent condition table 10 and the standardized man-hour table 11. By way of example, the registration position alteration collectively alters the set positions of registered constituent work CW (element work) item data and standardized man-hour data. More specifically, when the position of the class of a constituent work CW (element work) is altered (the position of "welding" is altered in FIG. 10A), the data of a constituent work CW (element work) name, work conditions and standardized man-hours which are constructed at the lower layers of the class are simultaneously altered. Also, when the position of the constituent work CW (element work) name is altered (the position of "mig welding" is altered in FIG. 10A), the data of the work conditions and standardized man-hours which are constructed at the lower layers of the constituent work CW (element work) name are simultaneously altered. That is, the constituent name work condition item maintenance SS4 can collectively perform the maintenance (registration position alteration [move], "copy" and "delete") without individually altering the constituent work CW (element work) item data constructed at the lower layers of each class.

The constituent name condition item maintenance SS4 is such that, when the selection button 30d of the menu screen 30 indicated on the display of the connection terminal 4 is clicked by the user, a constituent name condition item maintenance program is loaded into the RAM of the connection terminal 4 and is run by the CPU thereof. Then, the editing screen 35 of the constituent name condition item maintenance SS4 as shown in FIG. 10B is indicated on the display of the connection terminal 4. At the start-up of the editing screen 35, data already registered in the work constituent condition table 10 are read out and are displayed on the editing screen 35. By the way, a class column 35a and a constituent work CW (element work) name column 35b are displayed on the editing screen 35. The class column 35a includes check columns 35a2, . . . corresponding to respective text boxes 35a1, . . . . Besides, the constituent work CW (element work) name column 35b includes check columns 35b4, . . . corresponding to respective text boxes 35b1, . . . .

In case of moving constituent work CW (element work) item data, the user selects any of the check columns 35a2, . . . or check columns 35b4, . . . corresponding to a class or constituent work CW (element work) name to-be-moved, and he/she clicks the validate button 35c of the editing screen 35. Besides, in case of the selection of the class, the user selects any of the text boxes 35a1, . . . as a moving goal by the cursor, or in case of the selection of the constituent work CW (element work) name, he/she selects any of the text boxes 35b1, . . . as a moving goal by the cursor. Further, when the user clicks the move button 35d of the editing screen 35, the selected class is displayed in one of the text boxes 35a1, . . . selected as the moving goal, in the case of the selection of the class, or the selected constituent work CW (element work) name is displayed in one of the text boxes 35b1, . . . selected as the moving goal, in the case of the selection of the constituent work CW (element work) name. Still further, a move completion validating screen 35i is indicated on the display of the connection terminal 4. Herein, the user clicks the OK button 35i1 of the move completion validating screen 35i, whereby the constituent work CW (element work) item data and the standardized man-hour data are moved to the moving goal. Subsequently, in case of registering the moved contents in the work constituent condition table 10 and standardized man-hour table 11, the user clicks the registration/previous screen button 35g of the editing screen 35, thereby to register the moved data in the work constituent condition table 10 and standardized man-hour table 11. By the way, in case of registering no data, or in case of returning to the menu screen 30, the user clicks the cancel/previous screen button 35h of the editing screen 35. Then, the editing screen 35 is erased from the display of the connection terminal 4, and the menu screen 30 is displayed.

In case of copying constituent work CW (element work) item data, the user selects any of the check columns 35a2, . . . or check columns 35b4, . . . corresponding to a class or constituent work CW (element work) name to-be-copied, and he/she clicks the validate button 35c. Besides, in case of the selection of the class, the user selects any of the text boxes 35a1, . . . as a copying goal by the cursor, or in case of the selection of the constituent work CW (element work) name, he/she selects any of the text boxes 35b1, . . . as a copying goal by the cursor. Further, when the user clicks the copy button 35e of the editing screen 35, the selected class is displayed in one of the text boxes 35a1, . . . selected as the copying goal, in the case of the selection of the class, or the selected constituent work CW (element work) name is displayed in one of the text boxes 35b1, . . . selected as the copying goal, in the case of the selection of the constituent work CW (element work) name. Still further, a copy completion validating screen 35j is indicated on the display of the connection terminal 4. Herein, the user clicks the OK button 35j1 of the copy completion validating screen 35j, whereby the constituent work CW (element work) item data and the standardized man-hour data are copied to the copying goal. Subsequently, in case of registering the copied contents in the work constituent condition table 10 and standardized man-hour table 11, the user clicks the registration/previous screen button 35g of the editing screen 35, thereby to register the copied data in the work constituent condition table 10 and standardized man-hour table 11. By the way, in case of registering no data, or in case of returning to the menu screen 30, the user clicks the cancel/previous screen button 35h of the editing screen 35. Then, the editing screen 35 is erased from the display of the connection terminal 4, and the menu screen 30 is displayed.

In case of deleting constituent work CW (element work) item data, the user selects any of the check columns 35a2, . . . or check columns 35b4, . . . corresponding to a class or constituent work CW (element work) name to-be-deleted, and he/she clicks the validate button 35c. Besides, when the user clicks the delete button 35f of the editing screen 35, a delete completion validating screen 35k is indicated on the display of the connection terminal 4. Herein, when the user clicks the YES button 35k1 of the delete completion validating screen 35k, the deletion of the constituent work CW (element work) item data and standardized man-hour data is executed, or when he/she clicks the NO button 35k2 of the delete completion validating screen 35k, the deletion of the constituent work CW (element work) item data and standardized man-hour data is cancelled. Further, in the case of the click of the YES button 35k1, a delete completion validating screen 35l is indicated on the display of the connection terminal 4. Herein, the user clicks the OK button 35l1 of the delete completion validating screen 35l, thereby to delete the constituent work CW (element work) item data and the standardized man-hour data. Subsequently, in case of registering the deleted contents in the work constituent condition table 10 and standardized man-hour table 11, the user clicks the registration/previous screen button 35g of the editing screen 35, whereby the deleted contents are registered in the work constituent condition table 10 and standardized man-hour table 11 (that is, the constituent work CW (element work) item data and the standardized man-hour data are deleted). By the way, in case of registering no data, or in case of returning to the menu screen 30, the user clicks the cancel/previous screen button 35h of the editing screen 35. Then, the editing screen 35 is erased from the display of the connection terminal 4, and the menu screen 30 is displayed.

Next, the derivation management system DS will be described with reference to FIG. 11 through FIG. 16. The derivation management system DS previously registers car sort (car type) data, production line data, and derivation data set for individual car types, such as 2 doors, 3 doors, 4 doors, for domestic use, for export to U.S., for export to Europe, for use in a cold district, grade, right steering wheel, left steering wheel, and with or without a sunroof.

Figure 11:
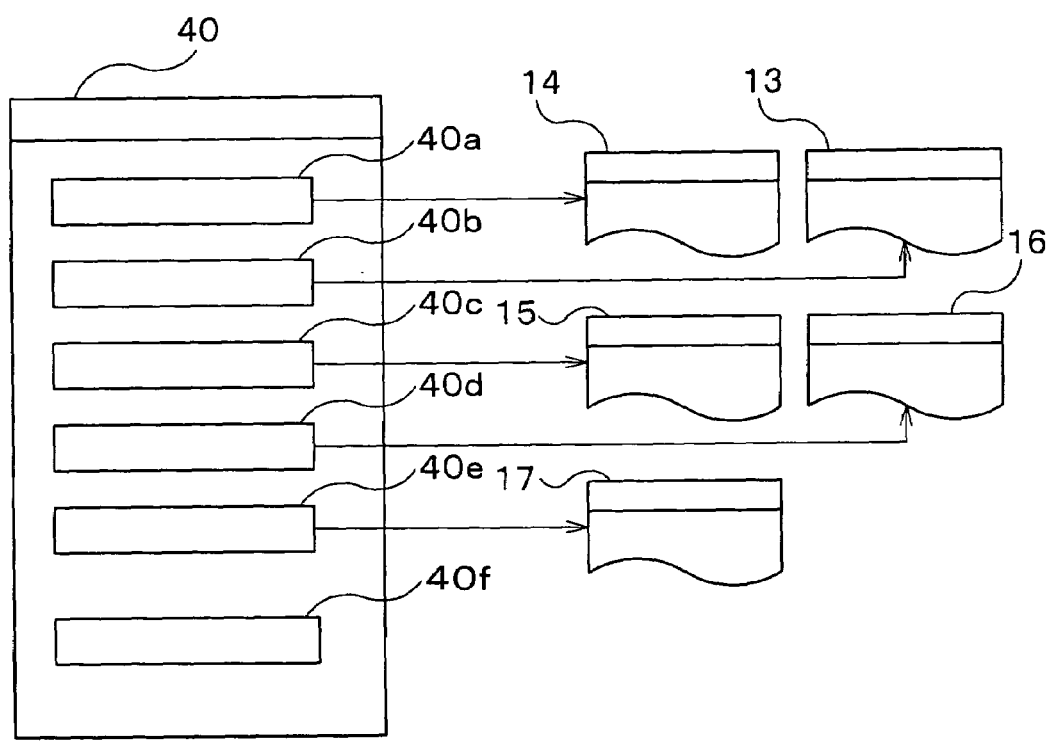
FIG. 11 shows the menu screen of a derivation management system in the embodiment.

The derivation management system DS is such that, when a derivation management system starting icon (not shown) indicated on the display of the connection terminal 4 is clicked by the user, a derivation management system program is loaded into the RAM of the connection terminal 4 and is run by the CPU thereof. Then, the menu screen 40 of the derivation management system DS as shown in FIG. 11 is indicated on the display of the connection terminal 4.

Displayed on the menu screen 40 are a selection button 40a for the line name management DS1, a selection button 40b for the series registration management DS2, a selection button 40c for the derivation classification registration management DS3, a selection button 40d for the derivation format registration management DS4, a selection button 40e for the derivation code table management DS5, and a quit button 40f. Herein, when the user clicks any of the selection buttons 40a–40e, a corresponding application is executed, and when he/she clicks the quit button 40f, the application of the derivation management system DS is ended to erase the menu screen 40 from the display of the connection terminal 4.

Figure 12A:
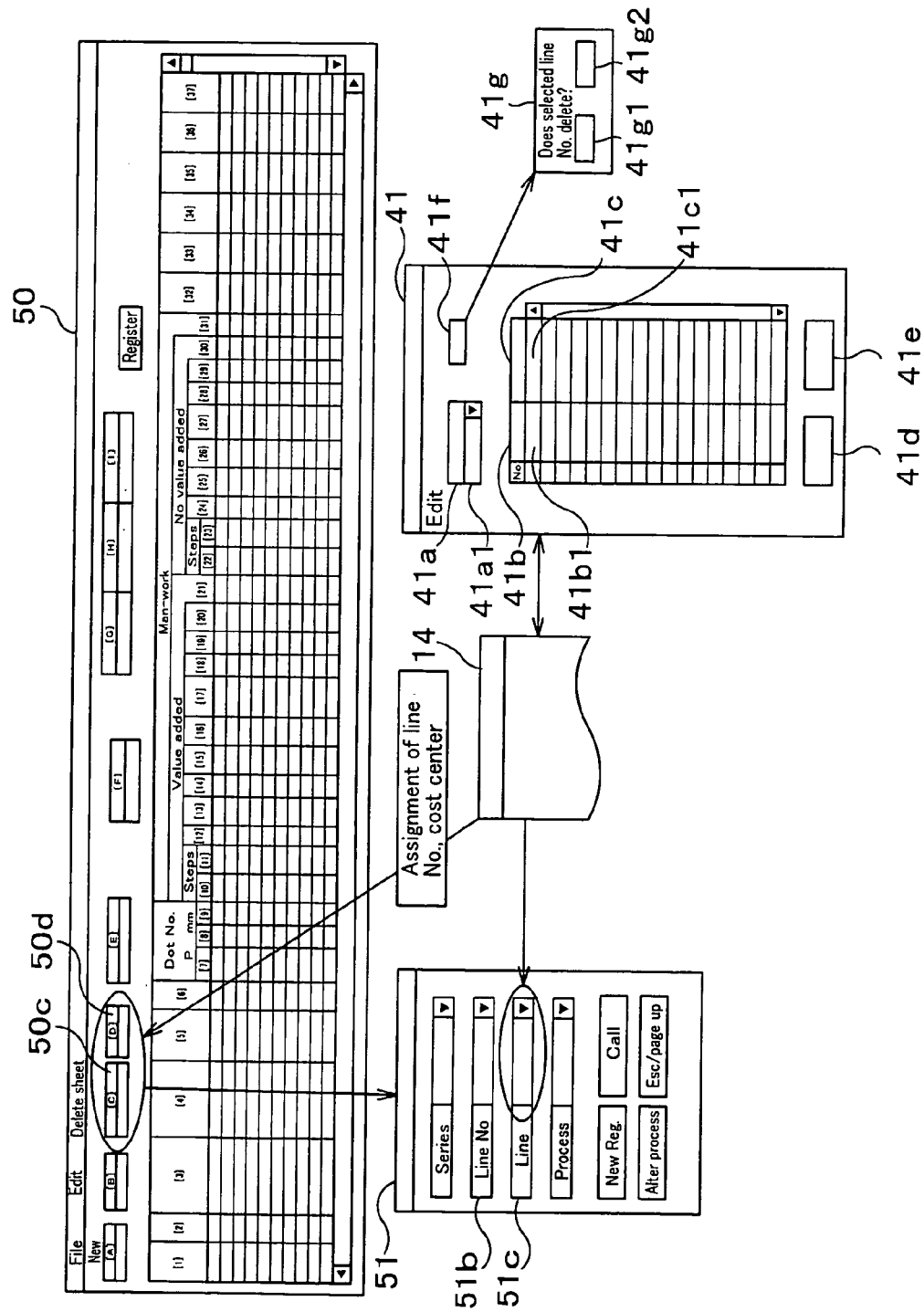

First, the line name management DS1 will be described with reference to FIG. 11 and FIGS. 12A and 12B. The line name management DS1 registers and manages the modes of production lines which are implementing works, and it registers and manages data by the line name table 14. Item data for use in the main man-hour management system MS are registered in the line name table 14 beforehand, whereby the selective assignment of a line name and a cost center No is permitted. The data which are registered and managed are the line name [C] and cost center [D] in the line No [B] of the main man-hour management table 18.

The line name management DS1 is such that, when the selection button 40a of the menu screen 40 indicated on the display of the connection terminal 4 is clicked by the user, a line name management program is loaded into the RAM of the connection terminal 4 and is run by the CPU thereof. Then, the registration screen 41 of the line name management DS1 as shown in FIG. 12A is indicated on the display of the connection terminal 4. At the start-up of the registration screen 41, data already registered in the line name table 14 are read out and are displayed on the registration screen 41. Herein, the data of the line name table 14 are concretely line names and cost center Nos at individual line Nos. Incidentally, the registration screen 41 is a screen for registering the line names and cost center Nos included in the respective line Nos. On the registration screen 41, accordingly, a line No column 41a is displayed, and a line name column 41b and a cost center No column 41c are arrayed and displayed. In addition, the line No column 41a includes a selection box 41a1 for registering the line No, the line name column 41b includes a plurality of text boxes 41b1, . . . for registering the line names, and the cost center No column 41c includes a plurality of text boxes 41c1, . . . for registering the cost center Nos, in correspondence with the text boxes 41b1, . . . .

Figure 12B:
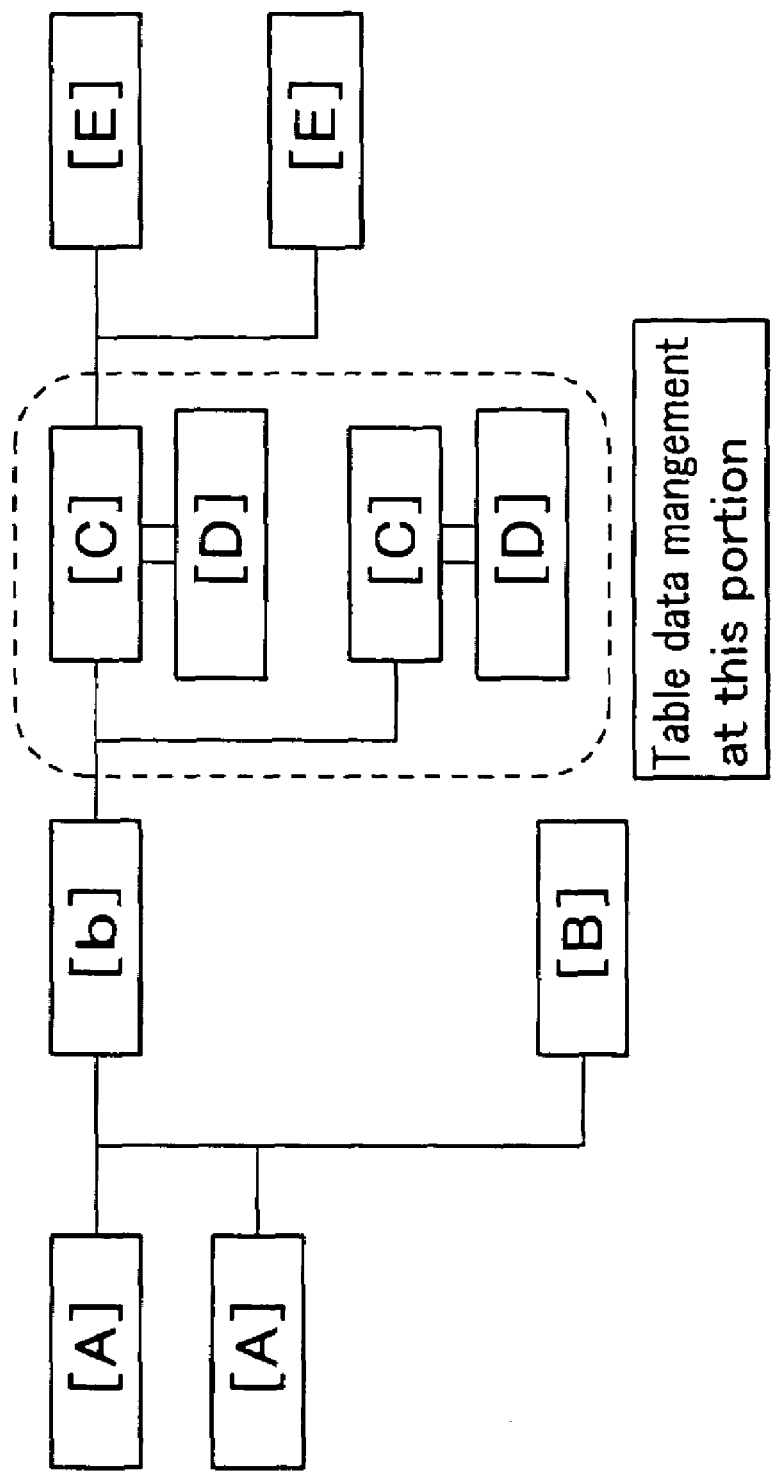

By the way, as shown in FIG. 12B, automobiles in a plurality of series (of a plurality of car types) are produced in an automobile production factory, and they are assigned series [A], [A], . . . . Besides, a plurality of production lines are arranged in the factory, and they are assigned line Nos [B], [B], . . . . Further, a plurality of cost centers exist in each of the production lines, and they are assigned line names [C], [C], (cost centers [D], [D], . . . ). Still further, a plurality of processes exist in each of the cost centers, and they are assigned process names [E], [E], . . . .

First, in case of inputting the line No, the user moves the cursor to the selection box 41a1 of the line No column 41a of the registration screen 41. Besides, he/she inputs the line No to the selection box 41a1. Subsequently, in case of inputting the line name, the user moves the cursor to any of the text boxes 41b1, . . . of the line name column 41b of the registration screen 41. Besides, he/she inputs the line name to the specified text box 41b1. Further, in case of inputting the cost center No in correspondence with the line name, the user moves the cursor to that one of the text boxes 41c1, . . . of the cost center No column 41c of the registration screen 41 which corresponds to the line name. Besides, he/she inputs the cost center No to the specified text box 41c1. By the way, in the presence of a plurality of line names and cost center Nos, the above input processing is iterated a plurality of number of times. Subsequently, in case of registering the line name and cost center No for the inputted line No, the user clicks the registration button 41 e of the registration screen 41, whereby the data are registered in the line name table 14 (that is, data about the selected line No are deleted). By the way, in case of registering no data, or in case of returning to the menu screen 40, the user clicks the previous screen button 41d of the registration screen 41. Then, the registration screen 41 is erased from the display of the connection terminal 4, and the menu screen 40 is displayed.

Also, in case of deleting the data of the registered line No, the user moves the cursor to the selection box 41 a1 of the line No column 41a of the registration screen 41. Besides, he/she selects the line No to-be-deleted from within the selection box 41a1. Then, the data of the line name and cost center No corresponding to the selected line No are read out of the line name table 14 and are respectively displayed in the line name column 41b and cost center No column 41c. Therefore, the user clicks the delete button 41f of the registration screen 41. Then, a delete validating screen 41g is indicated on the display of the connection terminal 4. Herein, when the user clicks the YES button 41g1 of the delete validating screen 41g, the deletion of the data about the selected line No is executed, or when he/she clicks the NO button 41g2 of the delete validating screen 41g, the deletion of the data about the selected line No is cancelled. Subsequently, in case of registering the deleted contents in the line name table 14, he user clicks the registration button 41e of the registration screen 41, whereby the deleted contents are registered in the line name table 14. By the way, in case of registering no data, or in case of returning to the menu screen 40, the user clicks the previous screen button 41d of the registration screen 41. Then, the registration screen 41 is erased from the display of the connection terminal 4, and the menu screen 40 is displayed.

Incidentally, the data registered in the line name table 14 can be selected in the line No column 51b and line name column 51c of the sheet invoking screen 51 of the main screen 50 of the main man-hour management MS1. Besides, the selected data are displayed in the line name column 50c and cost center column 50d of the main screen 50.

Figure 13:
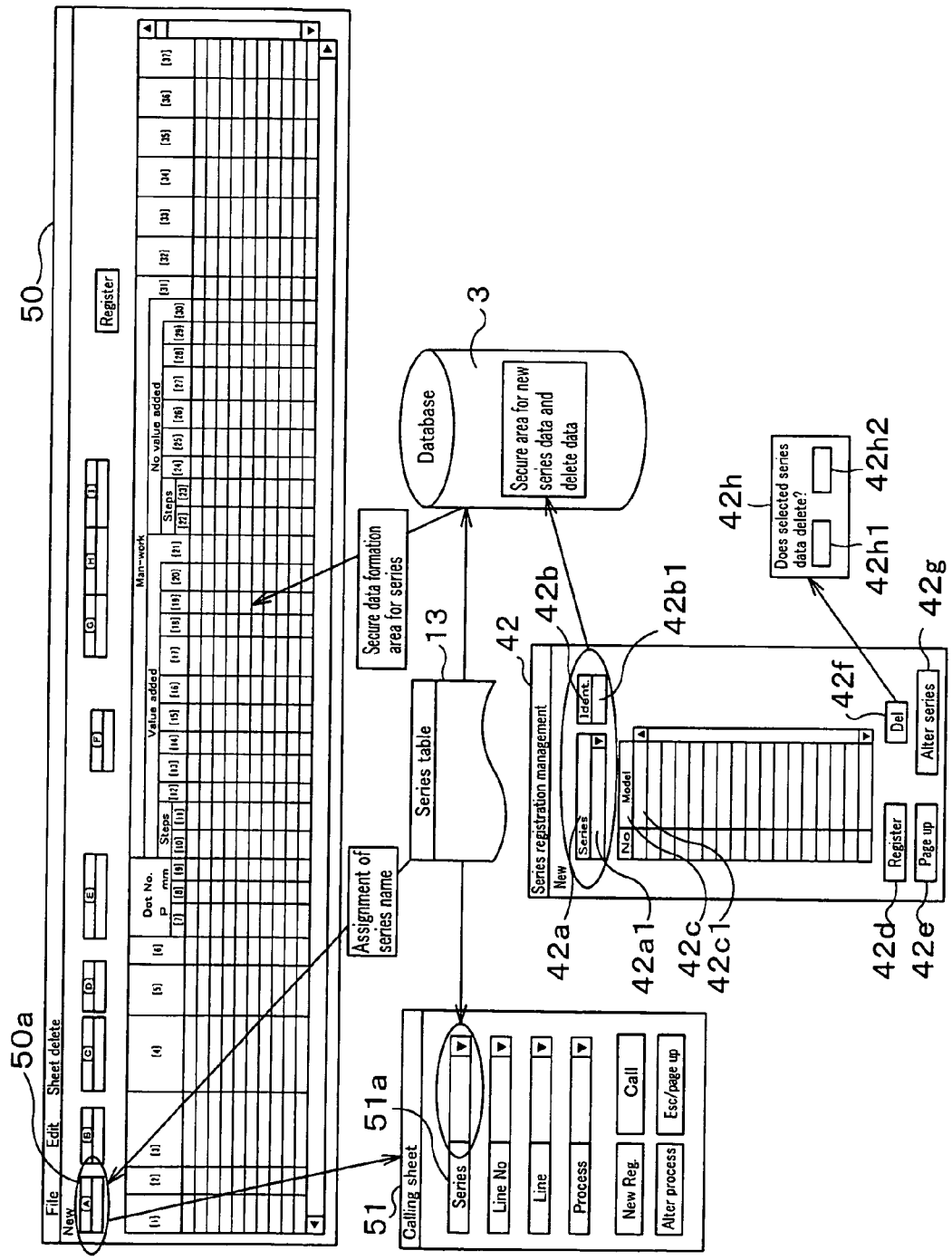
FIG. 13 is a diagram showing the relationship between the registration screen and series table of series registration management and the main screen of the main man-hour management in the embodiment.

Next, the series registration management DS2 will be described with reference to FIG. 11 and FIG. 13. The series registration management DS2 performs the registration management of the files of new series (car sorts) and the registration management of car types for the individual series, and it registers and manages data by the series table 13. Item data for use in the main man-hour management system MS are registered in the series table 13 beforehand, whereby the selective assignment of a series is permitted. The data which are registered are the series [A] and the car types for the series [A] in the main man-hour management table 18.

The series registration management DS2 is such that, when the selection button 40b of the menu screen 40 indicated on the display of the connection terminal 4 is clicked by the user, a series registration management program is loaded into the RAM of the connection terminal 4 and is run by the CPU thereof. Then, the registration screen 42 of the series registration management DS2 as shown in FIG. 13 is indicated on the display of the connection terminal 4. At the start-up of the registration screen 42, data already registered in the series table 13 are read out and are displayed on the registration screen 42. Herein, the data of the series table 13 are concretely car types in individual series. Incidentally, the registration screen 42 is a screen for registering the car types included in the respective series. On the registration screen 42, accordingly, a series column 42a and an identifier column 42b are arrayed and displayed, and a car type column 42c is displayed. In addition, the series column 42a includes a selection box 42a1 for registering the series, the identifier column 42b includes a text box 42b1 for registering an identifier, and the car type column 42c includes a plurality of text boxes 42c1, . . . for registering the car types.

First, in case of inputting the new series, the user moves the cursor to the selection box 42a1 of the series column 42a of the registration screen 42. Besides, he/she inputs the series to the selection box 42a1. Subsequently, in case of inputting the identifier for the new series, the user moves the cursor to the text box 42b1 of the identifier column 42b of the registration screen 42. Besides, he/she inputs the identifier to the above text box 42b1. Further, in case of inputting the car type in correspondence with the new series, the user moves the cursor to any of the text boxes 42c1, . . . of the car type column 42c of the registration screen 42. Besides, he/she inputs the car type to the specified text box 42c1. By the way, in the presence of a plurality of car types, the above input processing is iterated a plurality of number of times. Subsequently, in case of registering the data of the inputted new series, the user clicks the registration button 42d of the registration screen 42, whereby the data are registered in the series table 13. By the way, in case of registering no data, or in case of returning to the menu screen 40, the user clicks the previous screen button 42e of the registration screen 42. Then, the registration screen 42 is erased from the display of the connection terminal 4, and the menu screen 40 is displayed.

Next, in case of altering the data of the car type, the user moves the cursor to the selection box 42a1 of the series column 42a of the registration screen 42. Besides, he/she selects the series to-be-altered from within the selection box 42a1. Then, the data of the car type corresponding to the selected series are read out of the series table 13 and are displayed in the car type column 42c. Therefore, the user moves the cursor to that one of the text boxes 42c1, . . . which corresponds to the car type to-be-altered. Besides, he/she rewrites the car type of the specified text box 42c1 or inputs the car type anew. By the way, in the presence of a plurality of car types to-be-altered, the above alteration processing is iterated a plurality of number of times. Subsequently, in case of registering the data of the altered car type, the user clicks the registration button 42d of the registration screen 42, whereby the data are registered in the series table 13. By the way, in case of registering no data, or in case of returning to the menu screen 40, the user clicks the previous screen button 42e of the registration screen 42.

Then, the registration screen 42 is erased from the display of the connection terminal 4, and the menu screen 40 is displayed.

Next, in case of deleting the data of the series, the user moves the cursor to the selection box 42*a*1 of the series column 42*a* of the registration screen 42. Besides, he/she selects the series to-be-deleted from within the selection box 42*a*1. Then, the data of the car type corresponding to the selected series are read out of the series table 13 and are displayed in the car type column 42*c*. Therefore, the user clicks the delete button 42*f* of the registration screen 42. Then, a delete validating screen 42*h* is indicated on the display of the connection terminal 4. Herein, when the user clicks the YES button 42*h*1 of the delete validating screen 42*h*, the deletion of the data about the selected series is executed, or when he/she clicks the NO button 42*h*2 of the delete validating screen 42*h*, the deletion of the data about the selected series is cancelled. Subsequently, in case of registering the deleted contents in the series table 13, the user clicks the registration button 42*d* of the registration screen 42, whereby the deleted contents are registered in the series table 13 (that is, data about the selected series are deleted). By the way, in case of registering no data, or in case of returning to the menu screen 40, the user clicks the previous screen button 42*e* of the registration screen 42. Then, the registration screen 42 is erased from the display of the connection terminal 4, and the menu screen 40 is displayed.

Next, in case of altering the series name, the user moves the cursor to the selection box 42*a*1 of the series column 42*a* of the registration screen 42. Besides, he/she selects the series to-be-altered from within the selection box 42*a*1. Then, the data of the car type corresponding to the selected series are read out of the series table 13 and are displayed in the car type column 42*c*. Therefore, the user rewrites the selected series of the selection box 42*a*1. Further, he/she clicks the series name altering button 42*g* of the registration screen 42. Besides, in case of registering the altered series name, the user clicks the registration button 42*d* of the registration screen 42, whereby the altered series name is registered in the series table 13. By the way, in case of registering no data, or in case of returning to the menu screen 40, the user clicks the previous screen button 42*e* of the registration screen 42. Then, the registration screen 42 is erased from the display of the connection terminal 4, and the menu screen 40 is displayed.

Incidentally, the data registered in the series table 13 can be selected in the series column 51*a* of the sheet invoking screen 51 of the main screen 50 of the main man-hour management MS1. Besides, the selected data are displayed in the series column 50*a* of the main screen 50.

Figure 14:
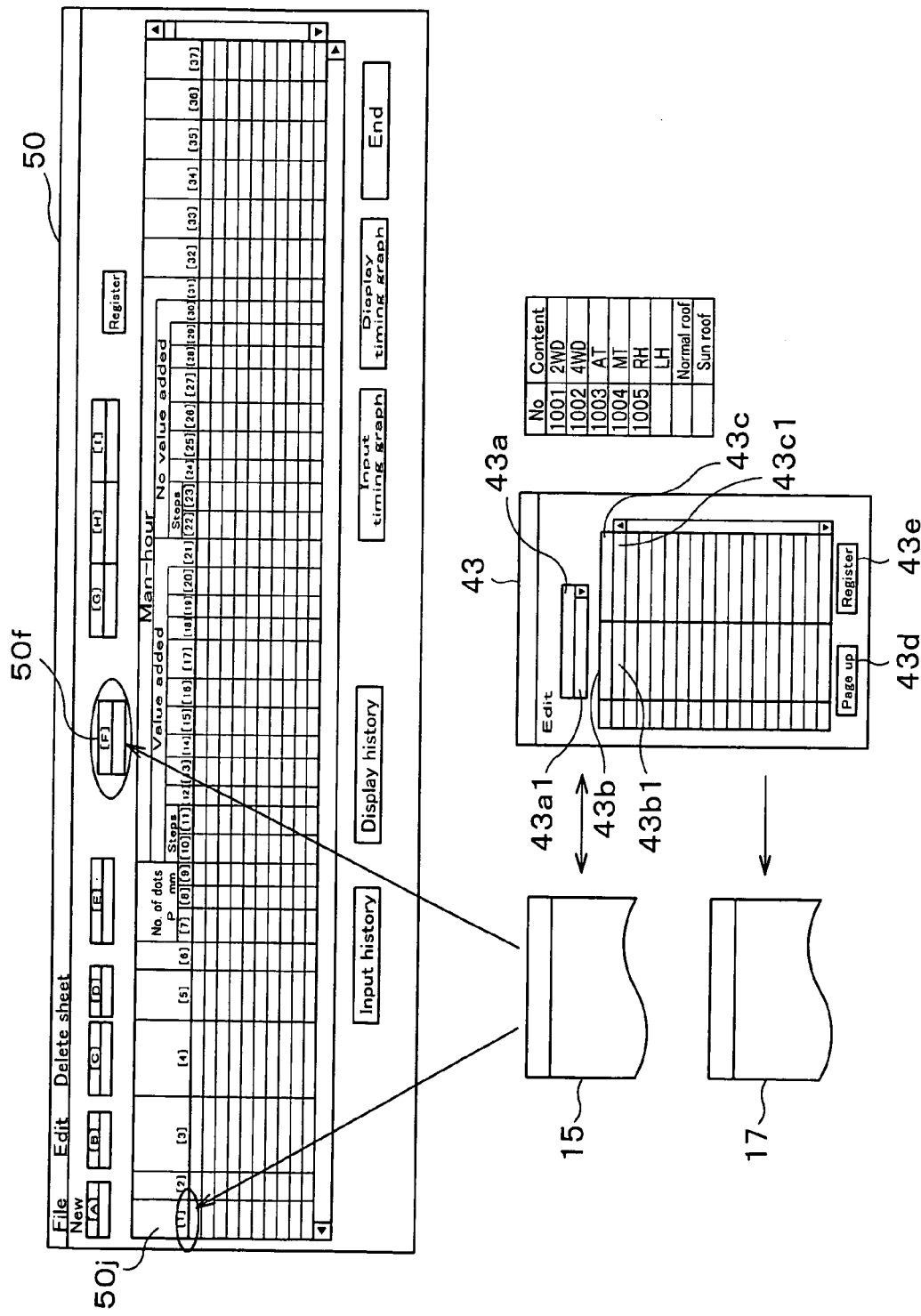
FIG. 14 is a diagram showing the relationship between the registration screen and derivation table of derivation classification registration management and the main screen of the main man-hour management in the embodiment.

Next, the derivation classification registration management DS3 will be described with reference to FIG. 11 and FIG. 14. The derivation classification registration management DS3 registers and manages the derivation assortment items for each series, and it registers and manages data by the derivation table 15. Item data for use in the main man-hour management system MS are registered in the derivation table 15 beforehand, whereby the selective assignment of a derivation item is permitted. The data which are registered and managed correspond to the derivation [1] of the main man-hour management table 18.

The derivation classification registration management DS3 is such that, when the selection button 40*c* of the menu screen 40 indicated on the display of the connection terminal 4 is clicked by the user, a derivation classification registration management program is loaded into the RAM of the connection terminal 4 and is run by the CPU thereof. Then, the registration screen 43 of the derivation classification registration management DS3 as shown in FIG. 14 is indicated on the display of the connection terminal 4. At the start-up of the registration screen 43, data already registered in the derivation table 15 are read out and are displayed on the registration screen 43. Herein, the data of the derivation table 15 are concretely derivation code Nos and derivation names corresponding to individual series. Incidentally, the registration screen 43 is a screen for registering the derivation code Nos and derivation names included in each of the series. On the registration screen 43, accordingly, a series column 43*a* is displayed, and a derivation code No column 43*b* and a derivation name column 43*c* are arrayed and displayed. In addition, the series column 43*a* includes a selection box 43*a*1 for registering the series, the derivation code No column 43*b* includes a plurality of text boxes 43*b*1, . . . for registering the derivation code Nos, and the derivation name column 43*c* includes a plurality of text boxes 43*c*1, . . . for registering the derivation names, in correspondence with the text boxes 43*b*1, . . . . By the way, the derivation code Nos are unique Nos which are assigned in correspondence with 2WD, 4WD, AT, MT, right steering wheel, . . . being the derivation names, and which are "1001", "1002", "1003", "1004", "1005", . . . .

In case of inputting a new derivation name, the user moves the cursor to the selection box 43*a*1 of the series column 43*a* of the registration screen 43. Besides, he/she selects the series for inputting the new derivation name, from within the selection box 43*a*1. Then, with the identifier of the selected series (the identifier registered for each series in the series registration management DS2) used as a key, the derivation code Nos and derivation names corresponding to the selected series are read out of the derivation table 15 and are respectively displayed in the derivation No column 43*b* and derivation name column 43*c*. Subsequently, the user moves the cursor to any of the text boxes 43*b*1, . . . of the derivation code No column 43*b* of the registration screen 43. Besides, he/she inputs the derivation code No line name to the specified text box 43*b*1. Further, in order to input the derivation name in correspondence with the derivation code No, the user moves the cursor to that one of the text boxes 43*c*1, . . . of the derivation name column 43*c* of the registration screen 43 which corresponds to the derivation code No. Besides, he/she inputs the derivation name to the specified text box 43*c*1. By the way, in the presence of a plurality of new derivation names, the above input processing is iterated a plurality of number of times. Subsequently, in case of registering the inputted derivation code No and derivation name, the user clicks the registration button 43*e* of the registration screen 43, whereby the data are registered in the derivation table 15 and the derivation application table 17. By the way, in case of registering no data, or in case of returning to the menu screen 40, the user clicks the previous screen button 43*d* of the registration screen 43. Then, the registration screen 43 is erased from the display of the connection terminal 4, and the menu screen 40 is displayed.

Incidentally, the data registered in the derivation table 15 can be selected in the derivation display selection column 50*f* of the main screen 50 of the main man-hour management MS1. Besides, the selected data are displayed in the derivation column 50*j* of the main screen 50.

Figure 15:
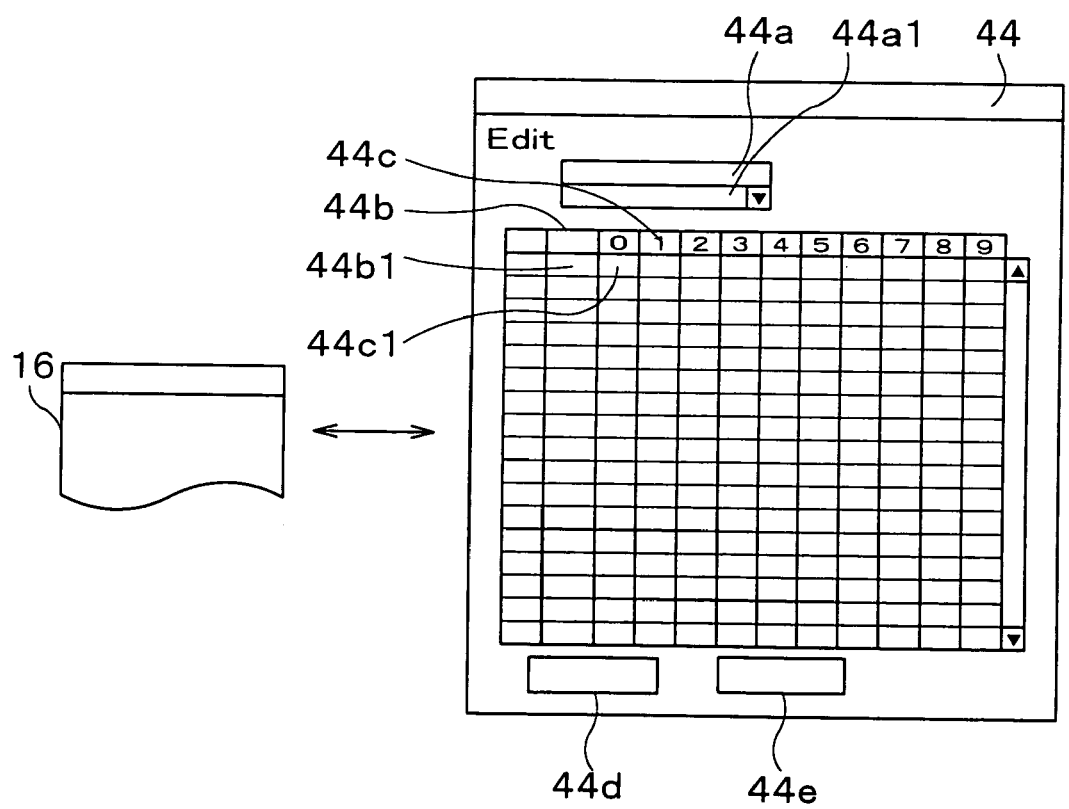
FIG. 15 shows the registration screen of derivation format registration management in the embodiment.

Next, the derivation format registration management DS4 will be described with reference to FIG. 11 and FIG. 15. The derivation format registration management DS4 performs the registration management/reorganization management of the format master data of derivation application codes, and it registers and manages the data by the derivation format table 16.

The derivation format registration management DS4 is such that, when the selection button 40*d* of the menu screen 40 indicated on the display of the connection terminal 4 is clicked by the user, a derivation format registration management program is loaded into the RAM of the connection terminal 4 and is run by the CPU thereof. Then, the registration screen 44 of the derivation format registration management DS4 as shown in FIG. 15 is indicated on the display of the connection terminal 4. At the start-up of the registration screen 44, data already registered in the derivation format table 16 are read out and are displayed on the registration screen 44. Herein, the data of the derivation format table 16 are concretely derivation format codes correspondent to individual series, and the derivation flags of the derivation format codes. Incidentally, the registration screen 44 is a screen for registering the derivation format codes correspondent to each of the series, and the derivation flags of the derivation format codes. On the registration screen 44, accordingly, a series column 44*a* is displayed, and a derivation format code column 44*b* and derivation flag columns 44*c* are arrayed and displayed. In addition, the series column 44*a* includes a selection box 44*a*1 for selecting the series, the derivation format code column 44*b* includes a plurality of text boxes 44*b*1, . . . for registering the derivation format codes, and each of the derivation flag columns 44*c* includes a plurality of text boxes 44*c*1, . . . for registering the derivation flags, in correspondence with the text boxes 44*b*1, . . . . By the way, up to ten derivation flags can be set for one derivation format code.

In case of inputting derivation format data, the user moves the cursor to the selection box 44*a*1 of the series column 44*a* of the registration screen 44. Besides, he/she selects the series from within the selection box 44*a*1. Then, with the identifier of the selected series (the identifier registered for each series in the series registration management DS2) used as a key, the derivation format codes and derivation flags corresponding to the selected series are read out of the derivation format table 16 and are respectively displayed in the derivation format code column 44*b* and derivation flag columns 44*c*. Subsequently, the user moves the cursor to any of the text boxes 44*b*1, . . . of the derivation format code column 44*b* of the registration screen 44. Besides, he/she inputs the derivation format code to the specified text box 44*b*1. Further, in order to input the derivation flag in correspondence with the derivation format code, the user moves the cursor to that one of the text boxes 44*c*1, . . . of the derivation flag columns 44*c* of the registration screen 44 which corresponds to the derivation format code. Besides, he/she inputs the derivation flag to the specified text box 44*c*1. By the way, in the presence of a plurality of derivation format codes to-be-registered, the above input processing is iterated a plurality of number of times. Subsequently, in case of registering the inputted derivation format code and derivation flag, the user clicks the registration button 44*d* of the registration screen 44, whereby the data are registered in the derivation format table 16. By the way, in case of registering no data, or in case of returning to the menu screen 40, the user clicks the previous screen button 44*e* of the registration screen 44. Then, the registration screen 44 is erased from the display of the connection terminal 4, and the menu screen 40 is displayed.

Figure 16:
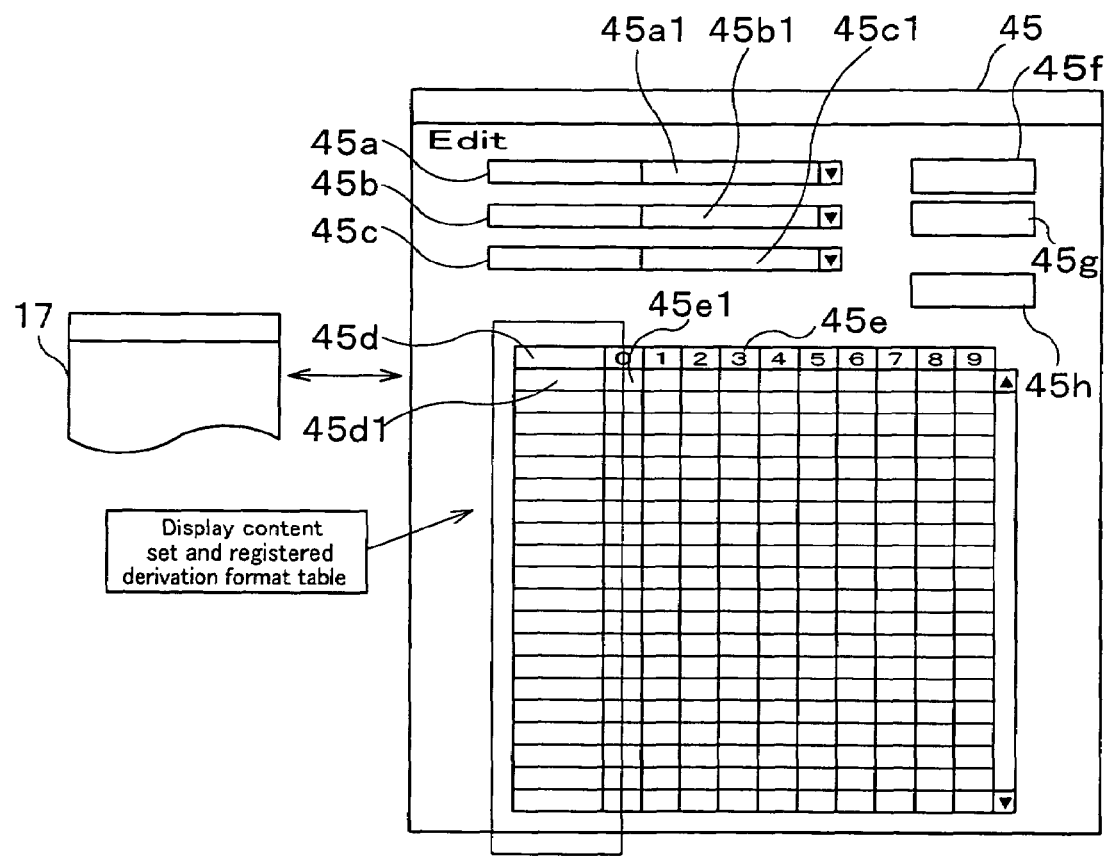
FIG. 16 shows the registration screen of derivation code table management in the embodiment.

Next, the derivation code table management DS5 will be described with reference to FIG. 11 and FIG. 16. The derivation code table management DS5 performs the registration management/reorganization management of derivation application code data, and it registers and manages the data by the derivation application table 17.

The derivation code table management DS5 is such that, when the selection button 40*e* of the menu screen 40 indicated on the display of the connection terminal 4 is clicked by the user, a derivation code table management program is loaded into the RAM of the connection terminal 4 and is run by the CPU thereof. Then, the registration screen 45 of the derivation code table management DS5 as shown in FIG. 16 is indicated on the display of the connection terminal 4. At the start-up of the registration screen 45, data already registered in the derivation application table 17 are read out and are displayed on the registration screen 45. Herein, the data of the derivation application table 17 are concretely derivation format codes correspondent to the derivatives of individual series, and the application flags of the derivation format codes. Incidentally, the registration screen 45 is a screen for registering the derivation format codes correspondent to each of the derivatives of the series, and the application flags of the derivation format codes. On the registration screen 45, accordingly, a series column 45*a*, a derivation code No column 45*b* and a derivation name column 45*c* are arrayed and displayed, and a derivation format code column 45*d* and application flag columns 45*e* are arrayed and displayed. In addition, the series column 45*a* includes a selection box 45*a*1 for selecting the series, the derivation code No column 45*b* includes a selection box 45*b*1 for selecting the derivation code No, the derivation name column 45*c* includes a display box 45*c*1 for displaying the derivation name, the derivation format code column 45*d* includes a plurality of display boxes 45*d*1, . . . for displaying the derivation format codes, and each of the application flag columns 45*e* includes a plurality of text boxes 45*e*1, . . . for registering the application flags, in correspondence with the display boxes 45*d*1, . . . . By the way, up to ten application flags can be set for one derivation format code.

In case of inputting derivation application data, the user moves the cursor to the selection box 45*a*1 of the series column 45*a* of the registration screen 45. Besides, he/she selects the series from within the selection box 45*a*1. Then, with the identifier of the selected series (the identifier registered for each series in the series registration management DS2) used as a key, the derivation format codes corresponding to the selected series are read out of the derivation format table 16 and are displayed in the derivation format code column 45*d*. Also, with the identifier of the selected series used as a key, the derivation code Nos corresponding to the selected series are read out of the derivation table 15 and are displayed in the derivation code No column 45*b*. Subsequently, the user moves the cursor to the selection box 45*b*1 of the derivation code No column 45*b* of the registration screen 45. Besides, he/she selects the derivation code No from within the selection box 45*b*1. Then, with the selected derivation code No used as a key, the derivation name corresponding to the selected derivation code No is read out of the derivation table 15 and is displayed in the display box 45*c*1 of the derivation name column 45*c*. Here, the user clicks the invoking button 45*f* of the registration screen 45. Then, with the identifier of the series and the derivation code No used as keys, the derivation application code data which correspond to the selected series and derivation code No are read out of the derivation application table 17 and are displayed in the application flag columns 45*e*. Subsequently, in order to input the application flag in correspondence with the derivation format code, the user moves the cursor to one of the text boxes 45*e*1, . . . of the application flag columns 45e of the registration screen 45. Besides, he/she inputs the application flag to the specified text box 45e1. By the way, in the presence of a plurality of derivation application codes to-be-registered, the above input processing is iterated a plurality of number of times. Subsequently, in case of registering the inputted derivation application code data, the user clicks the registration button 45g of the registration screen 45, whereby the data are registered in the derivation application table 17. By the way, in case of registering no data, or in case of returning to the menu screen 40, the user clicks the quit button 45h of the registration screen 45. Then, the registration screen 45 is erased from the display of the connection terminal 4, and the menu screen 40 is displayed.

Next, the main man-hour management system MS will be described with reference to FIGS. 17A and 17B through FIG. 32. The main man-hour management system MS performs man-hour management every process in a cost-center, on the basis of data registered by the standardized man-hour management system SS and the derivation management system DS beforehand.

Figure 17A:
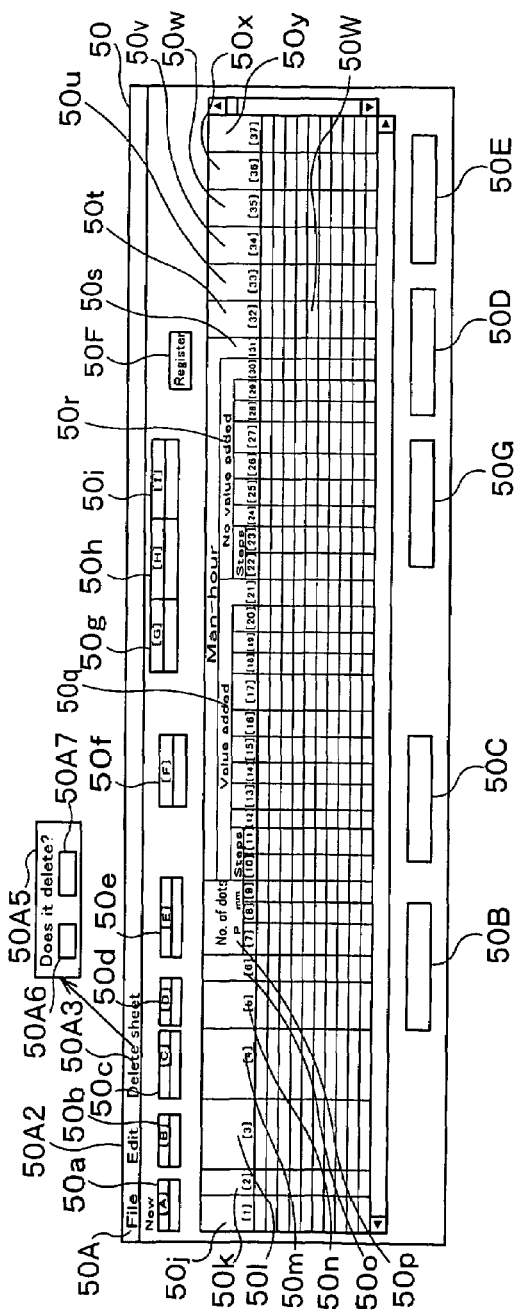

The main man-hour management system MS is such that, when a main man-hour management system starting icon (not shown) indicated on the display of the connection terminal 4 is clicked by the user, a main man-hour management system program is loaded into the RAM of the connection terminal 4 and is run by the CPU thereof. Then, the main screen 50 of the main man-hour management system MS as shown in FIG. 17A is indicated on the display of the connection terminal 4. Incidentally, the main screen 50 is also that of the main man-hour management MS1.

Displayed on the main screen 50 are a series column 50a, a line No column 50b, a line name column 50c, a cost center column 50d, a process name column 50e, a derivation display selection column 50f, a total man-hour column 50g, a column 50h for the aggregation of man-hours having values added, a column 50i for the aggregation of man-hours having no values added, a derivation column 50j, a procedure column 50k, a constituent work CW (element work) (what) column 50l, a constituent work CW (element work) (where) column 50m, a constituent work CW (element work) (how) column 50n, a frequency column 50o, a number-of-dots column 50p, a column 50q for the man-hours having values added, a column 50r for the man-hours having no values added, a man-hour total column 50s, a TARGET part No column 50t, a DWG No column 50u, a remarks column 50v, a standard walk column 50w, a standard work column 50x and a standard work column 50y; and a menu 50A, a history input button 50B, a history display button 50C, a timing graph display button 50D, a quit button 50E, a registration button 50F and a timing graph input button 50G. Herein, data are set in the columns 50a–50y by assigning thereto the data of the tables 10–17 previously registered by the standardized man-hour management system SS and derivation management system DS, or by directly inputting the data thereto. When the user clicks the registration button 50F after the setting of the data in the columns 50a–50y, the data set in these columns 50a–50y are registered in the main man-hour management table 18. Incidentally, the data of the columns 50a–50y are managed in each individual process unit. Especially, the constituent work CW (element work) item data of the columns 50j–50y in each individual process unit are managed as a worksheet 50W. Each of the columns 50j–50y of the worksheet 50W includes a plurality of text boxes, in which data are set for respective constituent work CW (element work) or for the respective conditions of the constituent work CW (element work). Besides, when the user clicks any of the buttons 50B, 50C, 50D and 50G, a corresponding application is executed, and when he/she clicks the quit button 50E, the application of the main man-hour management system MS is ended to erase the main screen 50 from the display of the connection terminal 4.

Next, the main man-hour management MS1 will be described with reference to FIGS. 17A and 17B through FIG. 24. The main man-hour management MS1 performs the registration management/reorganization management of constituent work CW (element work) item data in process units, and it performs them by the main man-hour management table 18. The main man-hour management table 18 are assigned the data of the work constituent condition table 10, standardized man-hour table 11, walk man-hour conversion table 12, series table 13, line name table 14, derivation table 15, derivation format table 16 and derivation application table 17.

The main man-hour management MS1 is such that, when a main man-hour management (main man-hour management system) starting icon (not shown) indicated on the display of the connection terminal 4 is clicked by the user, a main man-hour management program is loaded into the RAM of the connection terminal 4 along with the main man-hour management system program and is run by the CPU thereof. Then, the main screen 50 of the main man-hour management MS1 (main man-hour management system MS) as shown in FIG. 17A is indicated on the display of the connection terminal 4.

Figure 17B:
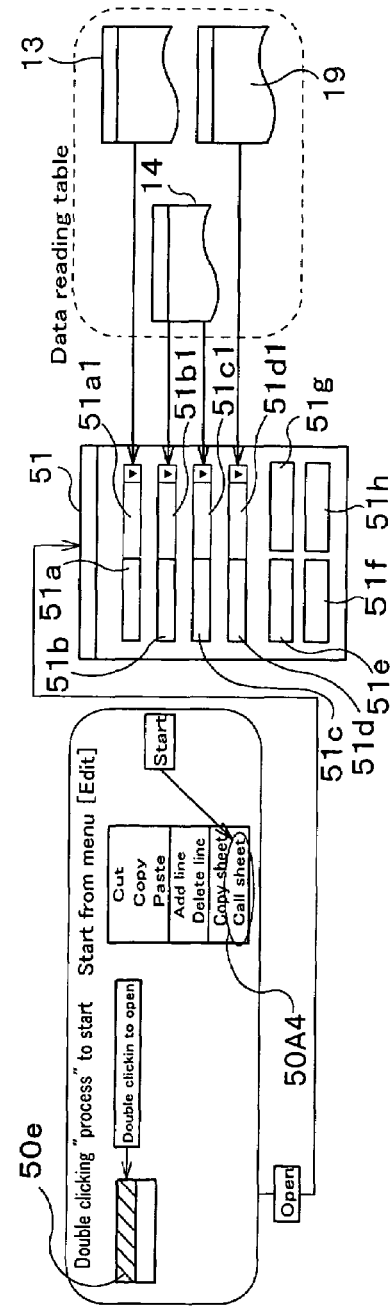

The invocation of the constituent work CW (element work) item data (worksheet) in each individual process unit will be described with reference to FIGS. 17A and 17B. First, as shown in FIG. 17B, the user selects the sheet invocation 50A4 of editing 50A2 by double-clicking the process name column 50e of the main screen 50 or clicking the editing 50A2 of the menu 50A. Then, a sheet invoking screen 51 is indicated on the display of the connection terminal 4. At the start-up of the sheet invoking screen 51, data registered in the series table 13 and line name table 14 are read out, and they are respectively displayed in the selection box 51a1 of a series column 51a and the selection box 51b1 of a line No column 51b. Therefore, the user moves the cursor to the selection box 51a1 of the series column 51a so as to select a series correspondent to a process to-be-invoked from within the selection box 51a1. Further, he/she moves the cursor to the selection box 51b1 of the line No column 51b so as to select a line No correspondent to the process to-be-invoked from within the selection box 51b1. Then, with the selected series and line No used as keys, line names are read out of the line name table 14 and are displayed in the selection box 51c1 of a line name column 51c. Therefore, the user moves the cursor to the selection box 51c1 of the line name column 51c so as to select a line name correspondent to the process to-be-invoked from within the selection box 51c1. Then, with the selected line No and line name used as keys, process names are read out of the process name table 19 and are displayed in the selection box 51d1 of a process name column 51d. Therefore, the user moves the cursor to the selection box 51d1 of the process name column 51d so as to select a process name to-be-invoked from within the selection box 51d1. Besides, he/she clicks the invocation button 51g of the sheet invoking screen 51. Then, with the selected series, line No, line name and process name used as keys, the constituent work CW (element work) item data in each individual process unit are read out of the main man-hour management table 18 and are displayed in the worksheet 50W of the main screen 50. When the data are displayed on the worksheet 50W, the user clicks the cancel/previous screen button 51h of the sheet invoking screen 51. Then, the sheet invoking screen 51 is erased from the display of the connection terminal 4.

The deletion of the constituent work CW (element work) item data (worksheet) in each individual process unit will be described with reference to FIG. 17A. First, the user invokes the worksheet 50W to-be-deleted in accordance with a procedure of steps similar to the procedure of steps of the above invocation of the constituent work CW (element work) item data (worksheet) in each individual process unit. Besides, he/she clicks the sheet deletion 50A3 of the menu 50A. Then, a delete validating screen 50A5 is displayed. Herein, when the user clicks the YES button 50A6 of the delete validating screen 50A5, the data of the worksheet 50W are deleted from the main man-hour management table 18, process name table 19, change history table 20 and timing graph data table 21, or when he/she clicks the NO button 50A7 of the delete validating screen 50A5, the deletion of the worksheet 50W is cancelled.

The registration of the constituent work CW (element work) item data (worksheet) in each individual process unit will be described with reference to FIG. 17A. First, the user invokes the worksheet 50W to-be-registered in accordance with a procedure of steps similar to the procedure of steps of the above invocation of the constituent work CW (element work) item data (worksheet) in each individual process unit, or he/she creates the registered worksheet 50W anew. Subsequently, the user clicks the registration button 50F of the main screen 50. Then, the data of the worksheet 50W are registered in the main man-hour management table 18, process name table 19, change history table 20 and timing graph data table 21. In the registration, it is checked whether or not the constituent work CW (element work) set in the worksheet 50W are held registered in the work constituent condition table 10. In a case where any of the constituent work CW (element work) is not held registered, a message "Constituent work CW (element work) at line X is not held registered" is indicated on the display of the connection terminal 4. Also, it is checked whether or not walk man-hours and standardized man-hours for the works set in the worksheet 50W are respectively held registered in the walk man-hour conversion table 12 and standardized man-hour table 11. In a case where any of the man-hours is not held registered, a message "Walk man-hours at line X (or Standardized man-hours of work Y) are not held registered" is indicated on the display of the connection terminal 4. In the case where the data are not previously registered as stated above, the user registers the data in the tables 10, 11 and 12. Further, in line units of the worksheet 50W, it is checked whether or not data are set in both the equipmental work [19] of the "column 50q for man-hours having values added" and any of the items [10]–[18], [20] of the "column 50q for man-hours having values added", as well as the items [22]–[28] of the "column 50r for man-hours having no values added". In a case where the data are set in both the items, a message "Man-hour setting position at line X is erroneous" is indicated on the display of the connection terminal 4. The reason therefor is that both a personal work and an equipmental work are not carried out in the constituent work CW (element work) at each line of the worksheet 50W. In the case where the data are set in both the items as stated above, the user reconsiders the man-hour setting and corrects the erroneous data. Further, in line units of the worksheet 50W, comparisons are made between the man-hours of the total of the waits 1–5 [42], [44], [46], [48] and [50] of the timing graph data table 21 (refer to FIG. 3) and the wait [29] of the "column 50r for man-hours having no values added". In a case where the man-hours disagree, a message "Wait man-hours at line X disagree" is indicated on the display of the connection terminal 4. In the case of the disagreement, the user reconsiders the wait man-hours and corrects the data.

The setting of the derivation column 50j of the main screen 50 will be described with reference to FIGS. 18A–18F. First, let's consider derivation setting for the constituent work CW (element work) item data (worksheet) in process units. The user double-clicks the derivation display selection column 50f. Then, derivation code Nos and derivation names are read out of the derivation table 15, and a derivation display selection screen 50/0 is indicated on the display of the connection terminal 4. Herein, the user selects "All " in the selection box 50/5 of the derivative 1 column 50/1 of the derivation display selection screen 50/0, thereby to blank derivative 2–4 columns 50/2–50/4 (refer to FIG. 18B). Then, the text boxes 50j1, . . . of the derivation column 50j of the main screen 50 become blank, and the constituent work CW (element work) items of all derivatives become subjects to-be-handled. By the way, in the case where the text boxes 50j1, . . . are blank, all the constituent work CW (element work) item data are displayed in the worksheet 50W irrespective of the derivation.

Figure 18A:
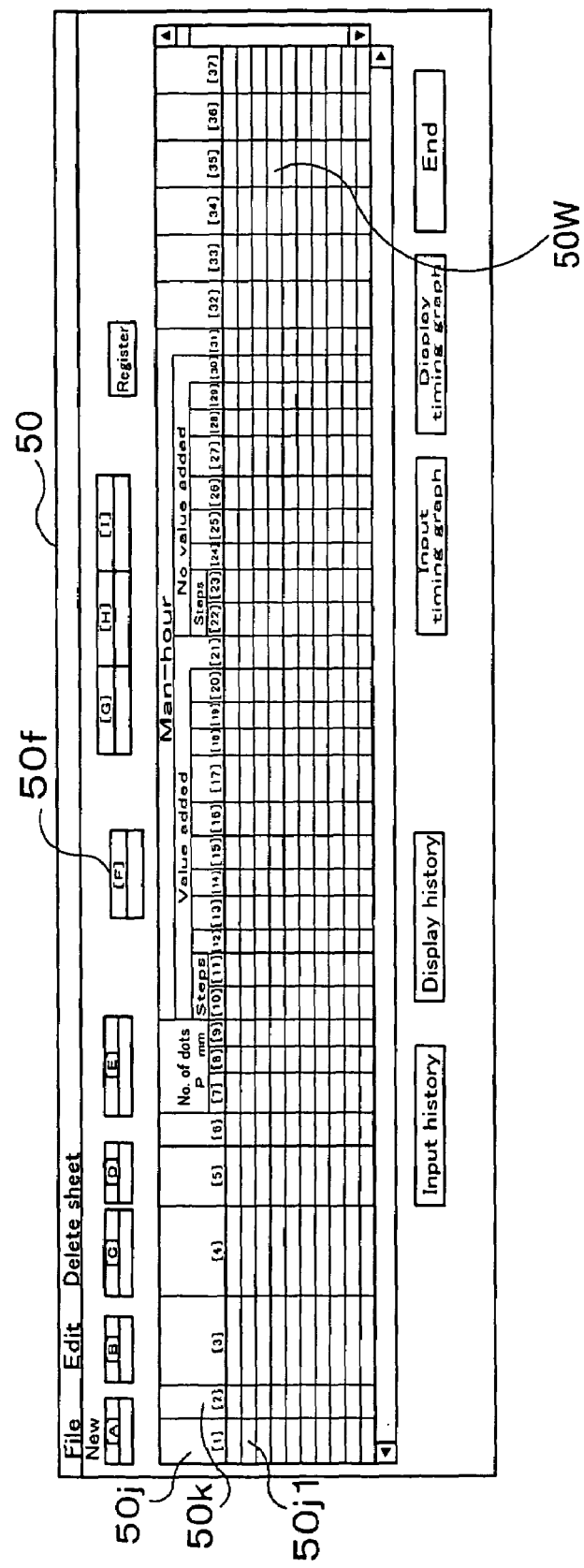
Figure 18B:
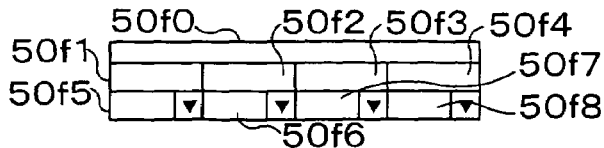
Figure 18C:
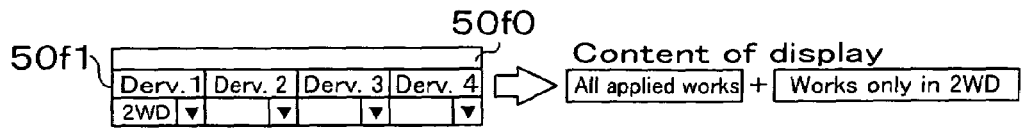
Figure 18D:
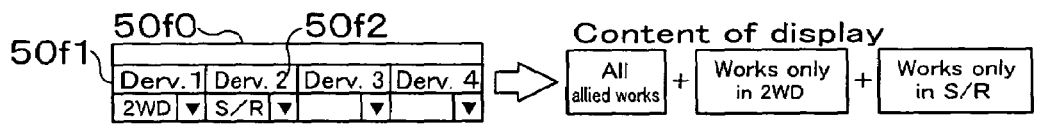

Next, let's consider derivation setting for the constituent work CW (element work) item data (worksheet) in derivation units. The user double-clicks the derivation display selection column 50f. Then, derivation code Nos and derivation names are read out of the derivation table 15, and the derivation display selection screen 50/0 is indicated on the display of the connection terminal 4. Herein, the user selects the derivation names to-be-handled from within the selection boxes 50/5–50/8 of the derivative 1–4 columns 50/1–50/4 of the derivation display selection screen 50/0. Then, the derivation names set on the derivation display selection screen 50/0 are assigned to the derivation column 50j of the main screen 50. Subsequently, the user closes the derivation display selection screen 50/0. Alternatively, he/she moves the cursor to any of the text boxes 50j1, . . . of the derivation column 50j. Besides, he/she inputs the derivation code No to the specified text box 50j1. Then, the derivation name is assigned from the derivation table 15 with a key being the inputted derivation code No. By way of example, in a case where a derivative "2WD" has been selected in the derivative 1 column 50/1 as shown in FIG. 18C, the constituent work CW (element work) item data in derivation units become the data of general-application work items and the constituent work CW (element work) item of the derivative "2WD". Also, in a case where the derivative "2WD" and a derivative "sunroof" have been respectively selected in the derivative 1 column 50/1 and the derivative 2 column 50/2 as shown in FIG. 18D, the constituent work CW (element work) item data in derivation units become the data of the general-application work items, the constituent work CW (element work) item of the derivative "2WD" and the constituent work CW (element work) item of the derivative "sunroof". Incidentally, the "general-application work items" are constituent work CW (element work) items which needs must be implemented irrespective of the derivation.

Figure 18E:
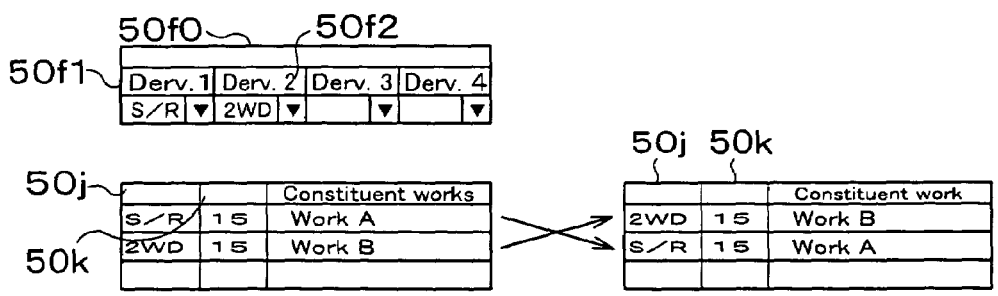
Figure 18F:
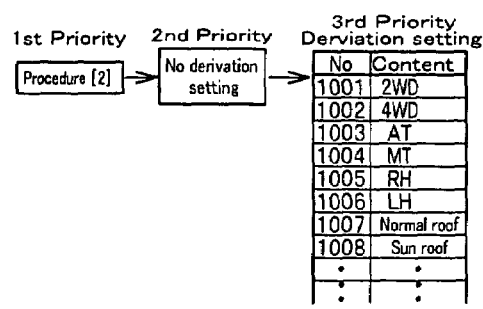

By the way, as shown in FIG. 18F, the first priority of the display sequence of the constituent work CW (element work) to be displayed in the worksheet 50W is the sequence of Nos set in the procedure column 50k. Besides, in a case where any of the Nos set in the procedure column 50k is repeated, the second priority is given to the constituent work CW (element work) for which the derivation column 50j is not set, and the third priority conforms to the sequence in which the derivation code Nos set in the derivation column 50j are smaller. More specifically, as shown in FIG. 18E, the derivatives "sunroof" and "2WD" are respectively set in the derivative 1 column 50f1 and derivative 2 column 50f2, and "15" is set for both the derivatives as the No of the procedure column 50k. Since, however, the derivation code Nos of the derivatives "2WD" and "sunroof" are "1001" and "1008", respectively (refer to FIG. 18F), the derivative "2WD" precedes in the display sequence of the constituent work CW (element work) item data.

Figure 19:
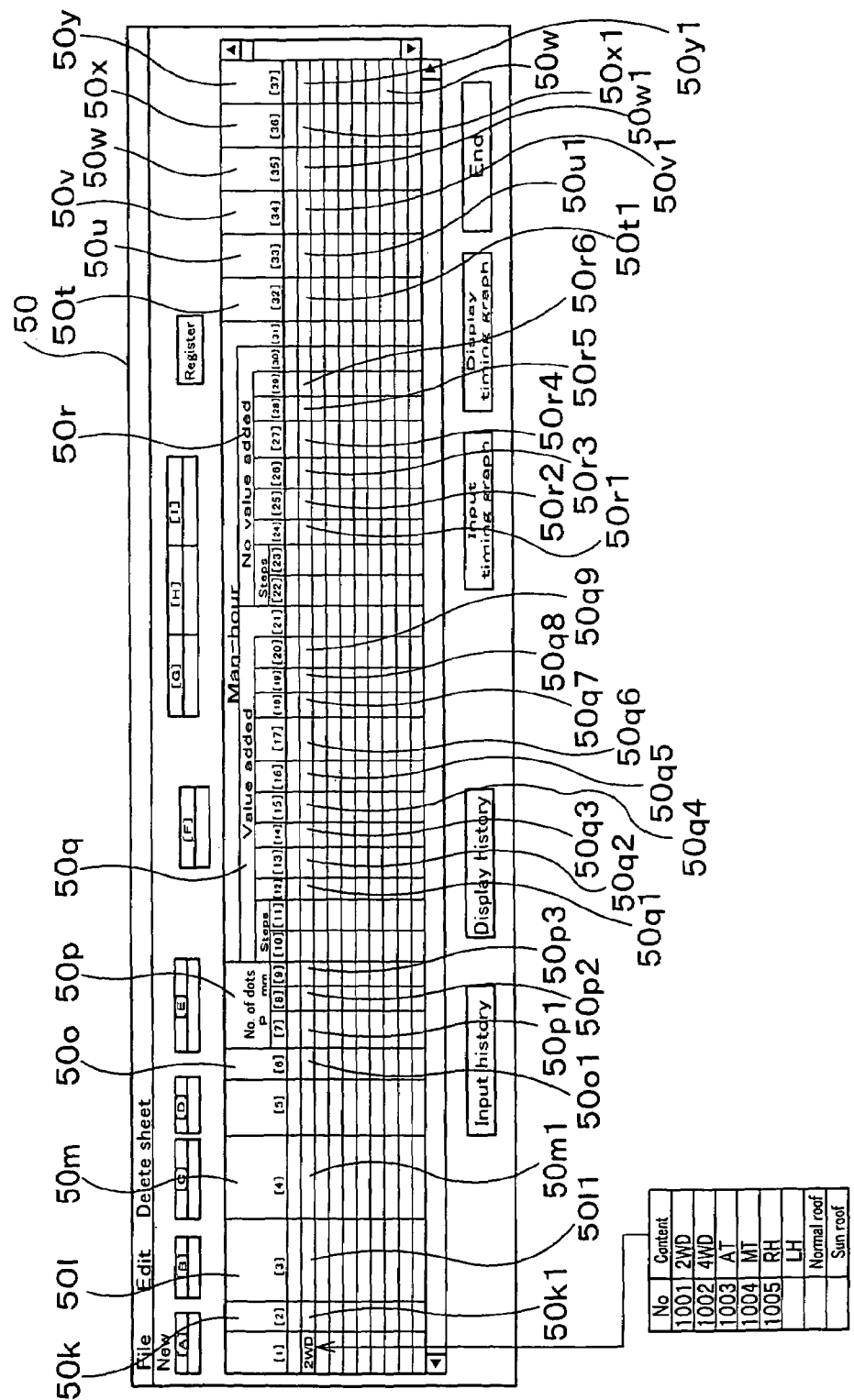
FIG. 19 is a diagram for explaining the setting of the constituent work CW (element work) items in the main screen of the main man-hour management in the embodiment.

The setting of the procedure column 50k of the main screen 50 will be described with reference to FIG. 19. The user moves the cursor to any of the text boxes 50k1, ... of the procedure column 50k. Besides, the user inputs a procedure to the specified text box 50k1.

The setting of the constituent work CW (element work) (what) column 50l of the main screen 50 will be described with reference to FIG. 19. The user moves the cursor to any of the text boxes 50l1, ... of the constituent work CW (element work) (what) column 50l. Besides, the user inputs what is to be implemented as a constituent work CW (element work), to the specified text box 50l1.

The setting of the constituent work CW (element work) (where) column 50m of the main screen 50 will be described with reference to FIG. 19. The user moves the cursor to any of the text boxes 50m1, ... of the constituent work CW (element work) (where) column 50m. Besides, the user inputs where a constituent work CW (element work) is to be implemented, to the specified text box 50m1.

Figure 20:
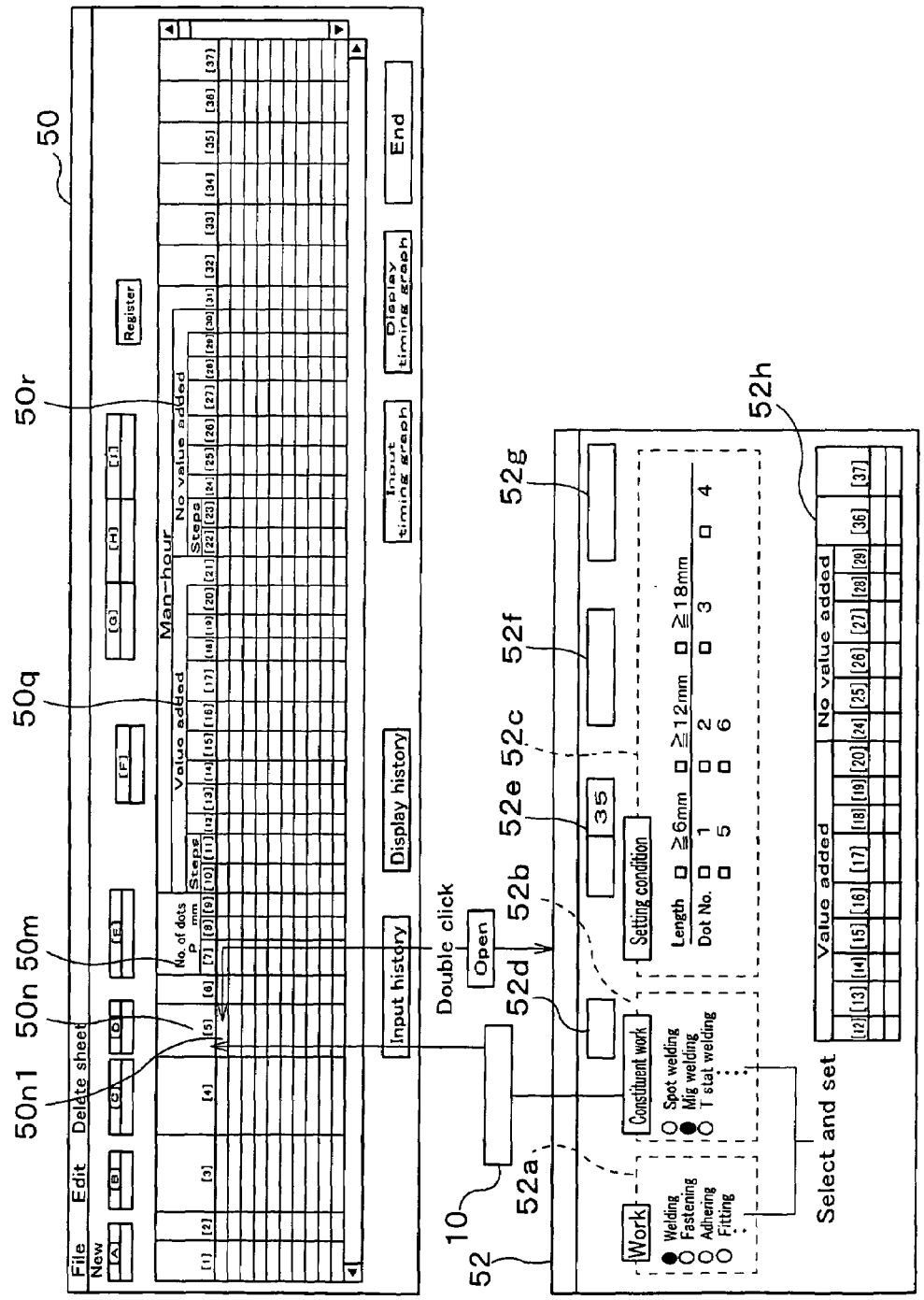
FIG. 20 is a diagram for explaining the condition setting and standardized man-hour setting of a constituent work CW (element work) in the main screen of the main man-hour management in the embodiment.

The setting of the constituent work CW (element work) (how) column 50n of the main screen 50 will be described with reference to FIG. 20. The user double-clicks any of the text boxes 50n1, ... of the constituent work CW (element work) (how) column 50n. Then, the classification data of the work constituent condition table 10 are read out, and a screen 52 for setting constituent work CW (element work) conditions is indicated on the display of the connection terminal 4. Herein, the user selects the class of a constituent work CW (element work) from within a class column 52a. Then, with a key being the selected class, the constituent work CW (element work) name data of the work constituent condition table 10 are read out and are displayed in the constituent work CW (element work) name column 52b of the setting screen 52. Therefore, the user selects the constituent work CW (element work) from within the constituent work CW (element work) name column 52b and double-clicks the selected constituent work CW (element work). Then, the selected constituent work CW (element work) is assigned to the specified text box 50n1 of the constituent work CW (element work) (how) column 50n. Incidentally, when the user clicks the previous screen button 52d of the setting screen 52, this setting screen 52 is erased from the display of the connection terminal 4.

Further, after the selection of the constituent work CW (element work) from within the constituent work CW (element work) name column 52b, work condition data are read out of the work constituent condition table 10 and are displayed in the work condition setting column 52c of the setting screen 52, with a key being a constituent work CW (element work) name. Herein, the user selects the work conditions of a length and the number of dots from within the work condition setting column 52c. Besides, when the user clicks the content display button 52f of the setting screen 52, data are read out of the standardized man-hour table 11 and are displayed in the analysis display column 52h of the setting screen 52, with keys being the selected class, constituent work CW (element work) and work conditions. Standardized man-hours for the items [12]–[20] of "man-hours having values added" and the items [24]–[29] of "man-hours having no values added" are displayed in the analysis display column 52h, and standardized material Nos are displayed in the standard works [36], [37]. Further, the total value of the standardized man-hours displayed in the analysis display column 52h is displayed in the man-hour column 52e of the setting screen 52.

The setting of the frequency column 50o of the main screen 50 will be described with reference to FIG. 19. The user moves the cursor to any of the textboxes 50o1, ... of the frequency column 50o. Besides, the user inputs a frequency to the specified text box 50o1.

The setting of the number-of-spots column 50p of the main screen 50 will be described with reference to FIG. 19. The user moves the cursor to any of the text boxes 50p1, ... of the SPOT [7] of the number-of-spots column 50p. Besides, he/she inputs "SPOT" to the specified text box 50p1. Further, the user moves the cursor to any of the text boxes 50p2, ... of the MIG [8] of the number-of-spots column 50p. Besides, he/she inputs "MIG" to the specified text box 50p2. Still further, the user moves the cursor to any of the text boxes 50p3, ... of the sealer [9] of the number-of-spots column 50p. Besides, he/she inputs "SEALER" to the specified text box 50p3.

The assignment setting of standardized man-hours for the items [12]–[20] of "man-hours having values added" and the items [24]–[29] of "man-hours having no values added" will be described with reference to FIG. 20. As in the foregoing description of the setting of the constituent work CW (element work) (how) column 50n of the main screen 50, the user selects the class, constituent work CW (element work) and work conditions in the class column 52a, constituent work CW (element work) column 52b and work condition setting column 52c of the setting screen 52, respectively. Besides, he/she clicks the man-hour assignment button 52g of the setting screen 52. Then, data are read out of the standardized man-hour table 11 with keys being the selected class, constituent work CW (element work) and work conditions. Thus, the standardized man-hours are assigned to the items [12]–[20] of the "column 50q for man-hours having values added" and the items [24]–[29] of the "column 50r for man-hours having no values added" of the main screen 50. Further, the standardized material Nos are assigned to the standard works [36], [37] of the main screen 50. After the assignments, the user clicks the previous screen button 52d of the setting screen 52, whereby the setting screen 52 is erased from the display of the connection terminal 4.

The input setting of standardized man-hours for the items [12]–[20] of "man-hours having values added" and the items [24]–[29] of "man-hours having no values added" will be described with reference to FIG. 19. The user moves the cursor to any of the text boxes 50q1, ... of the "column 50q for man-hours having values added". Besides, he/she inputs the standardized man-hours of the waist [12] to the specified text box 50q1. Further, the user moves the cursor to any of the text boxes 50q2, ... of the "column 50q for man-hours having values added". Besides, he/she inputs the standardized man-hours of the taking and putting [13] to the specified text box 50q2. Still further, the user moves the cursor to any of the text boxes 50q3, of the "column 50q for man-hours having values added". Besides, he/she inputs the standardized man-hours of the setting [14] to the specified text box 50q3. Yet further, the user moves the cursor to any of the text boxes 50*q*4, . . . of the "column 50*q* for man-hours having values added". Besides, he/she inputs the standardized man-hours of the "pushing a button" [15] to the specified text box 50*q*4. In addition, the user moves the cursor to any of the text boxes 50*q*5, . . . of the "column 50*q* for man-hours having values added". Besides, he/she inputs the standardized man-hours of the fluctuating time [16] to the specified text box 50*q*5. Still in addition, the user moves the cursor to any of the text boxes 50*q*6, . . . of the "column 50*q* for man-hours having values added". Besides, he/she inputs the standardized man-hours of the positioning [17] to the specified text box 50*q*6. Yet in addition, the user moves the cursor to any of the text boxes 50*q*7, . . . of the "column 50*q* for man-hours having values added". Besides, he/she inputs the standardized man-hours of the personal work [18] to the specified text box 50*q*7. Further, the user moves the cursor to any of the text boxes 50*q*8, . . . of the "column 50*q* for man-hours having values added". Besides, he/she inputs the standardized man-hours of the equipmental work [19] to the specified text box 50*q*8. Still further, the user moves the cursor to any of the text boxes 50*q*9, . . . of the "column 50*q* for man-hours having values added". Besides, he/she inputs the standardized man-hours of the carrying [20] to the specified text box 50*q*9. Meanwhile, the user moves the cursor to any of the text boxes 50*r*1, . . . of the "column 50*r* for man-hours having no values added". Besides, he/she inputs the standardized man-hours of the waist [24] to the specified text box 50*r*1. Further, the user moves the cursor to any of the text boxes 50*r*2, . . . of the "column 50*r* for man-hours having no values added". Besides, he/she inputs the standardized man-hours of the taking and putting [25] to the specified text box 50*r*2. Still further, the user moves the cursor to any of the text boxes 50*r*3, . . . of the "column 50*r* for man-hours having no values added". Besides, he/she inputs the standardized man-hours of the fluctuating time [26] to the specified text box 50*r*3. Yet further, the user moves the cursor to any of the text boxes 50*r*4, . . . of the "column 50*r* for man-hours having no values added". Besides, he/she inputs the standardized man-hours of the positioning [27] to the specified text box 50*r*4. In addition, the user moves the cursor to any of the text boxes 50*r*5, . . . of the "column 50*r* for man-hours having no values added". Besides, he/she inputs the standardized man-hours of the personal work [28] to the specified text box 50*r*5. Still in addition, the user moves the cursor to any of the text boxes 50*r*6, . . . of the "column 50*r* for man-hours having no values added". Besides, he/she inputs the standardized man-hours of the wait [29] to the specified text box 50*r*6.

Figure 21:
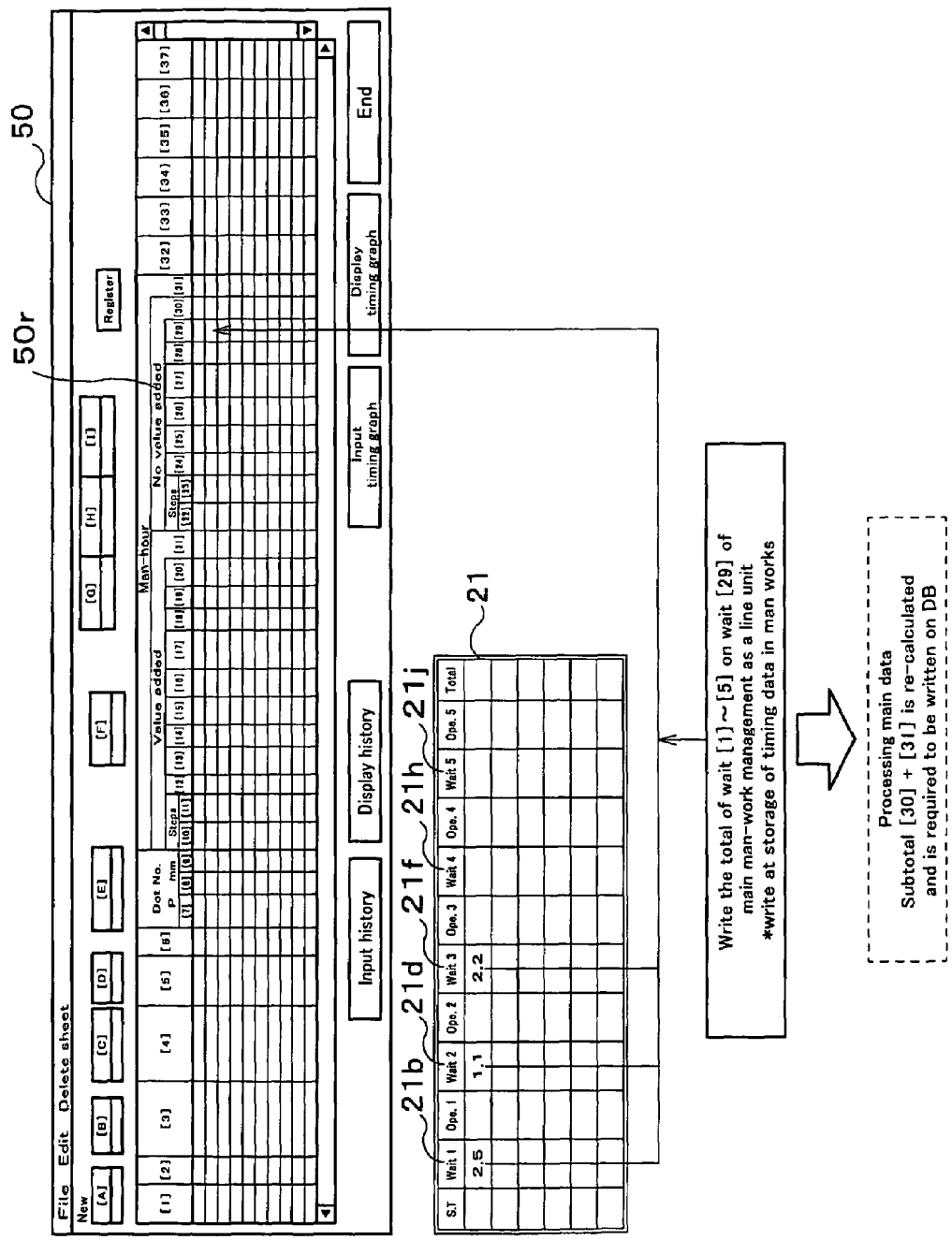
FIG. 21 is a diagram for explaining wait man-hour setting in the main screen of the main man-hour management in the embodiment.

The assignment setting of the standardized man-hours of the wait [29] in the "column 50*r* for man-hours having no values added" of the main screen 50 from timing graph data will be described with reference to FIG. 21. In a case where wait man-hours are held set in the wait 1–5 columns 21*b*, 21*d*, 21*f*, 21*h* and 21*j* of the timing graph data table 21, they are totalized in each individual line unit. Besides, the totalized man-hours are assigned to the wait [29] of the "column 50*r* for man-hours having no values added" of the main screen 50.

Figure 22:
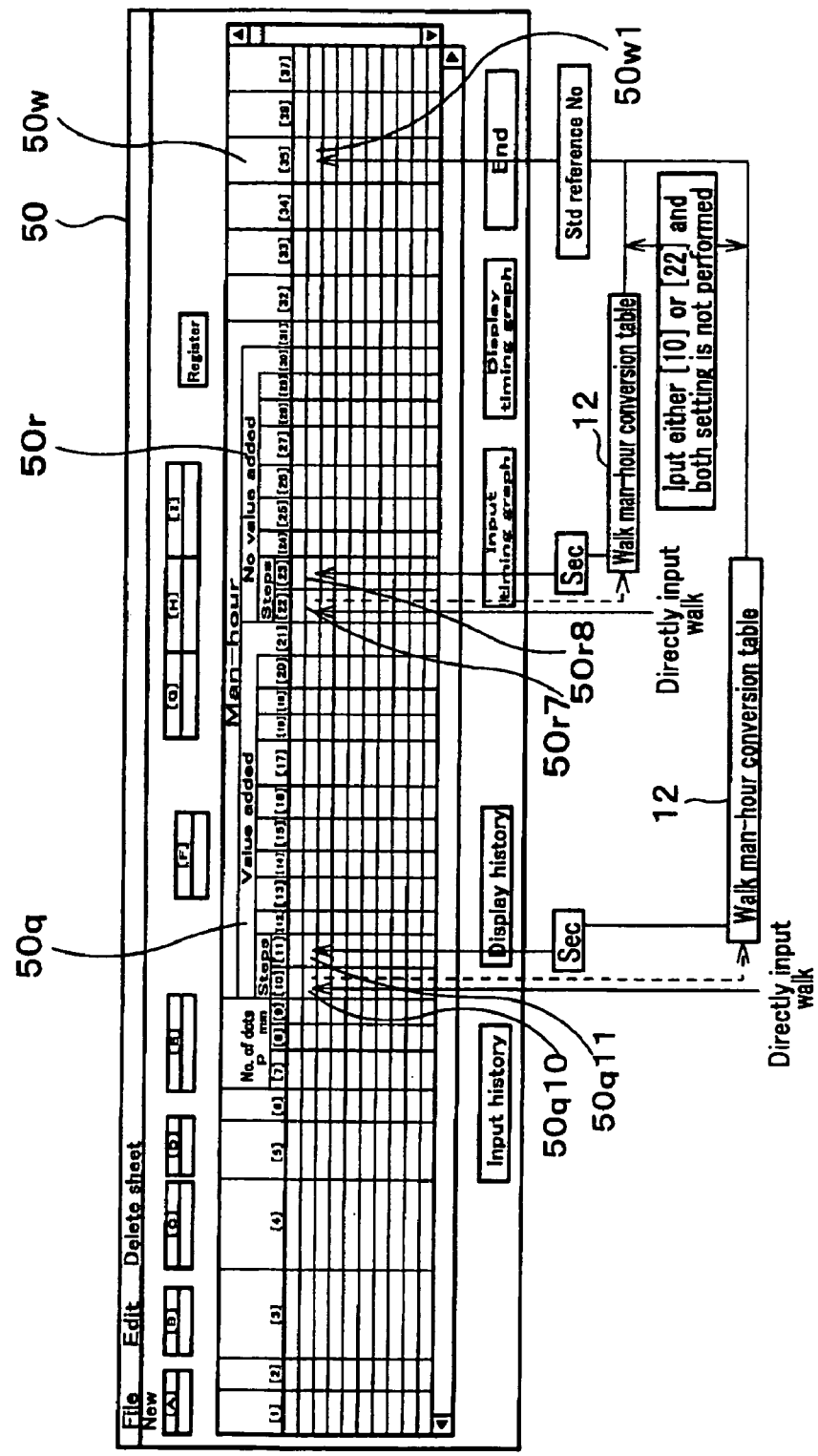
FIG. 22 is a diagram for explaining walk man-hour setting in the main screen of the main man-hour management in the embodiment.

The setting of the standardized man-hours of the numbers of steps in the "column 50*q* for man-hours having values added" and "column 50*r* for man-hours having no values added" of the main screen 50 will be described with reference to FIG. 22. First, the user moves the cursor to any of the text boxes 50*q*10, . . . of the "column 50*q* for man-hours having values added". Besides, he/she inputs the number of steps to the specified text box 50*q*10. Further, the user moves the cursor to any of the text boxes 50*r*7, . . . of the "column 50*r* for man-hours having no values added". Besides, he/she inputs the number of steps to the specified text box 50*r*7. Incidentally, either of the number of steps [10] and the number of steps [22] is inputted to the corresponding line. Then, with a key being the number of steps, the standardized man-hours (times) of walks are read out of the walk man-hour conversion table 12 and are assigned to the text boxes 50*q*11, . . . and 50*r*8, . . . of the times of steps in seconds [11]and [23]. Further, the standardized material Nos of the walks are read out of the walk man-hour conversion table 12 and are assigned to the text boxes 50*w*1, . . . of the standard walk column 50*w*.

Figure 23:
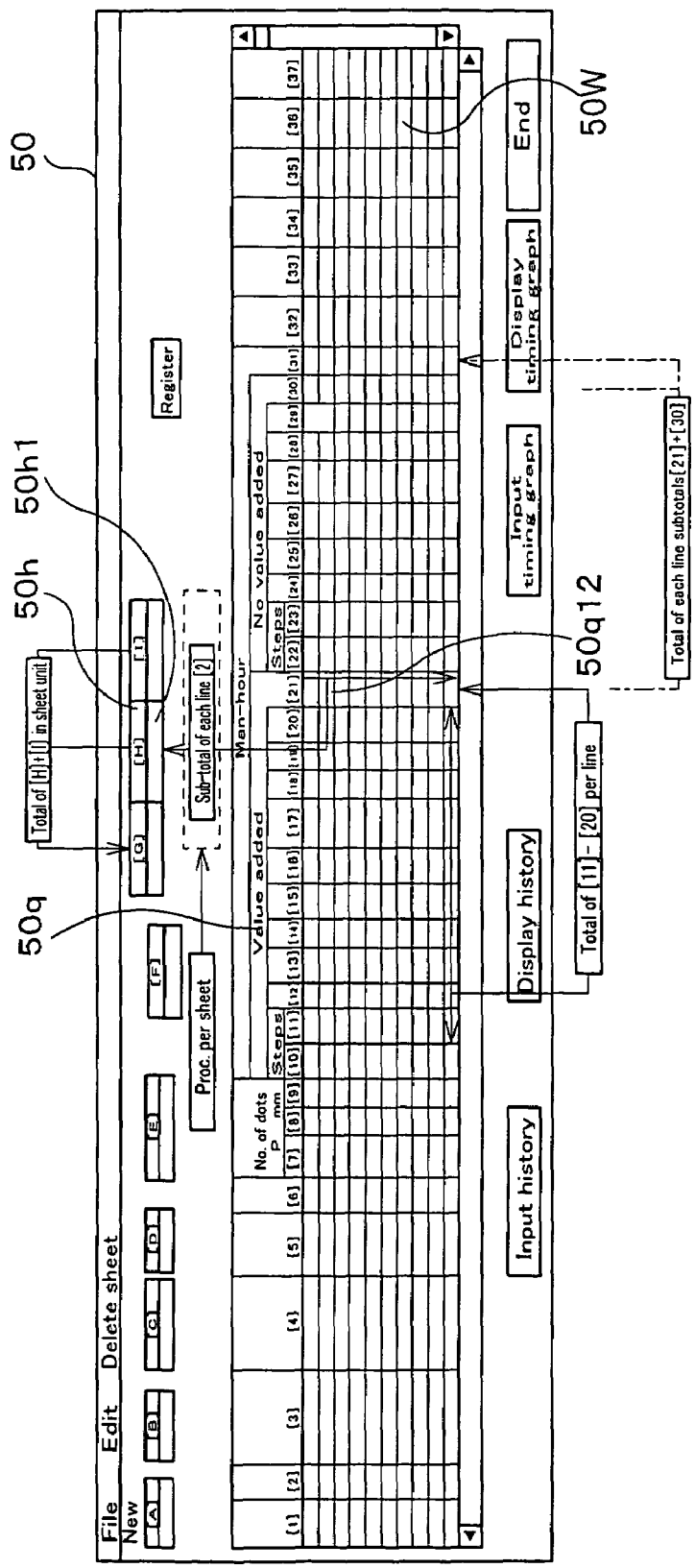
FIG. 23 is a diagram for explaining man-hour subtotal and total (in the presence of values added) setting in the main screen of the main man-hour management in the embodiment.

The setting of the subtotal [21] of the "column 50*q* for man-hours having values added" of the main screen 50, as well as the "column 50*h* for the aggregation of man-hours having values added" will be described with reference to FIG. 23. First, the presence or absence of the standardized man-hours of the equipmental work [19] is checked in each individual line unit of the worksheet 50W. In the absence of the standardized man-hours of the equipmental work [19], the presence or absence of the data of the frequency [6] is checked in each individual line unit. Herein, in the absence of the data of the frequency [6], the total of the standardized man-hours of the items [11]–[20] having values added is computed in each individual line unit, and the computed total is set in the subtotal [21] and is displayed in the text box 50*q*12 of the corresponding line. Also, in the presence of the data of the frequency [6], {(the total of the standardized man-hours of the items [12]–[20] having values added)×the frequency [6]+the standardized man-hours of the time of steps in seconds [11]} is computed in each individual line unit, and the computed result is set in the subtotal [21] and is displayed in the text box 50*q*12 of the corresponding line. On the other hand, in the presence of the standardized man-hours of the equipmental work [19], the presence or absence of the data of the frequency [6] is checked in each individual line unit. Herein, in the absence of the data in the frequency [6], the standardized man-hours of the equipmental work [19] are set in the subtotal [21] and are displayed in the text box 50*q*12 of the corresponding line. Also, in the presence of the data of the frequency [6], (the standardized man-hours of the equipmental work [19]×the frequency [6]) is computed, and the computed result is set in the subtotal [21] and is displayed in the text box 50*q*12 of the corresponding line. In due course, when the subtotals [21] of all the lines of the worksheet 50W have been set, they are totalized. Besides, the total value is set in the "aggregation [H] of man-hours having values added", and it is displayed in the text box 50*h*1 of the "column 50*h* for the aggregation of man-hours having values added". By the way, in a case where the standardized man-hours of the items [11]–[20] having values added have been altered, the subtotal [21] is computed again in each individual line unit. Besides, the total of the subtotals [21] of all the lines is computed again and is set in the "aggregation [H] of man-hours having values added" again.

Figure 24:
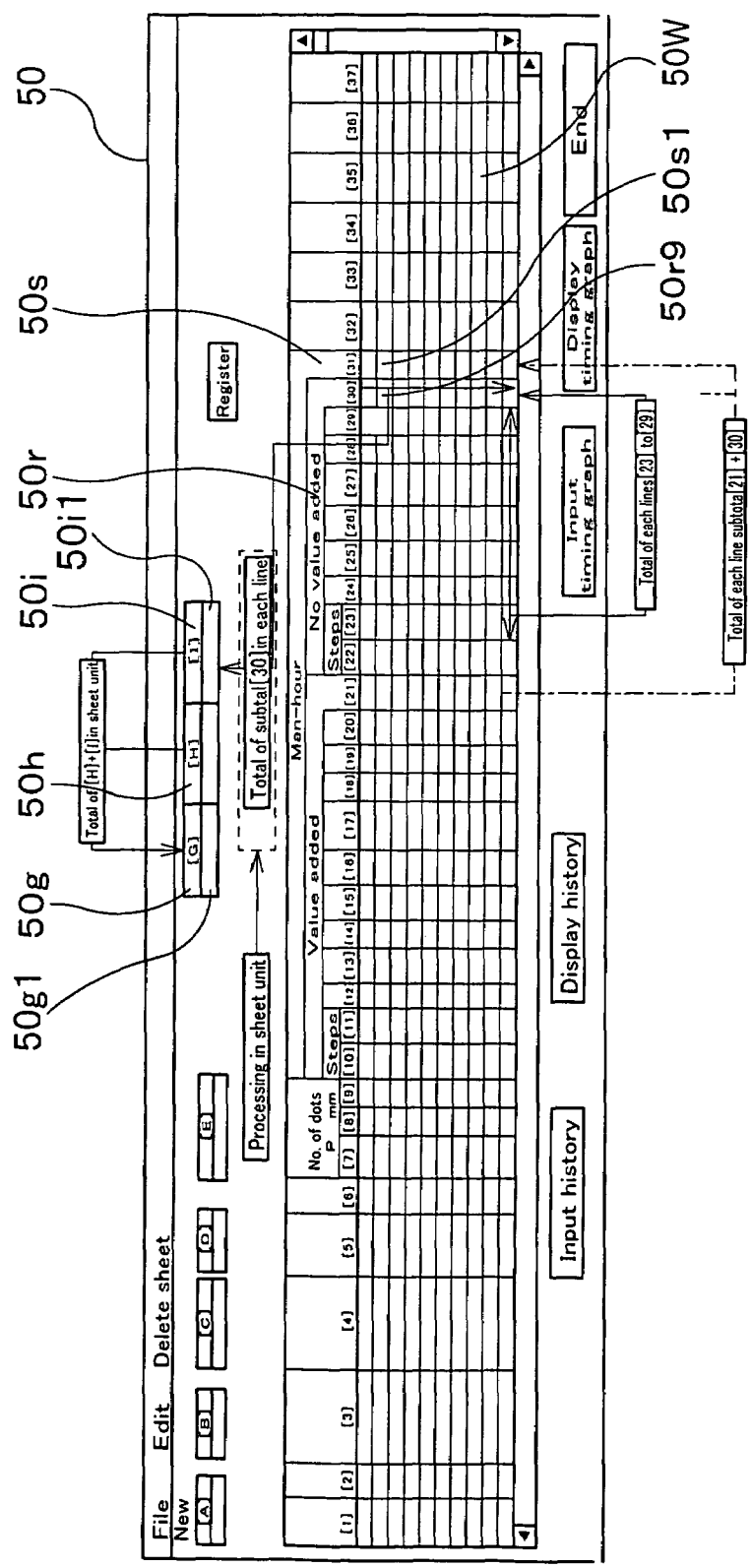
FIG. 24 is a diagram for explaining man-hour subtotal and total (in the absence of values added) setting and total man-hour setting in the main screen of the main man-hour management in the embodiment.

The setting of the subtotal [30] of the "column 50*r* for man-hours having no values added" of the main screen 50, as well as the "column 50*i* for the aggregation of man-hours having no values added" will be described with reference to FIG. 24. First, the presence or absence of the standardized man-hours of the equipmental work [19] is checked in each individual line unit of the worksheet 50W. In the absence of the standardized man-hours of the equipmental work [19], the presence or absence of the data of the frequency [6] is checked in each individual line unit. Herein, in the absence of the data in the frequency [6], the total of the standardized man-hours of the items [23]–[29] having no values added is computed in each individual line unit, and the computed total is set in the subtotal [30] and is displayed in the text box 50r9 of the corresponding line. Also, in the presence of the data of the frequency [6], {(the total of the standardized man-hours of the items [24]–[28] having no values added) ×the frequency [6]+the standardized man-hours of the time of steps in seconds [23]+the standardized man-hours of the wait [29]} is computed in each individual line unit, and the computed result is set in the subtotal [30] and is displayed in the text box 50r9 of the corresponding line. On the other hand, in the presence of the standardized man-hours of the equipmental work [19], the total of the standardized man-hours of the items [23]–[29] having no values added is computed in each individual line unit, and the computed result is set in the subtotal [30] and is displayed in the text box 50r9 of the corresponding line. In due course, when the subtotals [30] of all the lines of the worksheet 50W have been set, they are totalized. Besides, the total value is set in the "aggregation [I] of man-hours having no values added", and it is displayed in the text box 50i1 of the "column 50i for the aggregation of man-hours having no values added". By the way, in a case where the standardized man-hours of the items [23]–[29] having no values added or those of the equipmental work [19] having values added have been altered, the subtotal [30] is computed again in each individual line unit. Besides, the total of the subtotals [30] of all the lines is computed again and is set in the "aggregation [I] of man-hours having no values added" again.

The setting of the total column 50s of the main screen 50 will be described with reference to FIG. 24. When the subtotals [21] and [30] have been set in each individual line unit, the total value thereof is computed. Besides, the total value is set in the total [31] and is displayed in the text box 50s1 of the corresponding line in the total column 50s. Incidentally, when the subtotal [21] or/and the subtotal [30] has/have been altered in each individual line unit, the total value of these subtotals is computed again. The computed result is set in the total [31] again, and is displayed in the text box 50s1 of the corresponding line in the total column 50s again.

The setting of the total man-hour column 50g of the main screen 50 will be described with reference to FIG. 24. When the "aggregation [H] of man-hours having values added" and the "aggregation [I] of man-hours having no values added" have been set, the total value thereof is computed. Besides, the total value is set in the total man-hour column 50g and is displayed in the text box 50g1 of the total man-hour column 50g. Incidentally, when the "aggregation [H] of man-hours having values added" or/and the "aggregation [I] of man-hours having no values added" has/have been altered, the total value of these aggregations is computed again. The computed result is set in the total man-hours [G] again, and is displayed in the text box 50g1 of the total man-hour column 50g again.

The setting of the TARGET part No column 50t of the main screen 50 will be described with reference to FIG. 19. The user moves the cursor to any of the text boxes 50t1, . . . of the TARGET part No column 50t. Besides, the user inputs a part No to the specified text box 50t1.

The setting of the DWG No column 50u of the main screen 50 will be described with reference to FIG. 19. The user moves the cursor to any of the text boxes 50u1, . . . of the DWG No column 50u. Besides, the user inputs the main No of the part of each constituent work CW (element work) to the specified text box 50u1.

The setting of the remarks column 50v of the main screen 50 will be described with reference to FIG. 19. The user moves the cursor to any of the text boxes 50v1, . . . of the remarks column 50v. Besides, the user inputs remarks on each constituent work CW (element work) to the specified text box 50v1.

The setting of the standard walk column 50w of the main screen 50 will be described with reference to FIG. 19. The user moves the cursor to any of the text boxes 50w1, . . . of the standard walk column 50w. Besides, the user inputs a standardized man-hour material No at the assignment of the standardized man-hours of walk, to the specified text box 50w1. Incidentally, as stated before, the standard walk column 50w of the main screen 50 is sometimes set by being assigned data.

The setting of the standard walk column 50w of the main screen 50 will be described with reference to FIG. 19. The user moves the cursor to any of the text boxes 50w1, . . . of the standard walk column 50w. Besides, the user inputs a standardized man-hour material No at the assignment of the standardized man-hours of walk, to the specified text box 50w1. Incidentally, as stated before, the standard walk column 50w of the main screen 50 is sometimes set by being assigned data.

The setting of the standard work column 50x of the main screen 50 will be described with reference to FIG. 19. The user moves the cursor to any of the text boxes 50x1, . . . of the standard work column 50x. Besides, the user inputs a standardized man-hour material No at the assignment of standardized man-hours having values added, to the specified text box 50x1. Incidentally, as stated before, the standard work column 50x of the main screen 50 is sometimes set by being assigned data.

The setting of the standard work column 50y of the main screen 50 will be described with reference to FIG. 19. The user moves the cursor to any of the text boxes 50y1, . . . of the standard work column 50y. Besides, the user inputs a standardized man-hour material No at the assignment of standardized man-hours having no values added, to the specified text box 50y1. Incidentally, as stated before, the standard work column 50y of the main screen 50 is sometimes set by being assigned data.

Figure 25:
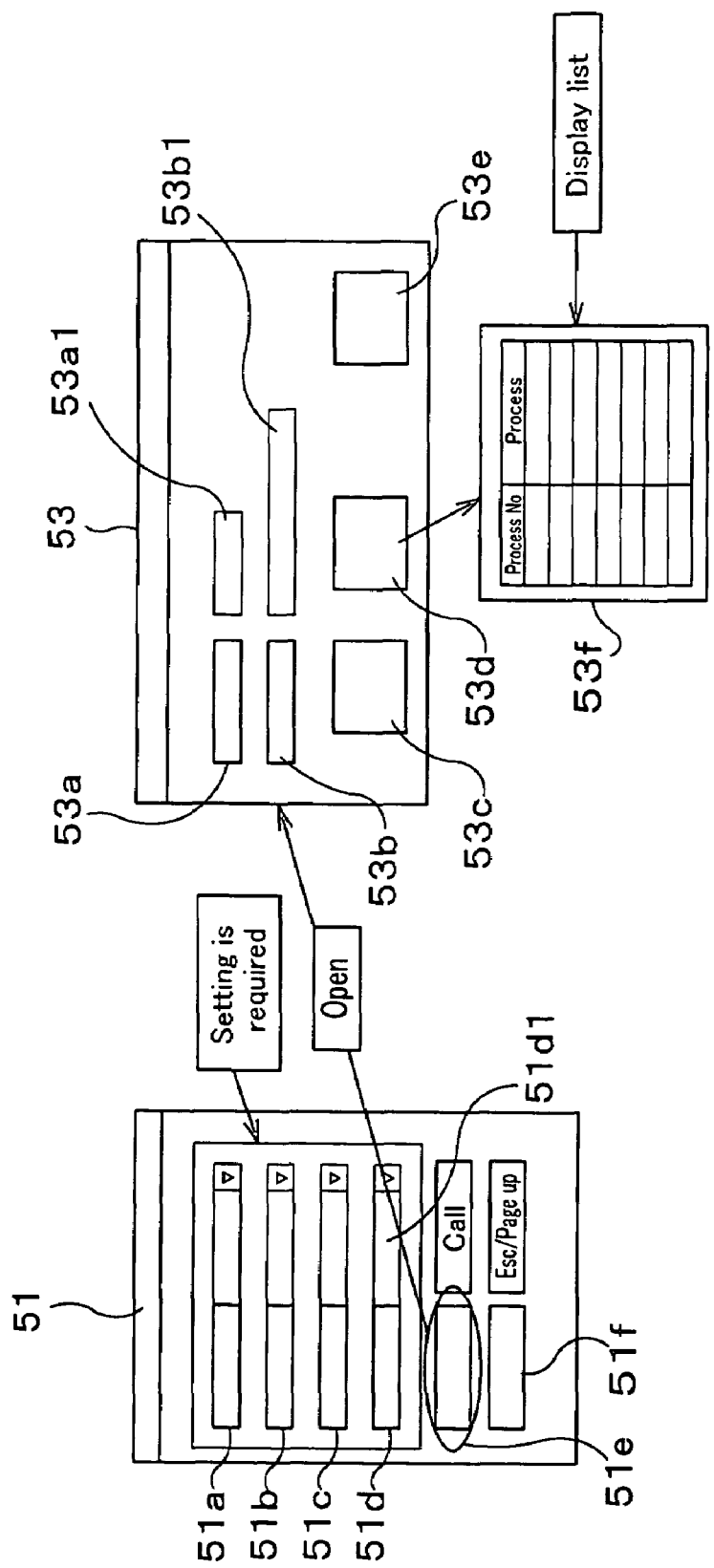
FIG. 25 shows the registration screen of process name management in the embodiment.
Figure 26:
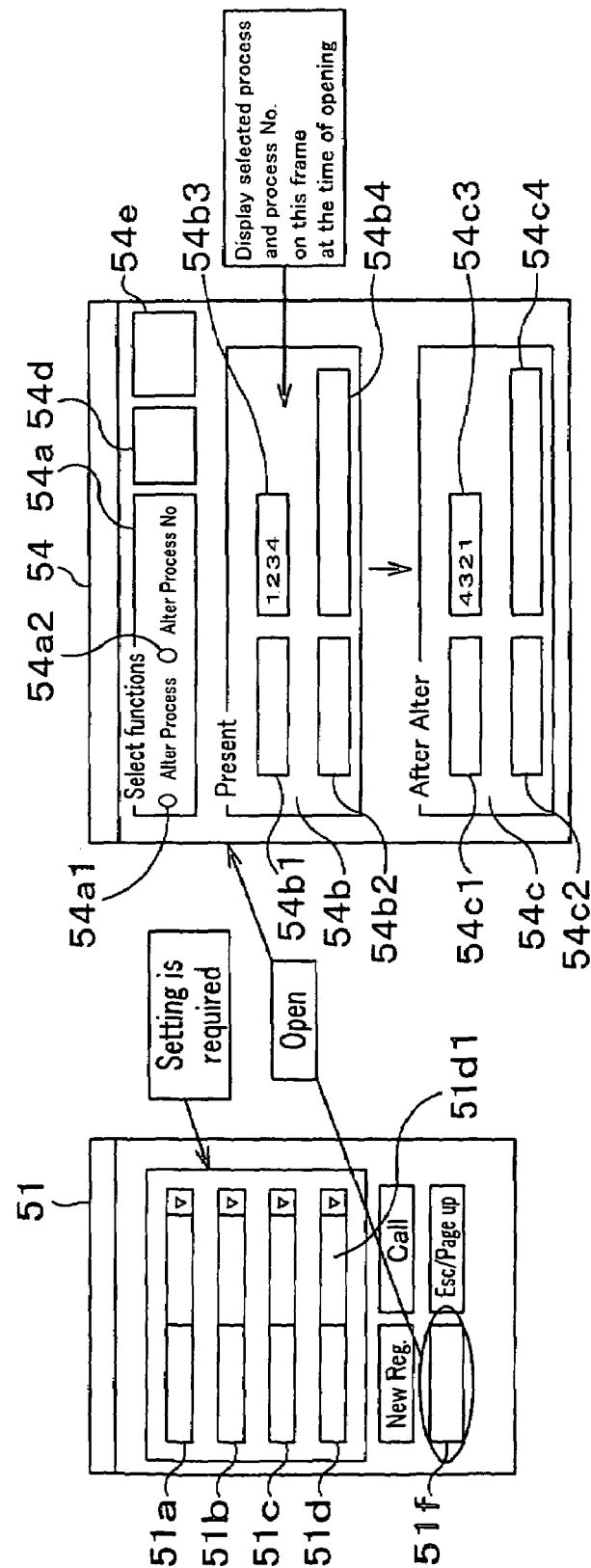
FIG. 26 shows the alteration screen of the process name management in the embodiment.

Next, the process name management MS2 will be described with reference to FIG. 25 and FIG. 26. The process name management MS2 performs the registration management/reorganization management of process names, and it performs the registration management/reorganization management of data by the process name table 19.

The process name management MS2 is such that, when the new registration button 51e or process name altering button 51f of the sheet invoking screen 51 indicated on the display of the connection terminal 4 is clicked by the user, a process name management program is loaded into the RAM of the connection terminal 4 and is run by the CPU thereof. Then, the registration screen 53 of the process name management MS2 as shown in FIG. 25, or the alteration screen 54 thereof as shown in FIG. 26 is indicated on the display of the connection terminal 4. At the start-up of the registration screen 53 or alteration screen 54, data already registered in the process name table 19 are read out and are displayed on the registration screen 53 or alteration screen 54. Herein, the data of the process name table 19 are concretely process Nos and process names with series, line Nos and line names used as keys.

First, the new registration of a process name will be described with reference to FIG. 25. The user selects a series, a line No and a line name in the series column 51a, line No column 51*b* and line name column 51*c* of the sheet invoking screen 51, respectively, in accordance with a procedure of steps similar to the procedure of steps of the foregoing invocation of the constituent work CW (element work) item data (worksheet) in each individual process unit. Subsequently, the user clicks the new registration button 51*e* of the sheet invoking screen 51. Then, the registration screen 53 of the process name management MS2 is indicated on the display of the connection terminal 4. Subsequently, the user moves the cursor to the text box 53*a*1 of the process No column 53*a* of the registration screen 53 and inputs a process No thereto. Further, he/she moves the cursor to the text box 53*b*1 of the process name column 53*b* of the registration screen 53 and inputs the process name thereto. Besides, the user clicks the registration button 53*c* of the registration screen 53. Then, it is checked whether or not the same process No as the inputted one exists in the process name table 19. In the absence of the same process No, the set process No and process name are registered in the process name table 19 with the series, line No and line name used as keys. By the way, in the presence of the same process No, the registration is halted, and a message "Same process name exists" is indicated. After the registration, the user clicks the previous screen button 53*e* of the registration screen 53. Then, the data of the process No and process name are read out of the process name table 19 again, with keys being the series, line No and line name selected on the sheet invoking screen 51, and they are set in the selection box 51*d*1 of the process name column 51*d* of the sheet invoking screen 51, while at the same time, the registration screen 53 is erased from the display of the connection terminal 4. By the way, when the display button 53*d* of the registration screen 53 is clicked, a list screen 53*f* for the process Nos and process names already registered in the process name table 19 is displayed.

The alteration registration of a process name will be described with reference to FIG. 26. First, the user selects a series, a line No, a line name and the process name in the series column 51*a*, line No column 51*b*, line name column 51*c* and process name column 51*d* of the sheet invoking screen 51, respectively, in accordance with a procedure of steps similar to the procedure of steps of the foregoing invocation of the constituent work CW (element work) item data (worksheet) in each individual process unit. Subsequently, the user clicks the process name altering button 51*f* of the sheet invoking screen 51. Then, the alteration screen 54 of the process name management MS2 is indicated on the display of the connection terminal 4. Subsequently, the user selects either the check button 54*a*1 or the check button 54*a*2 of the function selection column 54*a* of the alteration screen 54. Herein, the selection of the check button 54*a*1 corresponds to the alteration of a process name, whereas the selection of the check button 54*a*2 corresponds to the alteration of a process No. Besides, in the case of the selection of the check button 54*a*1, a process name currently registered is displayed in the text box 54*b*4 of the process name column 54*b*2 of the "current" column 54*b* of the alteration screen 54. Also, in the case of the selection of the check button 54*a*2, a process No currently registered is displayed in the text box 54*b*3 of the process No column 54*b*1 of the "current" column 54*b*. Therefore, in the case of the selection of the check button 54*a*1, the user inputs the process name to-be-altered to the text box 54*c*4 of the process name column 54*c*2 of the "after alteration" column 54*c* of the alteration screen 54. Also, in the case of the selection of the check button 54*a*2, the user inputs the process No to-be-altered to the text box 54*c*3 of the process No column 54*c*1 of the "after alteration" column 54*c*. After the inputting, the user clicks the alteration button 54*d* of the alteration screen 54. Then, it is checked whether or not the same process No as the inputted one exists in the process name table 19. In the absence of the same process No, the process No or process name set for the alteration is registered in the process name table 19 with the series, line No and line name used as keys. By the way, in the presence of the same process No, the registration is halted, and a message "Same process name exists" is indicated. Further, the data of the main man-hour management table 18, change history table 20 and timing graph data table 21 are altered and registered in attendance on the alteration of the process No or process name. After the registration, the user clicks the previous screen button 54*e* of the alteration screen 54. Then, the data of the process No and process name are read out of the process name table 19 again, with keys being the series, line No and line name selected on the sheet invoking screen 51, and they are set in the selection box 51*d*1 of the process name column 51*d* of the sheet invoking screen 51, while at the same time, the alteration screen 54 is erased from the display of the connection terminal 4.

Figure 27:
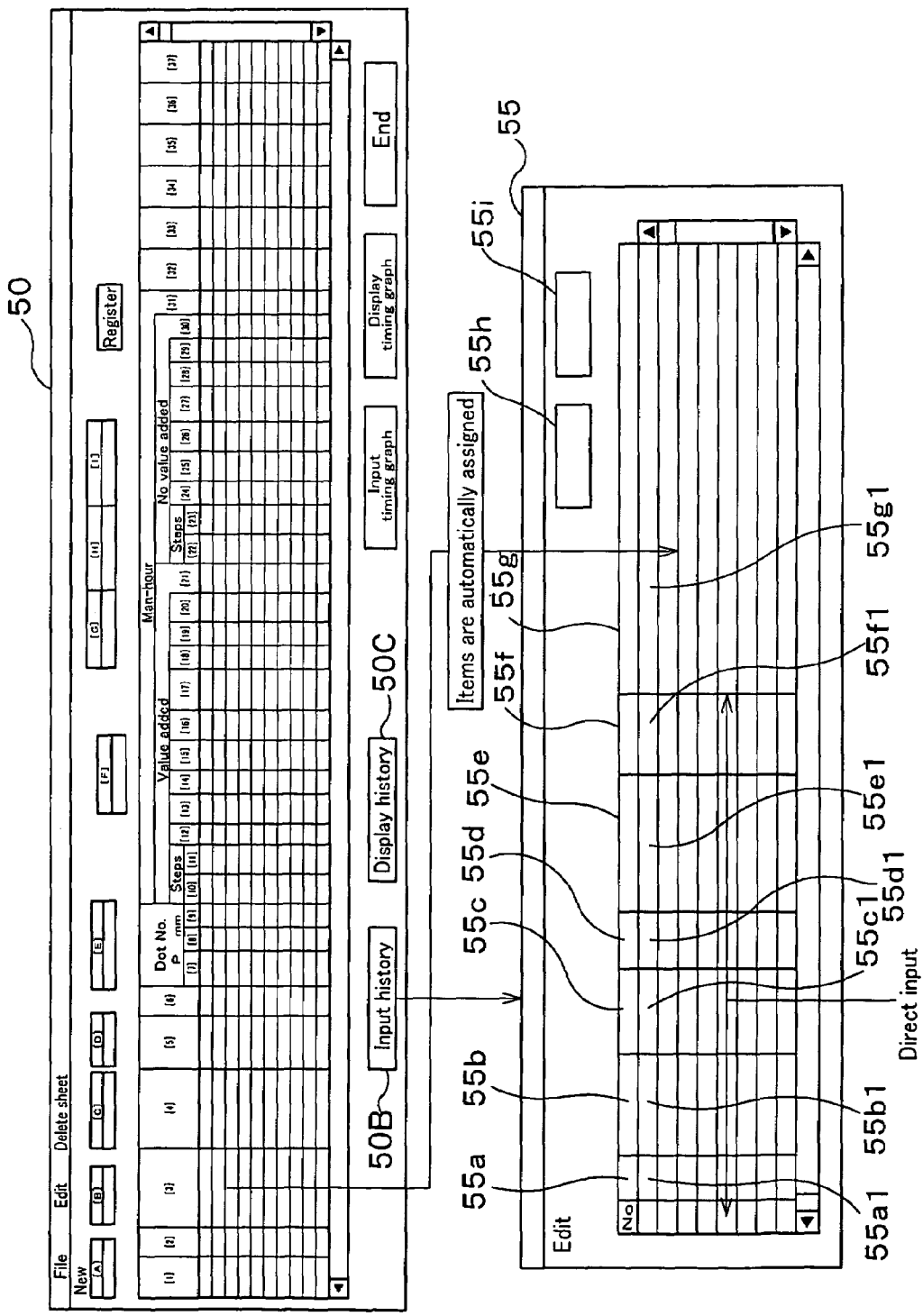
FIG. 27 shows the input screen of change history management in the embodiment.
Figure 28:
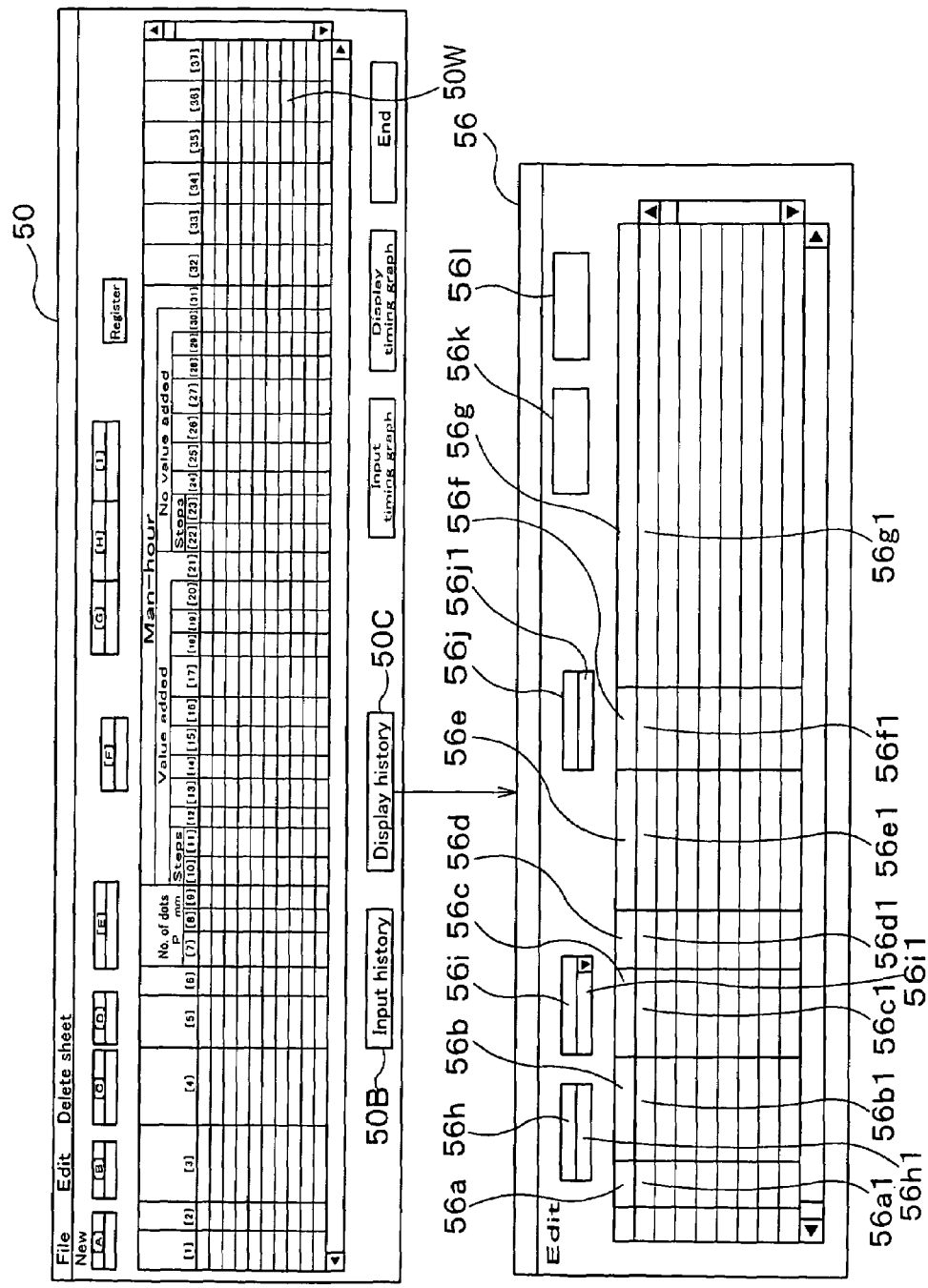
FIG. 28 shows the display screen of the change history management in the embodiment.

Next, the change history management MS3 will be described with reference to FIG. 27 and FIG. 28. The change history management MS3 performs the save management of work change contents in process units, and it saves and manages data in the change history table 20.

The change history management MS3 is such that, when the history input button 50B or history display button 50C of the main screen 50 indicated on the display of the connection terminal 4 is clicked by the user, a change history management program is loaded into the RAM of the connection terminal 4 and is run by the CPU thereof. Then, the input screen 55 of the change history management MS3 as shown in FIG. 27, or the display screen 56 thereof as shown in FIG. 28 is indicated on the display of the connection terminal 4. At the start-up of the input screen 55 or display screen 56, data already registered in the main man-hour management table 18, change history table 20, etc. are read out and are displayed on the input screen 55 or display screen 56. Herein, the data of the change history table 20 are concretely a class, a design alteration No, the date of an alteration, the content of the alteration, and the data of the items [1]–[34] of the main man-hour management table 18. Incidentally, the input screen 55 is a screen for inputting and saving the work change contents of each line. Accordingly, a class column 55*a*, a design alteration No column 55*b*, a date column 55*c*, an alterer column 55*d*, a content column 55*e*, a change man-hour column 55*f* and an item data column 55*g* are arrayed and displayed on the input screen 55. Incidentally, each of the columns 55*a*–55*g* includes a plurality of text boxes (55*a*1–55*g*1) for inputting the work change contents. In addition, the display screen 56 is a screen for displaying the work change contents in each individual line unit. Accordingly, a class column 56*a*, a design alteration No column 56*b*, a date column 56*c*, an alterer column 56*d*, a content column 56*e*, a change man-hour column 56*f* and an item data column 56*g* are arrayed and displayed on the display screen 56. Incidentally, each of the columns 56*a*–56*g* includes a plurality of text boxes (56*a*1–56*g*1) for displaying the work change contents.

The inputting and saving of work change contents will be described with reference to FIG. 27. First, the user moves the cursor to that line of the main screen 50 whose history is to be saved, thereby to select the line. Besides, the user clicks the history input button 50B of the main screen 50. Then, the input screen 55 is indicated on the display of the connection terminal 4, the data of the constituent work CW (element work) items [1]–[34] registered in the main man-hour management table 18 as correspond to the selected line are assigned to the text box 55g1 of the item data column 55g. Subsequently, the user inputs a classifying symbol for an event which has undergone increase or decrease in a work, to the text box 55a1 of the class column 55a of the input screen 55. The event is, for example, an event whose work is increased or decreased by a model change or the like, or an event whose work is decreased by cost curtailment or the like. Further, the user inputs a design alteration No (or/and preparations instruction No) to the text box 55b1 of the design alteration No column 55b of the input screen 55. Still further, he/she inputs the date of the execution of a work change to the text box 55c1 of the date column 55c of the input screen 55. Yet further, he/she inputs the name of a supervisor who has altered the item data, to the text box 55d1 of the alterer column 55d of the input screen 55. Also, he/she inputs a note on the work change contents, to the text box 55e1 of the content column 55e of the input screen 55. Also, he/she inputs the change numerical value of increase or decrease man-hours, to the text box 55f1 of the change man-hour column 55f of the input screen 55. In addition, in case of saving the inputted work change contents, the user clicks the save button 55h of the input screen 55, whereby the contents are saved in the change history table 20. By the way, in case of saving no contents, or in case of returning to the menu screen 50, the user clicks the previous screen button 55i of the input screen 55. Then, the input screen 55 is erased from the display of the connection terminal 4.

Next, the display of work change contents will be described with reference to FIG. 28. First, the user invokes the worksheet 50W of a process whose work change contents are to be displayed, onto the main screen 50. Besides, the user clicks the history display button 50C of the main screen 50. Then, the display screen 56 is indicated on the display of the connection terminal 4. Further, with a key being a process name, derivation data registered in the derivation table 15 are read out and are displayed in the selection box 56i1 of the derivation column 56i of the display screen 56. Therefore, the user selects a derivation to-be-displayed from within the selection box 56i1. Further, he/she inputs the class of the display to the text box 56h1 of the display class column 56h of the display screen 56. Then, with a key being the selected derivation, work change contents registered in the change history table 20 are read out and are displayed in the text box 56a1 of the class column 56a, text box 56b1 of the design alteration No column 56b, text box 56c1 of the date column 56c, text box 56d1 of the alterer column 56d, text box 56e1 of the content column 56e, text box 56f1 of the change man-hour column 56f and text box 56g1 of the item data column 56g. By the way, in a case where a plurality of content items are contained in one derivation, they are respectively displayed in a plurality of stages of text boxes. Further, the change man-hours of the respective lines displayed in the change man-hour column 56f are totalized, and the result is displayed in the text box 56j1 of the total man-hour column 56j of the display screen 56. In case of returning to the main screen 50, the user clicks the previous screen button 56l of the display screen 56. Then, the display screen 56 is erased from the display of the connection terminal 4.

Figure 29A:
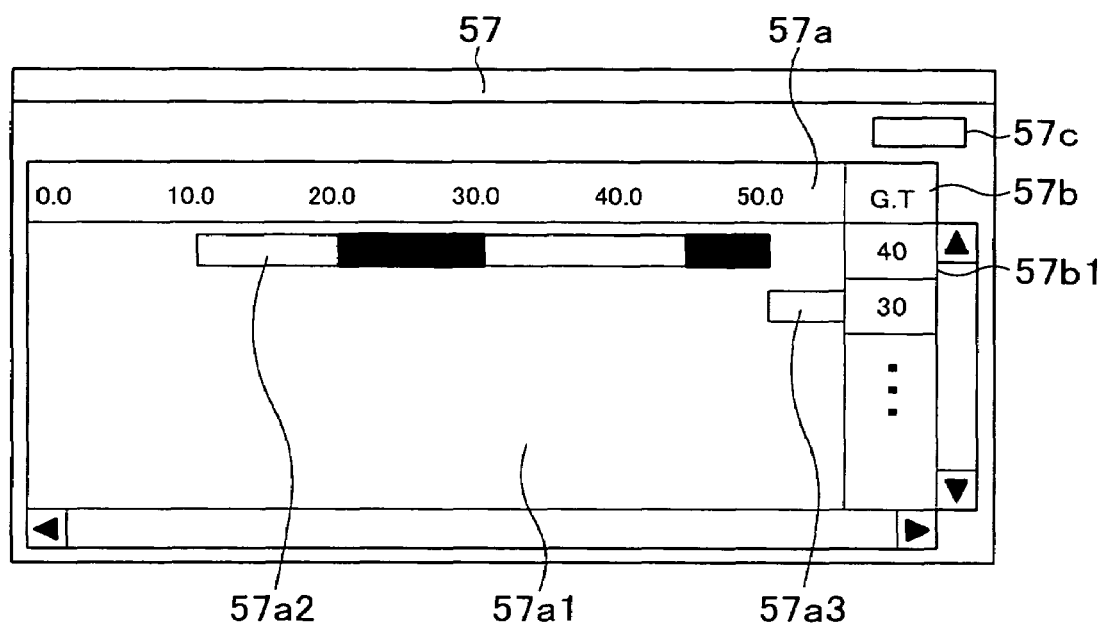
Figure 29B:
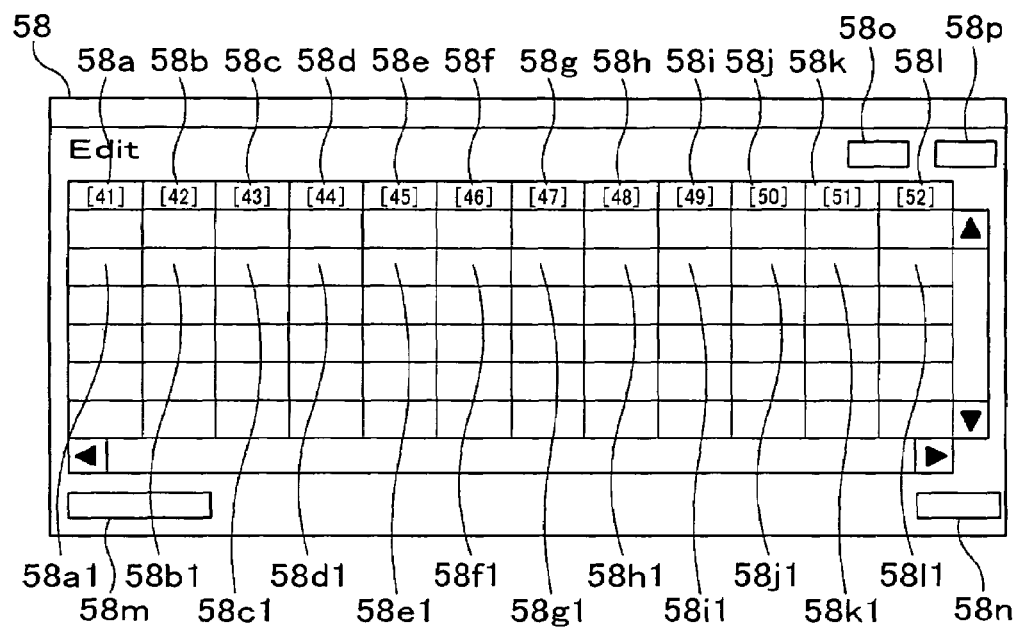
Figure 32:
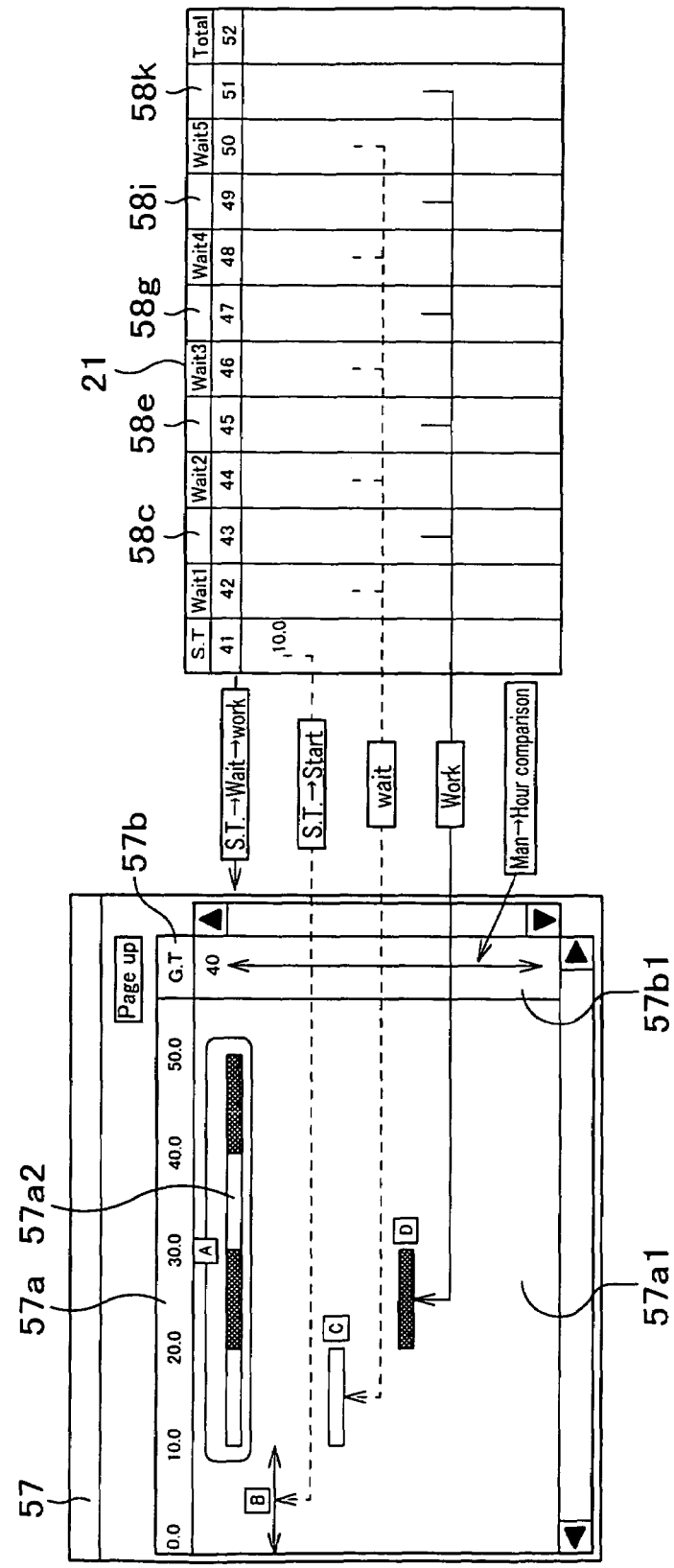
FIG. 32 is a diagram showing a procedure for creating a timing graph in the timing graph management in the embodiment.

Next, the timing graph management MS4 will be described with reference to FIGS. 29A–29B through FIG. 32. The timing graph management MS4 performs the time-series registration management of wait times and working times for constituent work CW (element work) or works under the conditions of each constituent work CW (element work) in process units, it displays a timing graph, and it registers and manages data by the timing graph data table 21.

The timing graph management MS4 is such that, when the timing graph input button 50G or timing graph display button 50D of the main screen 50 indicated on the display of the connection terminal 4 is clicked by the user, a timing graph management program is loaded into the RAM of the connection terminal 4 and is run by the CPU thereof. Then, the input screen 58 of the timing graph management MS4 as shown in FIG. 29B, or the timing graph screen 57 thereof as shown in FIG. 29A is indicated on the display of the connection terminal 4. At the start-up of the input screen 58 or timing graph screen 57, data already registered in the main man-hour management table 18 and timing graph data table 21 are read out and are displayed on the input screen 58 or timing graph screen 57. Herein, the data of the timing graph data table 21 are concretely as explained before. By the way, an S. T column 58a, a wait 1 column 58b, a working 1 column 58c, a wait 2 column 58d, a working 2 column 58e, a wait 3 column 58f, a working 3 column 58g, a wait 4 column 58h, a working 4 column 58i, a wait 5 column 58j, a working 5 column 58k and a total column 58l are arrayed and displayed on the input screen 58. Incidentally, each of the columns 58a–58l includes a plurality of text boxes (58a1–58l1) for inputting the timing graph data. Besides, a graph column 57a and a G. T column 57b are displayed on the timing graph screen 57. The timing graph screen 57 includes a graph area 57a1 for turning the data registered in the graph data table 21, into a bar graph in time series every constituent work CW (element work) or every condition of the constituent work CW (element work), and text boxes 57b1 are arrayed and displayed in correspondence with respective bar graphs.

The inputting and registration of timing graph data will be described with reference to FIG. 29B through FIG. 31. First, the user invokes the worksheet 50W of a process whose timing graph data are to be displayed, onto the main screen 50, and he/she moves the cursor to that line of the main screen 50 to which the timing graph data are to be inputted, thereby to select the line. Besides, the user clicks the timing graph input button 50G of the main screen 50 (refer to FIG. 30). Then, the input screen 58 is indicated on the display of the connection terminal 4. Therefore, the user inputs a start time to the text box 58a1 of the S. T column 58a. Further, he/she inputs the wait times of each work to the respective text boxes 58b1, 58d1, 58f1, 58h1 and 58j1 of the wait 1–wait 5 columns 58b, 58d, 58f, 58h and 58j, in time series and successively from the wait 1 column 58b. In the presence of six or more wait times of each work, accordingly, input columns increase as a wait 6 column, . . . . Besides, in the presence of four or less wait times, "0" (blank) is input to one or more of the wait 1 column 58b–wait 5 column 58j. Herein, the wait times are measured values. Further, the user inputs the working times to the respective text boxes 58c1, 58e1, 58g1, 58i1 and 58k1 of the working 1–working 5 columns 58c, 58e, 58g, 58i and 58k, in time series and successively from the working 1 column 58c. In the presence of six or more working times of each work, accordingly, input columns increase as a working 6 column, . . . . Besides, in the presence of four or less working times, "0" (blank) is input to one or more of the working 1 column 58c–working 5 column 58k. Herein, the working times are the working times (standardized man-hours) of the items [11]–[20] of the "man-hours having values added" in each constituent work CW (element work). Therefore, in a case where the standardized man-hours of the items [11]–

[20] are held registered in the main man-hour management table 18, the user clicks the working time assignment button 58*m* of the input screen 58. Then, the standardized man-hours registered in the main man-hour management table 18 are assigned to the working 1–working 5 columns 58*c*, 58*e*, 58*g*, 58*i* and 58*k* (refer to FIG. 30). Further, the user totalizes the start time, the wait time 1–wait time 5 and the working time 1–working time 5 every line, and he/she inputs the result to the corresponding text box 58A of the total column 58*l*. In this regard, a contrivance may well be made so that, when the start time, the wait time 1–wait time 5 and the working time 1–working time 5 have been inputted, the total is automatically computed and inputted to the corresponding text box 58/1 of the total column 58*l*. Besides, in case of registering the inputted timing graph data, the user clicks the registration button 58*o* of the input screen 58, whereby the data are registered in the timing graph data table 21. By the way, in case of registering no data, or in case of returning to the main screen 50, the user clicks the previous screen button 58*p* of the input screen 58. Then, the input screen 58 is erased from the display of the connection terminal 4.

Figure 31:
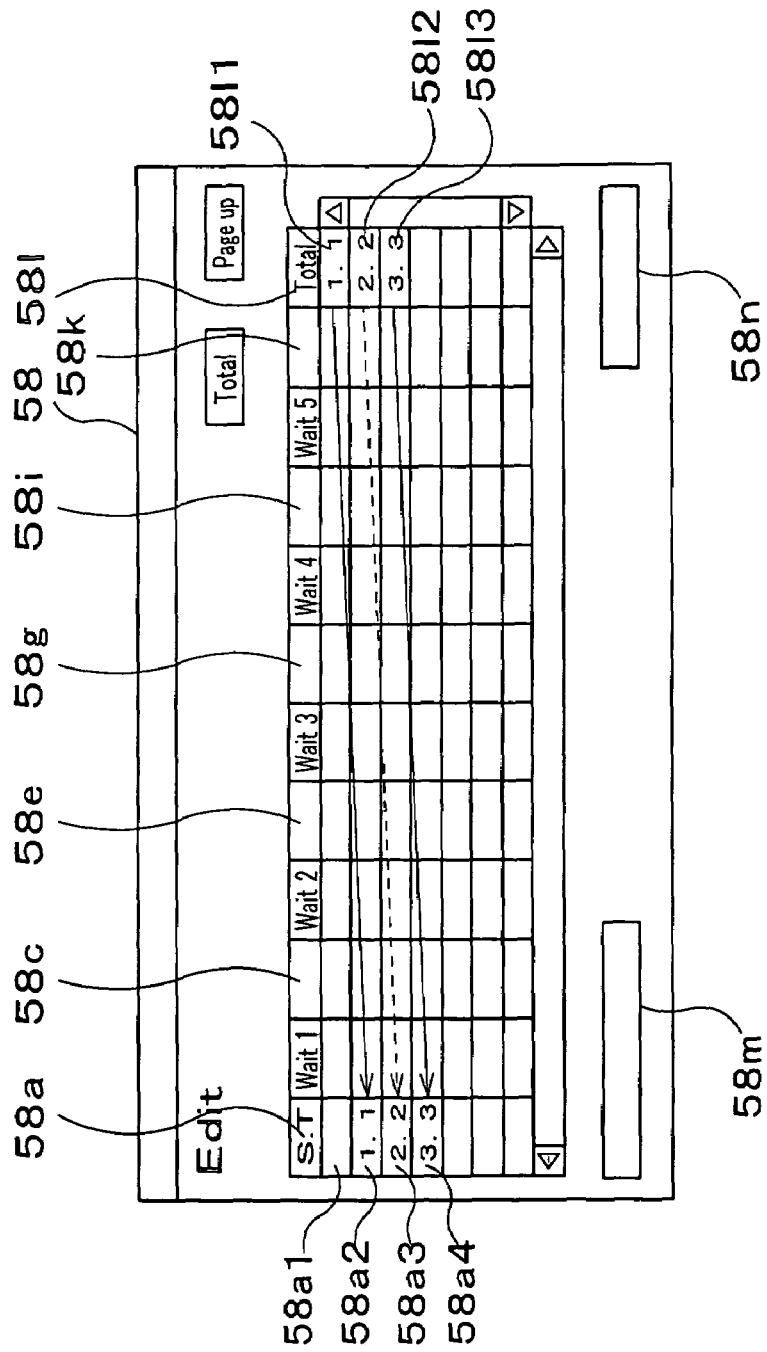
FIG. 31 is a diagram for explaining start time setting in the timing graph management in the embodiment.

Also, in a case where a total is held inputted (or registered) in the total column 58*l*, the value of the S. T column 58*a* can be automatically assigned. More specifically, the start time of the timing graph is the time at which the last work has ended, and hence, it corresponds to the value of the total column 58*l* of the last work. Accordingly, when the user clicks the start time button 58*n* of the input screen 58, the value of the total column 58*l* of the last line (directly preceding line) is automatically assigned to the S. T column 58*a*. By way of example, as shown in FIG. 31, the value "1.1" of the first-line text box 58/1 of the total column 58*l* is assigned to the second-line text box 58*a*2 of the S. T column 58*a*, the value "2.2" of the second-line text box 58/2 of the total column 58*l* is assigned to the third-line text box 58*a*3 of the S. T column 58*a*, and the value "3.3" of the third-line text box 58/3 of the total column 58*l* is assigned to the fourth-line text box 58*a*4 of the S. T column 58*a*. Incidentally, a start time (0.0) in each individual process unit is inputted to the first-line text box 58*a*1 of the S. T column 58*a* by the user.

Figure 30:
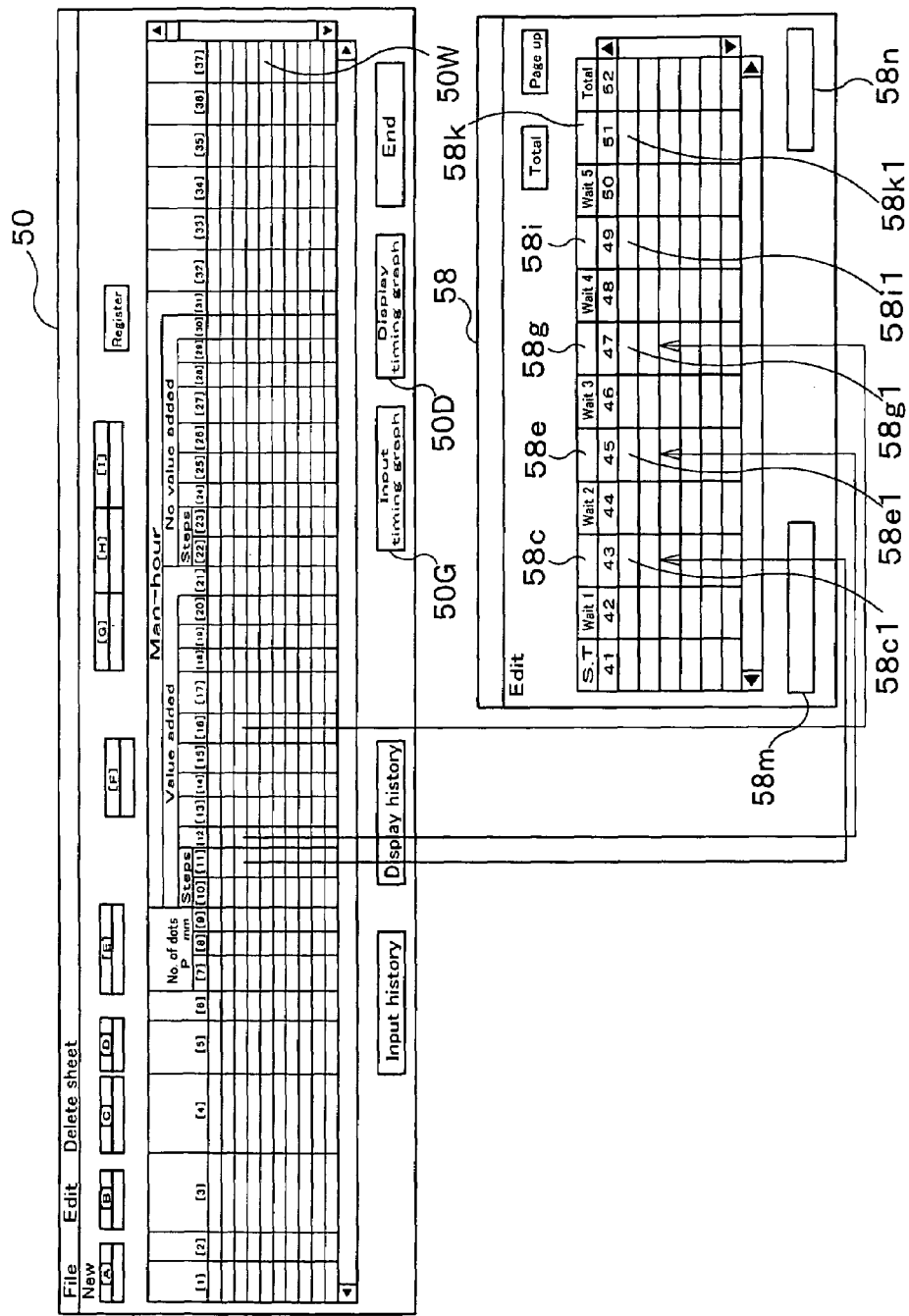
FIG. 30 is a diagram for explaining working man-hour setting in the timing graph management in the embodiment.

Next, the display of a timing graph will be described with reference to FIG. 29A and FIG. 30. The user invokes the worksheet 50W of a process whose timing graph is to be displayed, onto the main screen 50. Besides, he/she clicks the timing graph button 50D of the main screen 50. Then, with a key being a process name, the data of the timing graph data table 21 are read out, and the timing graph screen 57 is indicated on the display of the connection terminal 4. By the way, in case of returning to the main screen 50, the user clicks the previous screen button 57*c* of the timing graph screen 57. Then, the timing graph screen 57 is erased from the display of the connection terminal 4. Here, the timing graph screen 57 will be explained. In the graph column 57*a* of the timing graph screen 57, standardized man-hours (times) are set in a lateral direction, and the time lapses rightwards. Further, in the graph column 57*a*, bar graphs 57*a*2, 57*a*3, . . . of respective constituent work CW (element work), in each of which the wait times (whited out) and working times (smeared black) of the corresponding work are alternately indicated, are displayed in parallel in a vertical direction within the graph area 57*a*1, and these bar graphs 57*a*2, 57*a*3, . . . are arrayed in the sequence of the works within the process. In the example of FIG. 29A, the work of the bar graph 57*a*3 is implemented subsequently to that of the bar graph 57*a*2. Besides, the G. T column 57*b* of the timing graph screen 57 includes the text boxes 57*b*1, . . . in correspondence with the respective bar graphs 57*a*2, 57*a*3, . . . , and these text boxes 57*b*1, . . . display the totals of the working times including the wait times, of the works having values added (that is, the total times (standardized man-hours) of the wait times 1–5 and the working times 1–5), for the respective constituent work CW (element work) of the bar graphs 57*a*2, 57*a*3, . . . .

Next, the creating procedure of a timing graph will be described with reference to FIG. 32. A value obtained by subtracting the S. T [41] of the timing graph data table 21 from the total [52] thereof is displayed in each of the text boxes 57*b*1, . . . of the G. T column 57*b*. That is, the total value of the wait 1 [42]–wait 5 [50] and the working 1 [43]–working 5 [51] of the corresponding line of the timing graph data table 21 is displayed in each of the text boxes 57*b*1, . . . . In the example of FIG. 32, the value of the G. T column 57*b* corresponding to the work indicated by the bar graph 57*a*2 is 40.0. Next, in case of displaying the bar graph 57*a*2, the value of the S. T [41] of the timing graph data table 21 is first set as the start position of the bar graph 57*a*2. In the example of FIG. 32, the bar graph 57*a*2 starts at a position 10.0. Secondly, a whited-out bar graph part for the standardized man-hours (time) of the wait 1 [42] is displayed. Further, a smeared-black bar graph part for the standardized man-hours (time) of the working 1 [43] is displayed in continuation to the whited-out bar graph part. Still further, bar graph parts are displayed in the sequence of the wait 2 [44]→working 2 [45]→wait 3 [46]→working 3 [47]→wait 4 [48]→working 4 [49]→wait 5 [50]→working 5 [51]. However, 0 (zero) or blank in the wait 1 [42]–working 5 [51] is not turned into a bar graph part. Besides, such calculating and displaying operations of the values of the G. T column 57*b* and such creating and displaying operations of the bar graphs of the graph column 57*a* are carried out for all the constituent work CW (element work) within the process. Further, when the values of the G. T column 57*b* have been calculated for all the constituent work CW (element work) within the process, they are compared. Still further, the bar graph is highlighted in blue in correspondence with the constituent work CW (element work) having the largest value in the G. T column 57*b*.

Next, the series data backup system BS will be described with reference to FIGS. 33A and 33B and FIG. 34. The series data backup system BS extracts data in series units having become unnecessary, from the database 3 and backs them up, and it re-stores the extracted data in series units in the database 3 when they are necessary. Herein, the data in series units are the work constituent condition table 10, standardized man-hour table 11, walk man-hour conversion table 12, series table 13, line name table 14, derivation table 15, derivation format table 16, derivation application table 17, main man-hour management table 18, process name table 19, change history table 20 and timing graph data table 21 which are stored in the database 3, and they are extracted with a key being a series which has become unnecessary. More specifically, when the data of a series being currently produced is stored in the database 3 beforehand, the series data backup system BS can back up the data of the series which has become unnecessary because of the end of the production. Further, in case of the full model change or minor change of a series, the series data backup system BS can re-store the data of the series backed up, in the database 3 in order to utilize them again. By the way, although a floppy disk will be mentioned as a storage medium for backup in this embodiment, the storage medium is not especially restricted, but it may well be any of a hard disk, a CD-ROM, DVD etc.

Figure 33A:
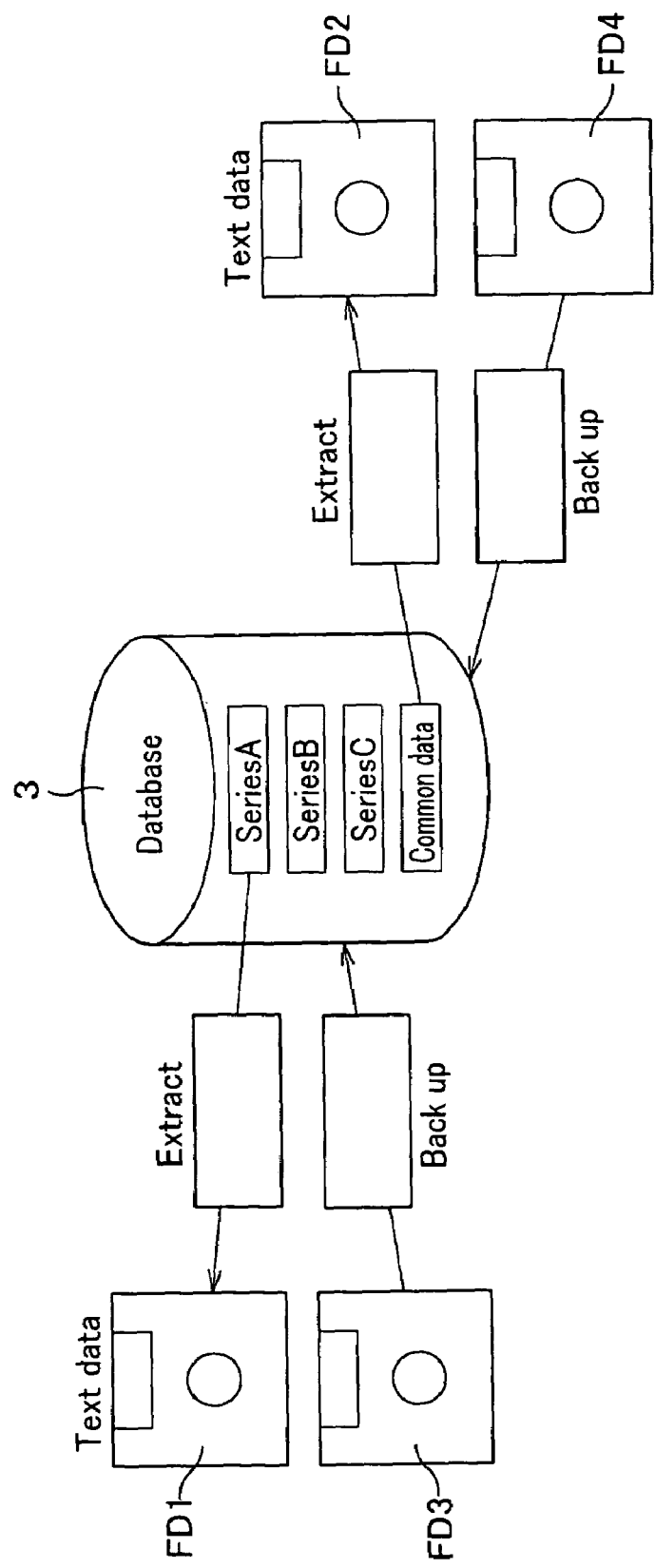
Figure 33B:
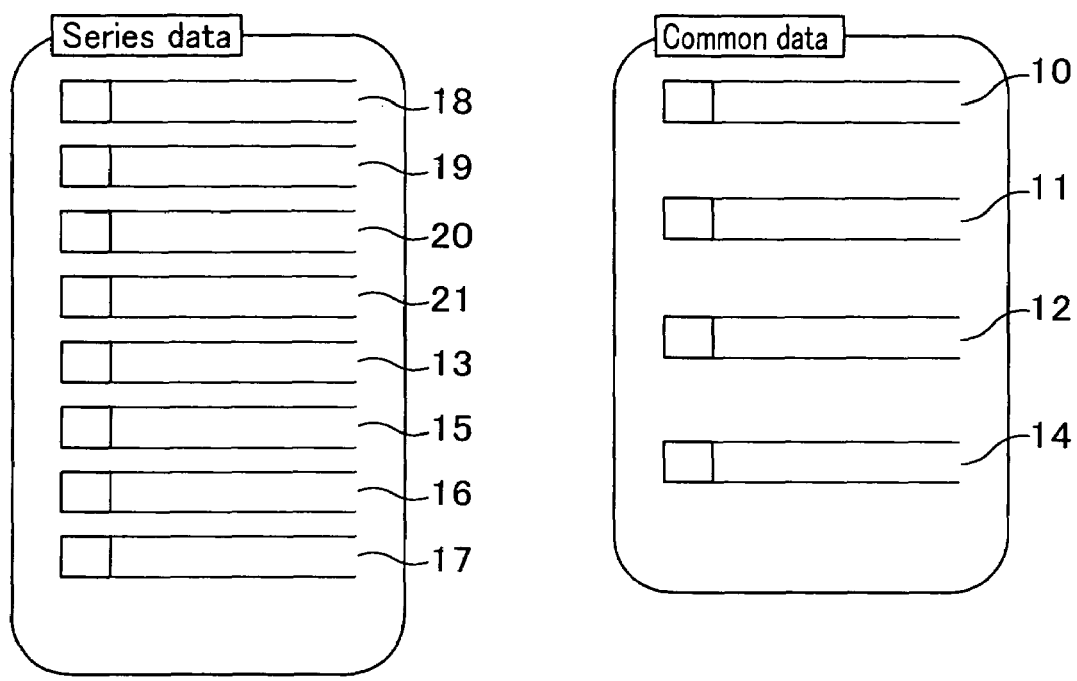

By way of example, in a case where the data of a series A have become unnecessary as shown in FIG. 33A, the series data backup system BS extracts from the database 3 the aforecited tables registered concerning the series A in each individual series data unit, so as to back them up as text data in a floppy disk FD1, and it extracts from the database 3 the data of the tables registered concerning only the series A in each individual common data unit, so as to back them up as text data in a floppy disk FD2. Also, in a case where a series C backed up has become necessary as shown in FIG. 33A, the series data backup system BS extracts from a floppy disk FD3 the tables backed up concerning the series C in each individual series data unit, so as to restore them in the database 3, and it extracts from a floppy disk FD4 the data of the tables backed up concerning the series C in each individual common data unit, so as to re-store them in the database 3. Herein, the "each individual series data unit" is the unit of the data managed by the tables every series, and it signifies the data managed by the series table 13, derivation table 15, derivation format table 16, derivation application table 17, main man-hour management table 18, process name table 19, change history table 20 and timing graph data table 21 (refer to FIG. 33B). In each individual series data unit, accordingly, the data are extracted from the corresponding tables. On the other hand, the "each individual common data unit" is the unit of the data managed in common by the man-hour management system 1, and it signifies the work constituent condition table 10, standardized man-hour table 11, walk man-hour conversion table 12 and line name table 14 (refer to FIG. 33B). In each individual common data unit, accordingly, the data concerning the series which has become unnecessary are extracted from the corresponding tables.

The series data backup system BS is such that, when a series data backup system starting icon (not shown) indicated on the display of the connection terminal 4 is clicked by the user, a series data backup system program is loaded into the RAM of the connection terminal 4 and is run by the CPU thereof. Then, the main screen 60 of the series data backup system BS as shown in FIG. 34 is indicated on the display of the connection terminal 4.

The main screen 60 displays an extraction column 60*a*, a load column 60*b* and a quit button 60*c*. In the extraction column 60*a*, a series having become unnecessary is selected, and a data out button 60*a*5 is clicked, whereby data are extracted into a floppy disk FD in each individual series unit. In the load column 60*b*, a series having become necessary is designated, and a data in button 60*b*7 is clicked, whereby data are loaded into the database 3 in each individual series unit. Besides, when the user clicks the quit button 60*c*, the application of the series data backup system BS is ended to erase the main screen 60 from the display of the connection terminal 4.

First, the operation of backing up series data will be described with reference to FIG. 34. The user clicks the series data backup system starting icon. Then, the main screen 60 is indicated on the display of the connection terminal 4. On this occasion, data registered in the series table 13 are read out and are displayed in the selection box 60*a*4 of the series column 60*a*3 of the extraction column 60*a*. Therefore, the user selects a series having become unnecessary, from within the selection box 60*a*4. Further, the user selects the check button 60*a*1 of the extraction column 60*a* in case of extracting data in each individual series data unit, or he/she selects the check button 60*a*2 thereof in case of extracting data in each individual common data unit. Besides, the user clicks the data out button 60*a*5.

Then, the data of the tables in each individual series data unit or the tables in each individual common data unit as correspond to the selected series are extracted from the database 3. By the way, the extracted data are erased from the database 3. Further, the extracted data are converted into a text file, which is stored in the floppy disk FD. Incidentally, in case of ending the operation of backing up the series data, the user clicks the quit button 60*c* of the main screen 60. Then, the main screen 60 is erased from the display of the connection terminal 4.

Next, the operation of re-storing series data in the database 3 will be described with reference to FIG. 34. The user clicks the series data backup system starting icon. Then, the main screen 60 is indicated on the display of the connection terminal 4. Therefore, the user inputs the identifier of a series having become necessary, to the text box 60*b*4 of the identification column 60*b*3 of the load column 60*b*, and also inputs the series name of the series to the text box 60*b*6 of the series column 60*b*5 thereof. Further, the user selects the check button 60*b*1 of the load column 60*b* in case of loading data in each individual series data unit, or he/she selects the check button 60*b*2 thereof in case of loading data in each individual common data unit. Besides, the user clicks the data in button 60*b*7. Then, the data of the series inputted from the floppy disk FD are read out. Besides, the data read out are stored in the database 3. Then, the data of the tables in each individual series data unit or the tables in each individual common data unit as correspond to the inputted series are read out of the floppy disk FD. Further, the data read out are stored in the database 3. Incidentally, in case of ending the operation of re-storing the series data, the user clicks the quit button 60*c* of the main screen 60. Then, the main screen 60 is erased from the display of the connection terminal 4. By the way, before the execution of the re-storing processing, the user needs to set the floppy disk FD in which the data of the series having become necessary are stored, in the disk drive of the connection terminal 4.

Next, the man-hour output system OS will be described with reference to FIG. 35 through FIG. 41. The man-hour output system OS processes the data of the registered tables 10–21 into tables, graphs etc. and offers a screen display, a file output, print-out or the like in order to make a man-hour analysis. Accordingly, the output of the man-hour output system OS is not especially restricted, but it includes indication on the display of the connection terminal 4, a paper sheet output from a printer, a file output from a disk, etc.

Figure 35:
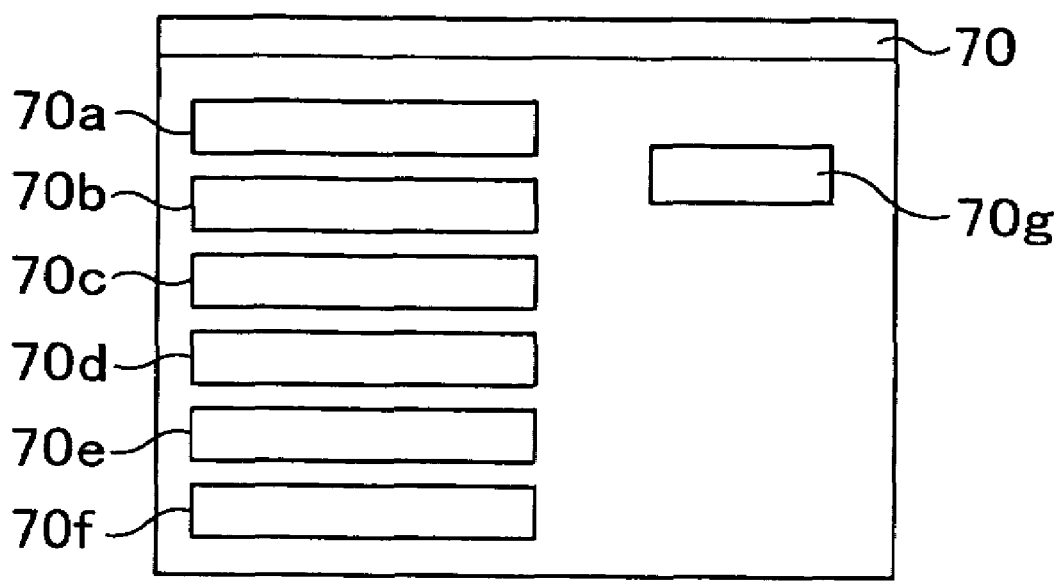
FIG. 35 shows the menu screen of a man-hour output system in the embodiment.

The man-hour output system OS is such that, when a man-hour output system starting icon (not shown) indicated on the display of the connection terminal 4 is clicked by the user, a man-hour output system program is loaded into the RAM of the connection terminal 4 and is run by the CPU thereof. Then, the main screen 70 of the man-hour output system OS as shown in FIG. 35 is indicated on the display of the connection terminal 4.

Displayed on the menu screen 70 are a selection button 70*a* for the timing graph output OS1, a selection button 70*b* for the process balancing table output OS2, a selection button 70*c* for the net & loss man-hour aggregation table output OS3, a selection button 70*d* for the individual-process specification aggregation table output OS4, a selection button 70*e* for the history management table output OS5, a selection button 70*f* for the main man-hour management output OS6, and a quit button 70*g*. Herein, when the user clicks any of the selection buttons 70*a*–70*f*, the corresponding application is executed. Besides, the condition setting screen 71 of the man-hour output system OS as shown in FIG. 36 is indicated on the display of the connection terminal 4. In addition, when the user clicks the quit button 70g, the applications of the man-hour output system OS are ended to erase the menu screen 70 from the display of the connection terminal 4. Besides, when the user clicks the selection button 70f, the main screen 50 of the main man-hour management system MS is indicated on the display of the connection terminal 4.

Displayed on the condition setting screen 71 of the man-hour output system OS are an output condition column 71a, an output goal column 71b, a processing switch column 71c, a series column 71d, a line No column 71e, a line name column 71f, a cost center column 71g, a process name column 71h, a derivation column 71i and a quit button 71j. The output condition column 71a includes a display box 71a1 for displaying the sort of the application selected on the menu screen 70. The output goal column 71b includes a selection box 71b1 for selecting the sort of an output. The processing switch column 71c includes an output button 71c1, a condition clear button 71c2 and a re-display button 71c3 which serve to select the next processing. Each of the series column 71d, line No column 71e, line name column 71f, cost center column 71g, process name column 71h and derivation column 71i includes a plurality of selection boxes (71d1–71i1) for selecting the conditions of data to-be-outputted.

Here, the operation of setting conditions in the condition setting screen 71 will be described. In the condition setting screen 71, an output goal and the conditions of data to-be-outputted are selected. Since the data are outputted in process units (further, in units of derivations in a process), a series, line No, line name (cost center) and process name (further, derivation) are selected as the conditions.

First, when the condition setting screen 71 is displayed, an application (output sort) selected on the menu screen 70 is displayed in the display box 71a1 of the output condition column 71a. The output sort to be displayed is any of a timing graph, a process balancing table, a net & loss man-hour aggregation table, an individual-process specification aggregation table, a history management table and a main man-hour management output. Further, data are read out of the series table 13 and line name table 14 and are displayed in the selection boxes 71d1, . . . of the series column 71d and those 71e1, . . . of the line No column 71e. First, the user selects an output goal from within the selection box 71b1 of the output goal column 71b. The output goal is a screen output, a printer output, a file output, or the like. Subsequently, the user selects the series from among the selection boxes 71d1, . . . of the series column 71d, and he/she selects the line No from among the selection boxes 71e, . . . of the line No column 71e. Then, with keys being the selected series and line No, data are read out of the line name table 14 and are displayed in the selection boxes 71f1, . . . of the line name column 71f and those 71g1, . . . of the cost center column 71g. Therefore, the user selects the line name from among the selection boxes 71f1, . . . of the line name column 71f, and he/she selects the cost center from among the selection boxes 71g1, . . . of the cost center column 71g. Then, with keys being the selected series, line No and line name (cost center), data are read out of the process name table 19 and are displayed in the selection boxes 71h1, . . . of the process name column 71h. Therefore, the user selects the process name from among the selection boxes 71h1, . . . of the process name column 71h. Then, with keys being the selected series, line No, line name (cost center) and process name, data are read out of the derivation table 15 and are displayed in the selection boxes 71i1, . . . of the derivation column 71i. Therefore, the user selects the derivation from among the selection boxes 71i1, . . . of the derivation column 71i. Since the conditions of the data to be outputted have been thus selected, the user selects the processing for the conditions from within the processing switch column 71c. In a case where the output button 71c1 is clicked, the data of the selected conditions are outputted to the selected output goal; in a case where the condition clear button 71c2 is clicked, all the selected conditions are cleared; and in a case where the re-display button 71c3 is clicked, a screen processed once is re-displayed. By the way, in case of setting no conditions, or in case of returning to the menu screen 70, the user clicks the quit button 71j of the condition setting screen 71. Then, the condition setting screen 71 is erased from the display of the connection terminal 4, and the menu screen 70 is displayed.

Figure 37A:
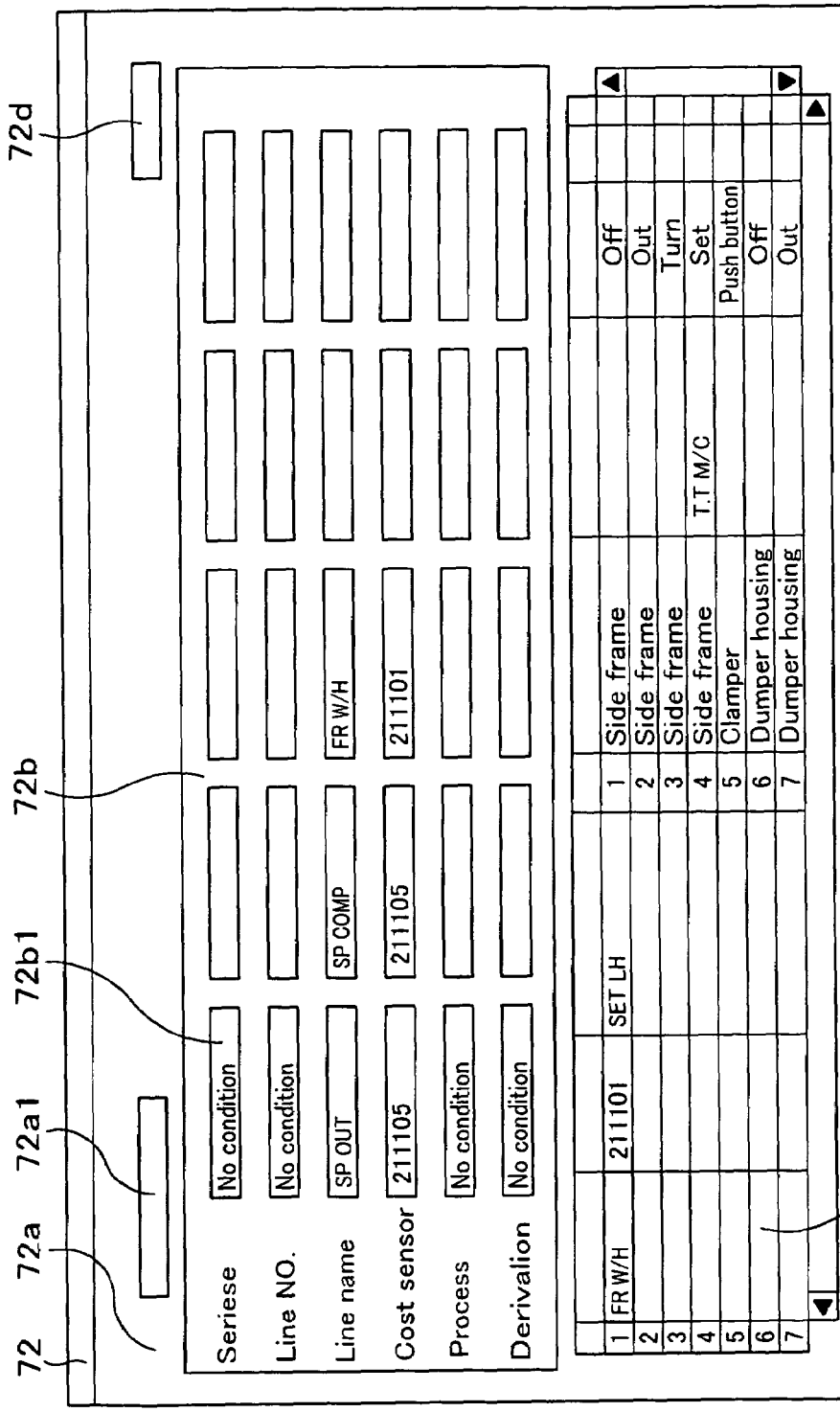

Next, the timing graph output OS1 will be described with reference to FIG. 35 and FIGS. 37A and 37B. The timing graph output OS1 submits standardized man-hours and timing graphs respectively managed by the main man-hour management MS1 and the timing graph management MS4 in process units, to screen outputs onto a display, paper sheet outputs with a printer, and file outputs with a disk.

The timing graph output OS1 is such that, when the selection button 70a of the menu screen 70 indicated on the display of the connection terminal 4 is clicked by the user, a timing graph output program is loaded into the RAM of the connection terminal 4 and is run by the CPU thereof. Then, the main man-hour management screen 72 and timing graph screen 73 of the timing graph output OS1 as shown in FIG. 37A is indicated on the display of the connection terminal 4. At the start-up of the main man-hour management screen 72 and timing graph screen 73, data registered in the main man-hour management table 18 and timing graph data table 21 are read out and are displayed on the main man-hour management screen 72 and timing graph screen 73. Although the screen indication on the display will be explained here, the timing graph etc. under the screen indication can be, of course, submitted to paper sheet outputs to a printer or file outputs to a floppy disk or the like.

Displayed on the main man-hour management screen 72 are an output condition column 72a, a selection condition column 72b, a main man-hour management column 72c and a quit button 72d. The output condition column 72a has "Timing graph" displayed in its display box 72a1. The selection condition column 72b displays in its display boxes 72b1, . . . a series, line No, line name, cost center, process name and derivation which have been selected on the condition setting screen 71. The main man-hour management column 72c displays a worksheet which has been read out of the main man-hour management table 18 with keys being the selected series, line No, line name, cost center, process name and derivation. By the way, in case of returning to the menu screen 70, the user clicks the quit button 72d of the main man-hour management screen 72. Then, the main man-hour management screen 72 is erased from the display of the connection terminal 4, and the menu screen 70 is displayed.

On the timing graph screen 73, a timing graph 73b managed by the timing graph management MS4, and a quit button 73a are displayed in each individual selected process unit. In the example of FIG. 37B, the displayed timing graph 73b is a timing graph divided into personal man-hours and equipmental man-hours. Here, the timing graph 73b is displayed in terms of net man-hours and loss man-hours. By the way, in case of returning to the menu screen 70, the user clicks the quit button 73a of the timing graph screen 73.

Then, the timing graph screen 73 is erased from the display of the connection terminal 4, and the menu screen 70 is displayed.

With the timing graph output OS1, the wait times (or loss times) and working times (or net times) of the time-series constituent work CW (element work) of each process can be definitely understood from the timing graph. By way of example, a constituent work CW (element work) of long wait time can be grasped at a glance. In order to shorten the wait time, therefore, the procedures of the constituent work CW (element work) within the process are changed-over, or the arrangement of the constituent work CW (element work) within the process is changed. More specifically, the timing graph is not composed only of the net man-hours of individual constituent work CW (element work), but it is composed of the net man-hours (or working times) and loss man-hours (or wait times) of the constituent work CW (element work) within the process, so that man-hours in the state between the constituent work CW (element work) can be analyzed. As a result, the reconsideration of process organization is facilitated, and loss man-hours (wait times) can be effectively shortened. By the way, although the timing graph in each individual process unit has been explained, a timing graph in each individual cost center unit makes it possible to analyze man-hours in the state between processes within a cost center.

Next, the process balancing table output OS2 will be described with reference to FIG. 35 and FIG. 38. The process balancing table output OS2 submits process balancing tables in each of which the maximum values of personal man-hours in each individual process unit, and equipmental man-hours in robot units in each process are arrayed in the sequence of procedures, to screen outputs onto a display, paper sheet outputs to a printer, and file outputs to a disk.

The process balancing table output OS2 is such that, when the selection button 70b of the menu screen 70 indicated on the display of the connection terminal 4 is clicked by the user, a process balancing table output program is loaded into the RAM of the connection terminal 4 and is run by the CPU thereof. Then, the output screen 74 of the process balancing table output OS2 as shown in FIG. 38 is indicated on the display of the connection terminal 4. At the start-up of the output screen 74, data registered in the main man-hour management table 18, etc. are read out and are displayed on the output screen 74. Although the screen indication on the display will be explained here, the process balancing table, etc. under the screen indication can be, of course, submitted to paper sheet outputs with a printer or file outputs with a floppy disk or the like.

A process balancing table 74a and a quit button 74l are displayed on the output screen 74. The process balancing table 74a includes a series column 74b, a derivation column 74c, a line No column 74d, a line name column 74e, a cost center column 74f, a process name column 74g, a constituent work CW (element work) name column 74h, a tact column 74i, a number-of-dots column 74j and a graph column 74k, and it stores data for respective constituent work CW (element work). The series column 74b, derivation column 74c, line No column 74d, line name column 74e, cost center column 74f and process name column 74g display a series, line No, line name, cost center, process name and derivation which have been selected on the condition setting screen 71. In a case where data are held registered in any of the SPOT [7], MIG [8] and SEALER [9] of the main man-hour management table 18, the constituent work CW (element work) name column 74h is assigned the constituent work CW (element work) (what) [3] of the main man-hour management table 18, and it displays the name of the constituent work CW (element work). Incidentally, the constituent work CW (element work) name column 74h displays only equipmental man-hours, and it presents no display in case of personal man-hours. In the case of equipmental man-hours, the tact column 74i is assigned the value of the G. T column explained in the timing graph management MS4, for a line at which the data has been inputted in the constituent work CW (element work) name column 74h, and it displays this value. On the other hand, in the case of personal man-hours, the tact column 74i is assigned the maximum value in each individual process unit among the values of the G. T column explained in the timing graph management MS4, and it displays this value. The number-of-dots column 74j displays the data of the SPOT [7], MIG [8] or SEALER [9] for the number of dots assigned to the constituent work CW (element work) name column 74h The graph column 74k displays the data displayed in the tact column 74i, in the form of a bar graph. By the way, in case of returning to the menu screen 70, the user clicks the quit button 74l of the output screen 74. Then, the output screen 74 is erased from the display of the connection terminal 4, and the menu screen 70 is displayed.

Figure 38:
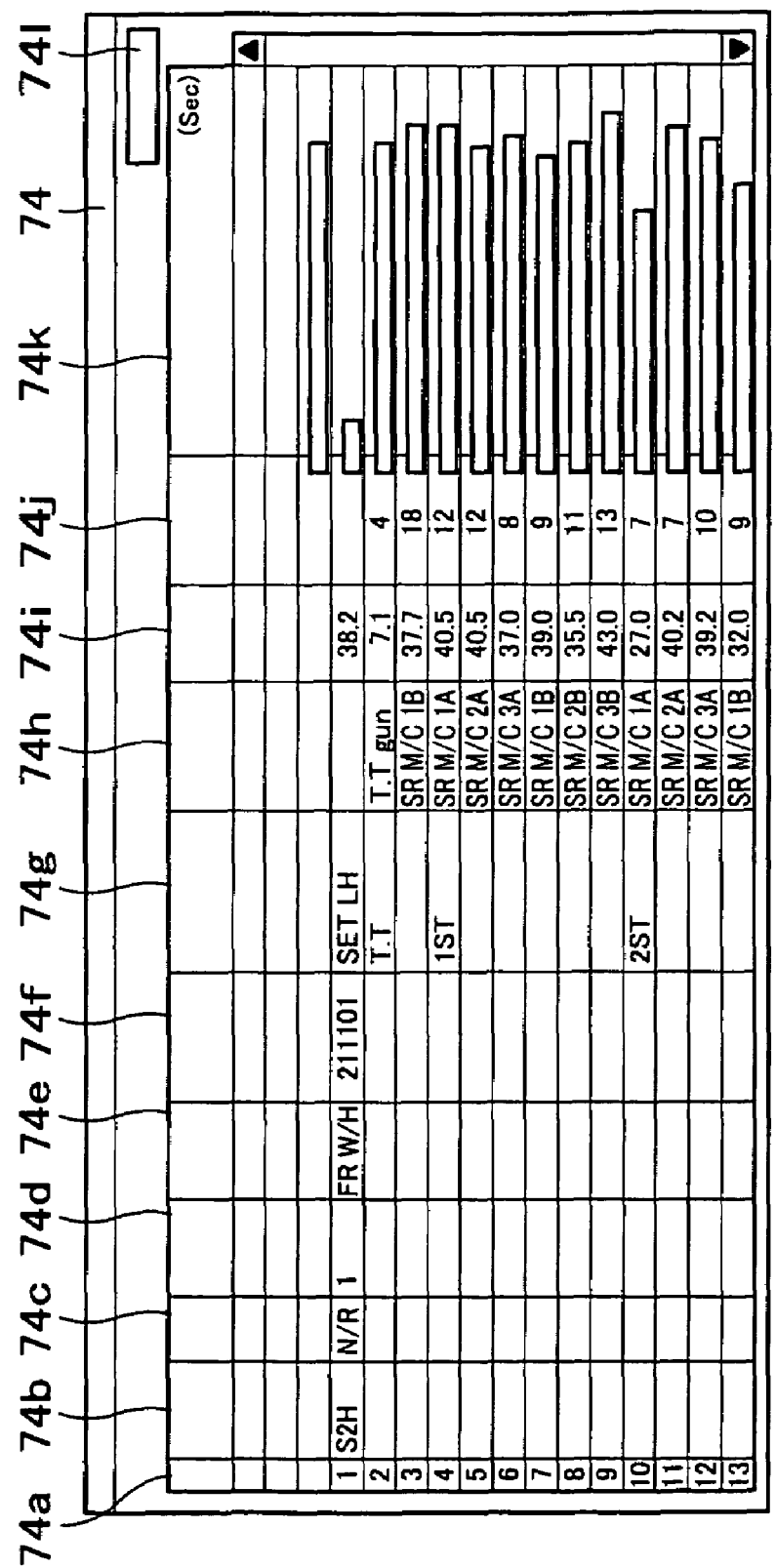
FIG. 38 shows an output screen for process balancing table outputs in the embodiment.

In the example of the process balancing table 74a shown in FIG. 38, from the viewpoint of a man-hour difference loss, the difference between the man-hours of robots in processes "1ST" and "2ST" is large (as seen from the tact column 74i and the graph column 74k), and hence, the processes are reorganized so as to level the man-hours of the robots in the processes "1ST" and "2ST". Also, from the viewpoint of equipment capabilities, man-hours per dot are 40.2/7=about 5.7 seconds as to the robot "SR M/C 2A" of the process "2ST" and 37.7/18=about 2.1 seconds as to the robot "SR M/C 1B" of a process "T. T". Since the equipment capabilities are discrepant in this manner, the robots are replaced with each other, or the number of dots allotted to each robot is altered.

More specifically, the process balancing table tabulates the magnitudes of the man-hours (the maximum value in each individual process unit in case of personal man-hours, and in each individual robot unit in case of equipmental man-hours) of, and the numbers of dots of, the constituent work CW (element work) in processes, so that the leveling of the man-hours is facilitated. As a result, a man-hour difference loss and an equipment capability loss can be effectively relieved. By the way, although the process balancing table in each individual process unit has been explained, a process balancing table in each individual cost center unit makes it possible to analyze man-hours in the state between processes within a cost center.

Next, the net & loss man-hour aggregation table output OS3 will be described with reference to FIG. 35 and FIG. 39. The net & loss man-hour aggregation table output OS3 aggregates net man-hours, wait man-hours and loss man-hours in each individual process unit, and further submits net & loss man-hour aggregation tables in each of which man-hours are aggregated every cost center, to screen outputs onto a display, paper sheet outputs with a printer, and file outputs with a disk.

The net & loss man-hour aggregation table output OS3 is such that, when the selection button 70c of the menu screen 70 indicated on the display of the connection terminal 4 is clicked by the user, a net & loss man-hour aggregation table output program is loaded into the RAM of the connection terminal 4 and is run by the CPU thereof. Then, the output screen 75 of the net & loss man-hour aggregation table output OS3 as shown in FIG. 39 is indicated on the display of the connection terminal 4. At the start-up of the output screen 75, data registered in the main man-hour management table 18, etc. are read out and are displayed on the output screen 75. Although the screen indication on the display will be explained here, the net & loss man-hour aggregation tables, etc. under the screen indication can be, of course, submitted to paper sheet outputs to a printer or file outputs to a floppy disk or the like.

A net & loss man-hour aggregation table 75a and a quit button 75p are displayed on the output screen 75. The net & loss man-hour aggregation table 75a includes a series column 75b, a derivation column 75c, a line No column 75d, a line name column 75e, a cost center column 75f, a process name column 75g; a net man-hour column 75h, a wait man-hour column 75i, a loss man-hour column 75j and a total column 75k for personal man-hours; and a net man-hour column 75l, a wait man-hour column 75m, a loss man-hour column 75n and a total column 75o for equipmental man-hours; and it stores data for respective processes. The series column 75b, derivation column 75c, line No column 75d, line name column 75e, cost center column 75f and process name column 75g display a series, line No, line name, cost center, process name and derivation which have been selected on the condition setting screen 71. The net man-hour column 75h is assigned the value of the "aggregation [H] of man-hours having values added" of the main man-hour management table 18, and it displays this value. The wait man-hour column 75i is assigned the total value in each individual process unit, of the waits [29] at lines at which data are not registered in the equipmental work [19] in the main man-hour management table 18, and it displays this value. The loss man-hour column 75j is assigned the total value in each individual process unit, of the differences (subtotal [30]–wait [29]) at the lines at which data are not registered in the equipmental work [19] in the main man-hour management table 18, and it displays this value. The total column 75k is assigned the value of the total man-hours [G] of the main man-hour management table 18, and it displays this value. The net man-hour column 75l is assigned is assigned the value of the "aggregation [H] of man-hours having values added" of the main man-hour management table 18, and it displays this value. The wait man-hour column 75m is assigned the total value in each individual process unit, of the waits [29] at the lines at which data are not registered in the equipmental work [19] in the main man-hour management table 18, and it displays this value. The loss man-hour column 75n is assigned the total value in each individual process unit, of the differences (subtotal [30]–wait [29]) at the lines at which data are not registered in the equipmental work [19] in the main man-hour management table 18, and it displays this value. The total column 75o is assigned the value of the total man-hours [G] of the main man-hour management table 18, and it displays this value. Further, subtotal columns 75r1, 75r2, ... are provided in order to indicate the total values of the man-hours of respective cost centers. That is, the man-hours of the man-hour columns 75h–75o are totalized for the respective cost centers, and the subtotal columns 75r1, 75r2, ... indicate the total values. By the way, in case of returning to the menu screen 70, the user clicks the quit button 75p of the output screen 75. Then, the output screen 75 is erased from the display of the connection terminal 4, and the menu screen 70 is displayed.

With the net & loss man-hour aggregation table, net man-hours, wait man-hours and loss man-hours are clarified every cost center or every process, and a process or cost center of large loss man-hours or wait man-hours can be found as a subject for diminishing the number of man-hours.

Next, the individual-process specification aggregation table output OS4 will be described with reference to FIG. 35 and FIG. 40. The individual-process specification aggregation table output OS4 aggregates the numbers of dots (SPOT, MIG, SEALER) of each constituent work CW (element work) in each individual process unit (in each individual cost center unit), and submits individual-process specification aggregation tables, to screen outputs onto a display, paper sheet outputs with a printer, and file outputs with a disk. The reason why the numbers of dots are aggregated here is that, since most of works in the field of welding are spot welding, mig welding and sealer coating, the number of dots is important for analyzing the man-hours of the welding. Accordingly, items to be aggregated are different in cases of other fields such as clamping and pasting.

The individual-process specification aggregation table output OS4 is such that, when the selection button 70d of the menu screen 70 indicated on the display of the connection terminal 4 is clicked by the user, an individual-process specification aggregation table output program is loaded into the RAM of the connection terminal 4 and is run by the CPU thereof. Then, the output screen 76 of the individual-process specification aggregation table output OS4 as shown in FIG. 40 is indicated on the display of the connection terminal 4. At the start-up of the output screen 76, data registered in the main man-hour management table 18, etc. are read out and are displayed on the output screen 76. Although the screen indication on the display will be explained here, the individual-process specification aggregation tables, etc. under the screen indication can be, of course, submitted to paper sheet outputs with a printer or file outputs to a floppy disk or the like.

An individual-process specification aggregation table 76a and a quit button 76m are displayed on the output screen 76. The individual-process specification aggregation table 76a includes a series column 76b, a derivation column 76c, a line No column 76d, a line name column 76e, a cost center column 76f, a process name column 76g, a constituent work CW (element work) name column 76h and a person/equipment classification column 76i; and a SPOT column 76j, a MIG column 76k and a sealer column 76l for the specifications of the numbers of dots; and it stores data for respective constituent work CW (element work). The series column 76b, derivation column 76c, line No column 76d, line name column 76e, cost center column 76f and process name column 76g display a series, line No, line name, cost center, process name and derivation which have been selected on the condition setting screen 71. In a case where data are held registered in any of the SPOT [7], MIG [8] and SEALER [9] of the main man-hour management table 18, the constituent work CW (element work) name column 76h is assigned the constituent work CW (element work) (what) [3] of the main man-hour management table 18, and it displays the name of the constituent work CW (element work). It is judge whether a line assigned in the constituent work CW (element work) name column 76h corresponds to personal man-hours or equipmental man-hours, and the person/equipment classification column 76i displays "person" or "equipment". In this regard, the equipmental man-hours are judged in a case where data are held registered in the equipmental work [19] of the main man-hour management table 18, and the personal man-hours are judge in a case where not. The SPOT column 76j is assigned data registered in the SPOT [7] of the main man-hour management table 18, at the line assigned in the constituent work CW (element work) name column 76*h*, and it displays the data. The MIG column 76*k* is assigned data registered in the MIG [8] of the main man-hour management table 18, at the line assigned in the constituent work CW (element work) name column 76*h*, and it displays the data. The sealer column 76*l* is assigned data registered in the SEALER [9] of the main man-hour management table 18, at the line assigned in the constituent work CW (element work) name column 76*h*, and it displays the data. Further, subtotal columns 76*n* are provided in order to indicate the total values of the specifications (SPOT, MIG, SEALER) of the numbers of dots every cost center. That is, the values of the SPOT column 76*j*, MIG column 76*k* and sealer column 76*l* are totalized for the respective cost centers, and the subtotal columns 76*n* indicate the total values. By the way, in case of returning to the menu screen 70, the user clicks the quit button 76*m* of the output screen 76. Then, the output screen 76 is erased from the display of the connection terminal 4, and the menu screen 70 is displayed.

With the individual-process specification aggregation table, the numbers of dots of each constituent work CW (element work) or those of each cost center can be grasped for the individual work sorts (spot welding, mig welding, sealer coating). The individual-process specification aggregation table is therefore effective to analyze constituent work CW (element work) etc. having large numbers of dots, to reconsider process organization and to relieve a man-hour difference loss as well as an equipment capability loss.

Figure 41:
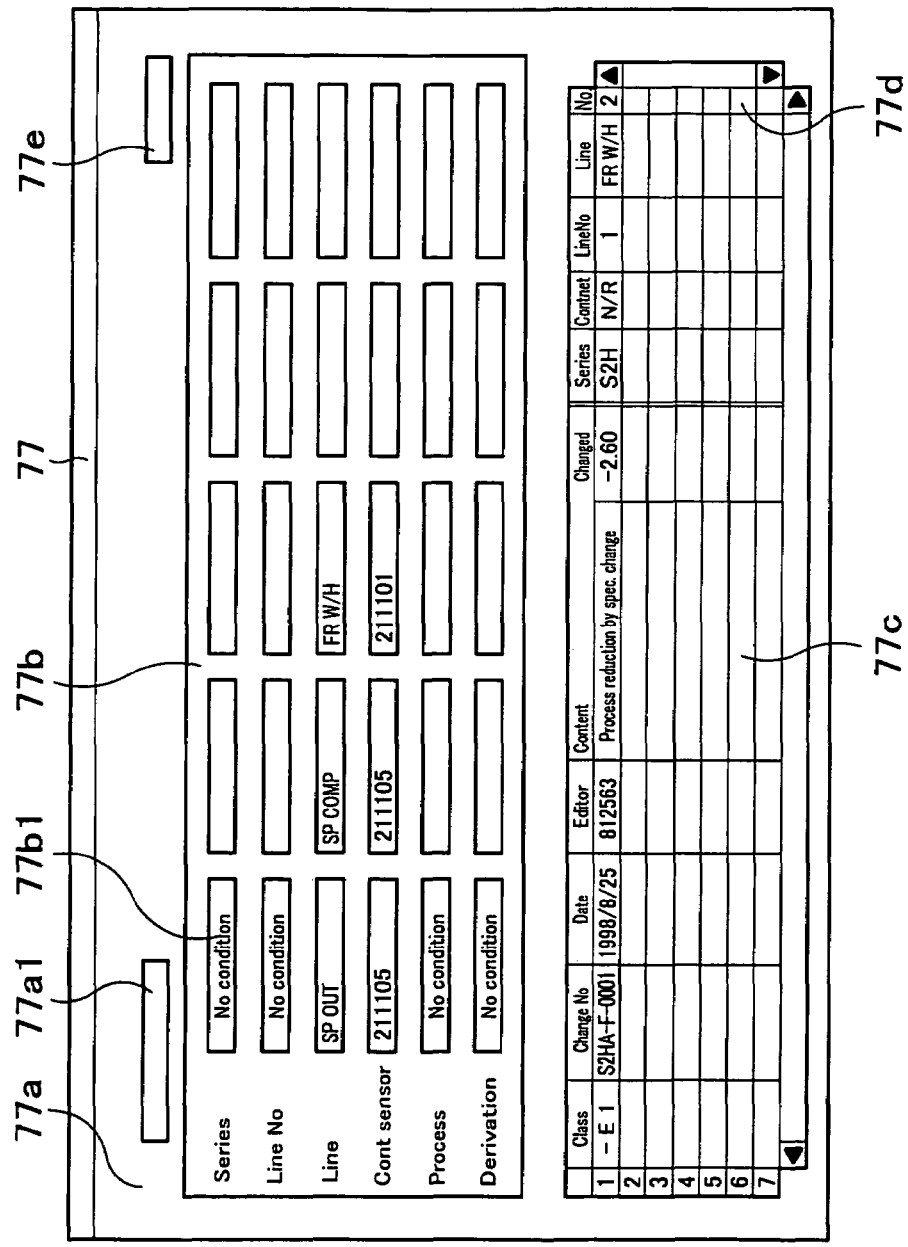
FIG. 41 shows an output screen for history management table outputs in the embodiment.

Next, the history management table output OS5 will be described with reference to FIG. 35 and FIG. 41. The history management table output OS5 submits work change contents and history management tables respectively managed by the change history management MS3 and main man-hour management MS1 in process units, to screen outputs onto a display, paper sheet outputs with a printer, and file outputs with a disk.

The history management table output OS5 is such that, when the selection button 70*e* of the menu screen 70 indicated on the display of the connection terminal 4 is clicked by the user, a history management table output program is loaded into the RAM of the connection terminal 4 and is run by the CPU thereof. Then, the output screen 77 of the history management table output OS5 as shown in FIG. 41 is indicated on the display of the connection terminal 4. At the start-up of the output screen 77, data registered in the main man-hour management table 18, change history table 20, etc. are read out and are displayed on the output screen 77. Although the screen indication on the display will be explained here, the history management tables, etc. under the screen indication can be, of course, submitted to paper sheet outputs with a printer or file outputs to a floppy disk or the like.

Displayed on the output screen 77 are an output condition column 77*a*, a selection condition column 77*b*, a change history column 77*c*, a main man-hour management column 77*d* and a quit button 77*e*. The output condition column 77*a* has "History management" displayed in its display box 77*a*1. The selection condition column 77*b* displays in its display boxes 77*b*1, . . . a series, line No, line name, cost center, process name and derivation which have been selected on the condition setting screen 71. The change history column 77*c* displays work change contents which have been read out of the change history table 20 with keys being the selected series, line No, line name, cost center, process name and derivation. The main man-hour management column 77*d* displays a worksheet which has been read out of the main man-hour management table 18 with keys being the selected series, line No, line name, cost center, process name and derivation. By the way, in case of returning to the menu screen 70, the user clicks the quit button 77*e* of the output screen 77. Then, the output screen 77 is erased from the display of the connection terminal 4, and the menu screen 70 is displayed.

With the history management table, the change contents of works and the contents of the main man-hour management can be grasped for each individual process unit. Therefore, the history management table can be utilized for diminishing the number of man-hours for a new car type or in the case of a minor change, a full model change or the like. By way of example, the data of parts of similar shapes are diverted.

Next, the main man-hour management output OS6 will be described with reference to FIG. 35. The main man-hour management output OS6 submits data managed by the main man-hour management MS1 in process units, to screen outputs onto a display, paper sheet outputs with a printer, and file outputs with a disk.

The main man-hour management output OS6 is such that, when the selection button 70*f* of the menu screen 70 indicated on the display of the connection terminal 4 is clicked by the user, a main man-hour management output program is loaded into the RAM of the connection terminal 4 and is run by the CPU thereof. Then, the main screen 50 (refer to FIG. 17A, etc.) of the main man-hour management system MS is indicated on the display of the connection terminal 4. At the start-up of the main screen 50, data registered in the main man-hour management table 18, etc. are read out and are displayed on the main screen 50. Although the screen indication on the display will be explained here, the tables, etc. under the screen indication can be, of course, submitted to paper sheet outputs to a printer or file outputs to a floppy disk or the like. The main screen 50 displays a worksheet which has been read out of the main man-hour management table 18 with keys being a series, line No, line name, cost center, process name and derivation selected on the condition setting screen 71.

With the man-hour output system OS, wait man-hours or a plant capability loss can be detected in a short time in each individual process unit (or in each individual cost center unit) by comprehensively utilizing the timing graph, process balancing table, net & loss man-hour aggregation table, and individual-process specification aggregation table. Moreover, with the man-hour output system OS, process organization of little loss in the case of a model change or the like can be attained in a short term by utilizing the history management table, etc.

According to the man-hour management system 1, standardized man-hours are managed every constituent work CW (element work) in each individual process unit or in each individual cost center unit (between processes), and hence, a man-hour analysis can be made for the state between constituent work CW (element work) within a process or for the state between processes within a cost center. With the man-hour management system 1, therefore, wait man-hours or loss man-hours within the process (or within the cost center) can be detected in a short term so as to relieve a process organization loss or a man-hour difference loss (plant capability loss) and diminish wait man-hours in each individual process unit or in each individual cost center unit (between processes). With the man-hour management system 1, consequently, it is possible to reconsider process organization, equipment or the arrangement of works in a short time. Besides, with the man-hour management system 1, the management data of close car types having been registered in the past can be effectively utilized in a man-hour analysis which is made in case of a new model change, a minor change or a full model change. Therefore, the man-hour management system 1 can readily verify the capability of organized processes in such a way that, in a case where the man-hours of a constituent work CW (element work) are expected to change by a shape alteration or the like in the model change, the man-hours of a change point are estimatively inputted to the management data. With the man-hour management system 1, consequently, the man-hour analysis of the model change can be made with ease and in detail, and process organization of little loss can be attained in a short time. Further, with the man-hour management system 1, standardized man-hours are set by refining and analyzing each constituent work CW (element work), so that a man-hour analysis of very high reliability can be made.

The present invention thus far described is not restricted to the foregoing embodiment, but it can be performed in various modified forms.

By way of example, although the man-hour management system has been described as being utilized for the automobile production, the field of production is not especially restricted.

Besides, although the man-hour management system has been described as being applied to the field of welding, the field of application is not especially restricted. Incidentally, when the field changes, constituent work CW (element work) items for analyzing man-hours, of course, change in conformity with the field.

With the man-hour management system, the standardized man-hours are set for the constituent works or the conditions of each of the constituent works, and the constituent work items are managed in process units, so that a man-hour analysis can be made between the constituent works within each process or between the processes. Therefore, the analysis of a process organization loss or wait man-hours within each process or between processes is facilitated, and a plant capability loss, the process organization loss and wait man-hours can be lessened in short times. Moreover, at a model change, the development of a new car type, or the like, a man-hour analysis can be made on the basis of the data of a close car type under the management, so that process organization of little loss can be performed in a short term.

With the man-hour management system, each time man-hours are changed by the alteration of a shape, the curtailment of a cost, or the like, the change of work contents on that occasion is managed along with the changed man-hours, and hence, the course in which the man-hours have been changed can be readily grasped. Therefore, data can be diverted to a similar alteration in shape, a similar place of curtailed cost, or the like at the development of a new car type, a model change, or the like.

With the man-hour management system, the wait time and working time of each constituent work and the start time of each constituent work are managed as timing graph data, so that the wait time of the constituent work can be readily analyzed. Further, the work flow between the constituent works within the process can be grasped at a glance. Therefore, a wasteful wait time can be shortened in a short time.

With the man-hour management system, the lines for implementing processes or constituent works are registered and managed, so that the line which is implementing the process or the constituent work can be readily referred to.

With the man-hour management system, the series and types are registered and managed, so that the series or type for which the process or constituent work is proceeding can be readily referred to. Besides, the analysis of a man-hour difference loss involved between the types in case of producing two or more types in one line is facilitated, and the man-hour difference loss can be relieved in a short time.

With the man-hour management system, the derivatives associated with the series are registered and managed, so that the series to which any of the derivatives being handled belongs can readily referred to. Besides, the analysis of a man-hour difference loss involved between the derivatives in case of producing two or more derivatives in one line is facilitated, and the man-hour difference loss can be relieved in a short time.

With the man-hour management system, the data having become unnecessary can be extracted from the database in series units, and the extracted data can be stored in the database in series units again, so that the database can be efficiently utilized.

With the man-hour management system, the standardized man-hours are by analyzing the movements refined from the constituent work, so that the set standardized man-hours differ little from real man-hours of the constituent work by individual workers. Therefore, a man-hour analysis is made on the basis of the standardized man-hours of high reliability, and the reliability of an analyzed result is also enhanced.

What is claimed is:

1. A man-hour management system which manages man-hours for producing automobiles, comprising:

a server, a database, connection terminals, and an Ethernet;

said database comprising:

a walk man-hour conversion table for performing registration management of standardized man-hours for walks which are generated by works;

a work constituent condition table for performing registration management of constituent works for use in managing the man-hours, end having conditions for each of the constituent works;

a standardized man-hour table for performing registration management of standardized man-hour analysis contents and standardized man-hours for the constituent works or the constituent work conditions which are under the registration management of said work constituent condition table;

a main man-hour management table for managing item data for constituent works in process units and for performing registration management and/or reorganization management of constituent work items in the units of processes, data being assigned to the constituent work items from said walk awn-hour conversion table, said work constituent condition table and said standardized man-hour table, or data being inputted and set to the constituent work items; and a process name table for performing registration management and/or reorganization management of names of the processes; and said man-hour management system further including man-hour output means including a man-hour output system program, a timing graph output program, a process balancing table output program, a net & loss aggregation table output program, an individual-process specification aggregation table output program, a history management table output program, and a main man-hour management output program, for outputting man-hour information by being assigned data from said main man-hour management table and said process name table.

2. A man-hour management system according to claim 1, comprising a change history table for performing save management of work change contents in units of the processes;

wherein said man-hour output means outputs the man-hour information by being assigned data also from said change history table.

3. A man-hour management system according to claim 1, comprising a timing graph data table for performing registration management of data of a timing graph, data being assigned to said timing graph data table from said main man-hour management table;

wherein said man-hour output means outputs the man-hour information by being assigned data also from said timing graph data table.

4. A man-hour management system according to claim 1, comprising a line name table for performing registration management of modes of lines which implement works;

wherein said main man-hour management table is assigned data also from said line name table.

5. A man-hour management system according to claim 1, comprising a series table for performing registration management of series and types associated with the series;

wherein said main man-hour management table is assigned data also from said series table.

6. A man-hour management system according to claim 1, comprising a derivation table for performing registration management of derivatives associated with each of the series and types;

wherein said main man-hour management table is assigned data also from said derivation table.

7. A man-hour management system according to claim 1, comprising:

a database in which the tables are stored; and series data backup means for extracting the data of said tables in series units as have become unnecessary, from said database, and for re-storing said data of said tables extracted in series units, in said database.

8. A man-hour management system according to claim 1, wherein the constituent work has its each movement classified into one of a main movement, an auxiliary movement and a quasi movement, and standardized man-hours analyzed are set for said each movement.

* * * * *